(12) United States Patent
Lockett et al.

(10) Patent No.: US 12,489,147 B2
(45) Date of Patent: Dec. 2, 2025

(54) THIN FILM-BASED ENERGY STORAGE DEVICES

(71) Applicant: Printed Energy Pty Ltd, Brisbane (AU)

(72) Inventors: Vera N. Lockett, Phoenix, AZ (US); Yasser Salah, Tempe, AZ (US); Alexandra Elyse Hartman, Tolleson, AZ (US); Sri Harsha Kolli, Tempe, AZ (US); Rodger Whitby, Hoya (AU); William Johnstone Ray, Fountain Hills, AZ (US); Leila Daneshi, Phoenix, AZ (US)

(73) Assignee: Printegrica, Inc., Tempe, AZ (US)

( * ) Notice: Subject to any disclaimer, the term of this patent is extended or adjusted under 35 U.S.C. 154(b) by 939 days.

(21) Appl. No.: 17/653,272

(22) Filed: Mar. 2, 2022

(65) Prior Publication Data

US 2022/0271343 A1    Aug. 25, 2022

Related U.S. Application Data

(63) Continuation of application No. 16/247,365, filed on Jan. 14, 2019, now Pat. No. 11,276,885.
(Continued)

(51) Int. Cl.
*H01M 10/0585* (2010.01)
*H01G 11/26* (2013.01)
*H01M 10/04* (2006.01)

(52) U.S. Cl.
CPC ........ *H01M 10/0585* (2013.01); *H01G 11/26* (2013.01); *H01M 10/04* (2013.01); *H01M 2220/30* (2013.01)

(58) Field of Classification Search
CPC ........ H01G 11/46; H01G 11/06; H01G 11/28; H01G 11/04; H01G 11/36; H01G 11/70;
(Continued)

(56) References Cited

U.S. PATENT DOCUMENTS 3,230,115 A    1/1966    Tamminen
8,268,475 B2   9/2012    Tucholski
(Continued)

FOREIGN PATENT DOCUMENTS

CN    101728575 A    6/2010
EP    1 749 319 B1   7/2014
(Continued)

OTHER PUBLICATIONS

Bae et al., "Printable Solar Cells from Advanced Solution-Processible Materials", Chem 1, Aug. 11, 2016, pp. 197-219.
(Continued)

*Primary Examiner* — Robert G Bachner
(74) *Attorney, Agent, or Firm* — Knobbe, Martens, Olson & Bear, LLP

(57) ABSTRACT

The disclosed technology generally relates to thin film-based energy storage devices, and more particularly to printed thin film-based energy storage devices. The thin film-based energy storage device includes a first current collector layer and a second current collector layer over an electrically insulating substrate and adjacently disposed in a lateral direction. The thin film-based energy storage device additionally includes a first electrode layer of a first type over the first current collector layer and a second electrode layer of a second type over the second current collector layer. A separator separates the first electrode layer and the second electrode layer. One or more of the first current collector
(Continued)

layer, the first electrode layer, the separator, the second electrode layer and the second current collector layer are printed layers.

20 Claims, 37 Drawing Sheets

Related U.S. Application Data

(60) Provisional application No. 62/673,673, filed on May 18, 2018, provisional application No. 62/669,709, filed on May 10, 2018, provisional application No. 62/617,856, filed on Jan. 16, 2018.

(58) Field of Classification Search
CPC .... H01M 6/40; H01M 10/0463; H01M 10/04; H01M 2220/30; H01M 2010/0495; Y02E 60/10; Y02P 70/50
See application file for complete search history.

(56) References Cited

U.S. PATENT DOCUMENTS

| | | | |
|---|---|---|---|
| 8,415,055 | B2 | 4/2013 | Choi et al. |
| 8,574,754 | B2 | 11/2013 | Tucholski |
| 8,637,349 | B2 | 1/2014 | Jenson et al. |
| 8,722,233 | B2 | 5/2014 | Tucholski |
| 9,343,716 | B2 | 5/2016 | Rothkopf et al. |
| 9,444,078 | B2 | 9/2016 | Tucholski et al. |
| 9,634,296 | B2 | 4/2017 | Johnson et al. |
| 9,673,481 | B2 | 6/2017 | Sabi et al. |
| 9,685,275 | B2 | 6/2017 | Kuriki et al. |
| 9,728,494 | B2 | 8/2017 | Biederman et al. |
| 10,141,547 | B2 | 11/2018 | Asai et al. |
| 11,276,885 | B2 * | 3/2022 | Lockett ................. H01M 10/04 |
| 2003/0113624 | A1 | 6/2003 | Kim et al. |
| 2010/0081049 | A1 | 4/2010 | Holl et al. |
| 2011/0281160 | A1 | 11/2011 | Doi |
| 2012/0171547 | A1 | 7/2012 | Pennaz et al. |
| 2013/0149593 | A1 | 6/2013 | Hayashi et al. |
| 2014/0147723 | A1 | 5/2014 | Tucholski |
| 2014/0295244 | A1 | 10/2014 | Gaikwad et al. |
| 2016/0020484 | A1 | 1/2016 | Hsueh et al. |
| 2016/0149170 | A1 | 5/2016 | Asai et al. |
| 2017/0104190 | A1 | 4/2017 | Peuchert et al. |
| 2017/0104224 | A1 | 4/2017 | Hahn |
| 2017/0222232 | A1 | 8/2017 | Lockett et al. |
| 2018/0166699 | A1 | 6/2018 | Gaikwad et al. |

FOREIGN PATENT DOCUMENTS

| | | |
|---|---|---|
| EP | 2 793 298 | 10/2014 |
| EP | 2 820 709 B1 | 10/2016 |
| EP | 2 577 781 B1 | 8/2017 |
| EP | 2 820 708 B1 | 9/2017 |
| EP | 3 276 706 | 1/2018 |
| JP | 2010-106276 | 5/2010 |
| JP | 2015-535651 | 12/2015 |
| KR | 10-2014-0100630 | 8/2014 |
| KR | 10-2016-0023779 | 3/2016 |
| KR | 10-2017-0098004 | 8/2017 |
| KR | 10-2017-0133699 | 12/2017 |
| TW | 201212358 | 3/2012 |
| WO | WO 2014/203965 | 12/2014 |
| WO | WO 2015/031365 | 3/2015 |
| WO | WO 2019/143576 | 7/2019 |

OTHER PUBLICATIONS

International Search Report and Written Opinion received in PCT Application No. PCT/US2019/013544 dated May 1, 2019 in 10 pages.
Lattante, Sandro, "Electron and Hole Transport Layers: Their Use in Inverted Bulk Heterojunction Polymer Solar Cells", Electronics, 2014, vol. 3, pp. 132-164.
Mei et al., "A Hole-Conductor-Free, Fully Printable Mesoscopic Perovskite Solar Cell with High Stability", Science, Jul. 18, 2014, vol. 345, p. 12.
Tan et al., "Efficient and Stable Solution-Processed Planar Perovskite Solar Cells via Contact Passivation", Science, vol. 355, Feb. 17, 2017, pp. 722-726.

\* cited by examiner

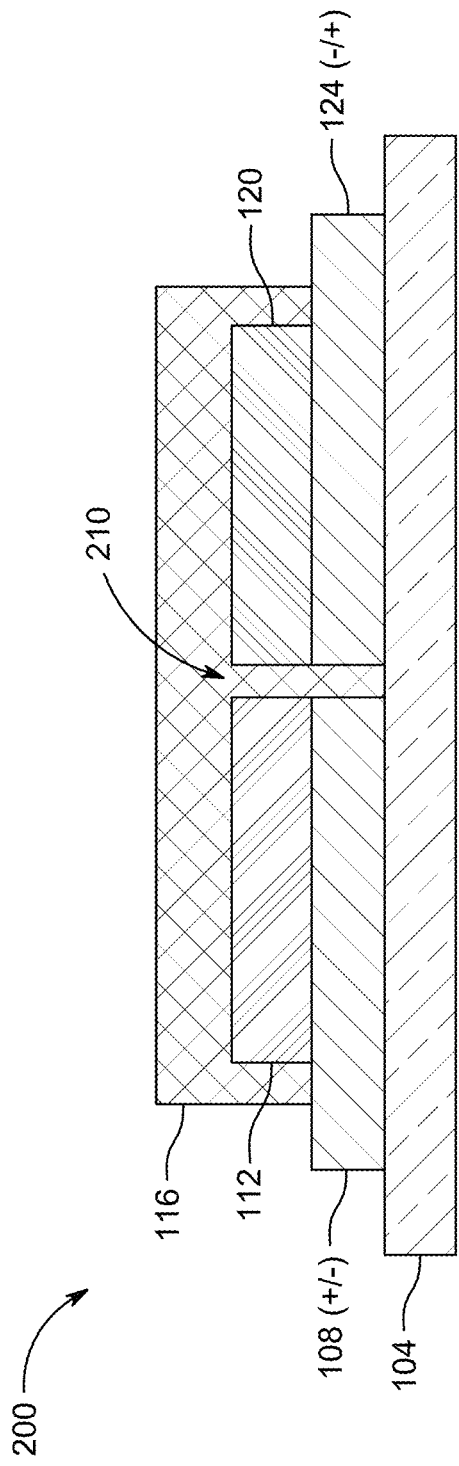
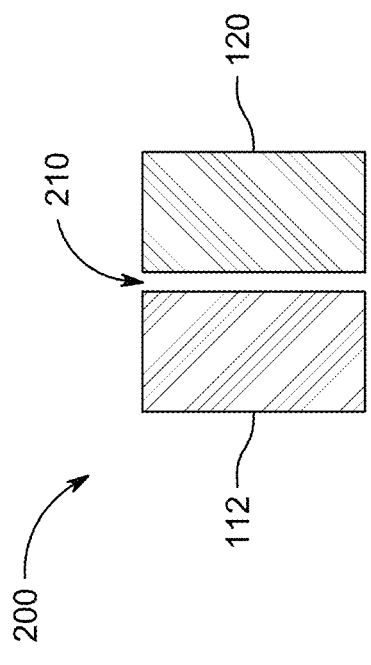
FIG. 2A
FIG. 2B

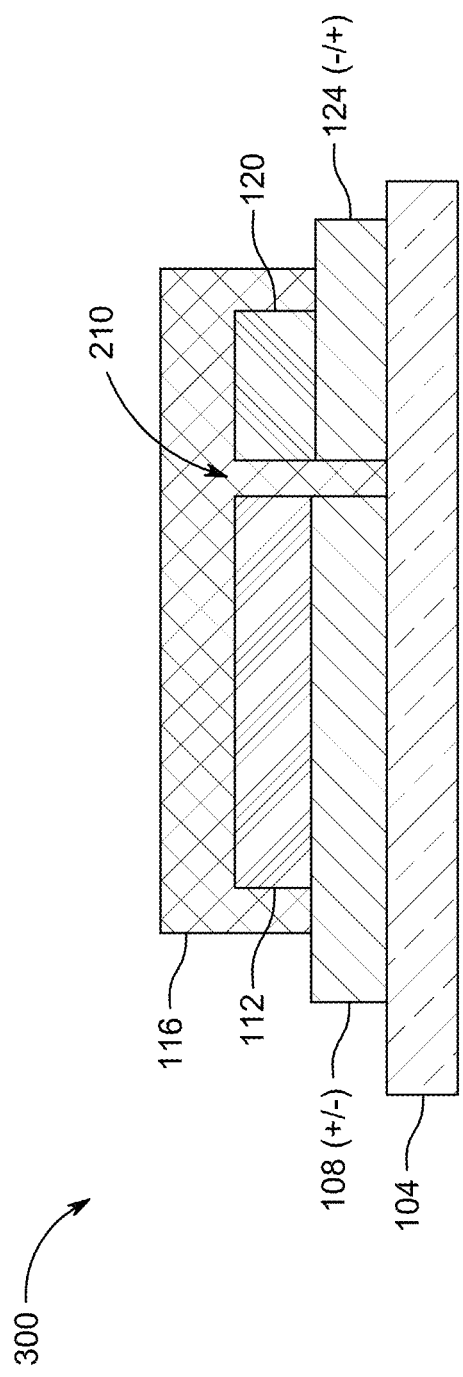
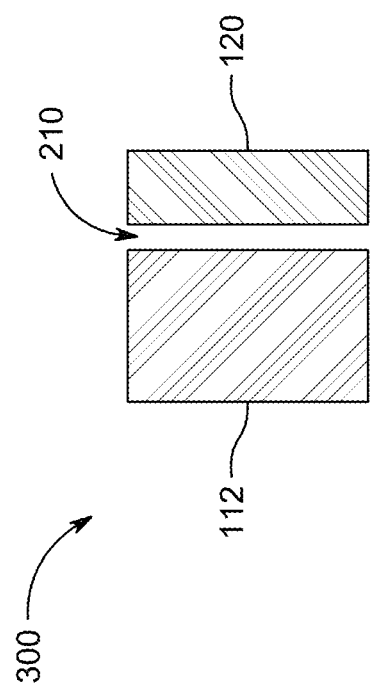
FIG. 3A
FIG. 3B

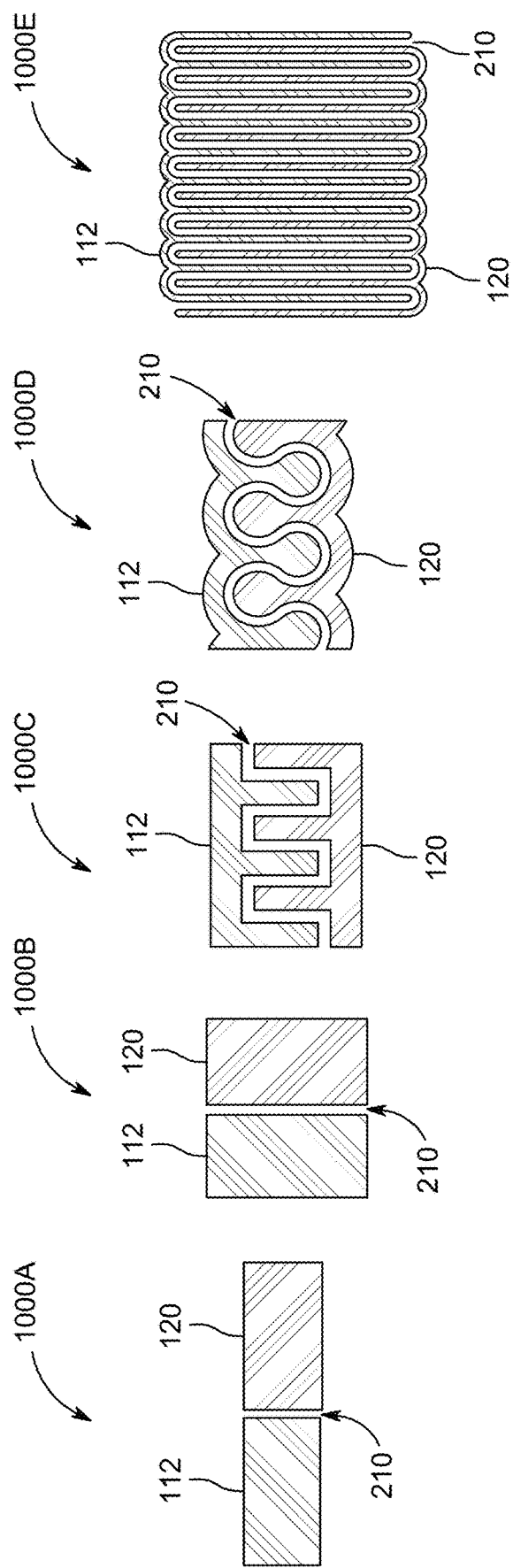

THIN FILM-BASED ENERGY STORAGE DEVICES

INCORPORATION BY REFERENCE TO ANY PRIORITY APPLICATIONS

Any and all applications for which a foreign or domestic priority claim is identified in the Application Data Sheet as filed with the present application are hereby incorporated by reference in their entirety for all purposes.

BACKGROUND

Field

The disclosed technology generally relates to energy storage devices, and more particularly to printed thin film-based or printed energy storage devices.

Description of the Related Art

Recent advances in thin film-based electronic devices such as printed electronic devices have enabled various new forms of electronics that are adapted increased ubiquity, higher level of integration and for potentially lower cost. Thin film-based electronic devices include flexible displays and electronics on three-dimensional (3D) structures, larger area electronics such as sensor arrays, higher performance devices such as organic light emitting displays, various devices adapted for internet of things (IoT), wearable devices, Bluetooth® devices, light emitting devices, wireless devices (e.g., antennas for inductive charging), radio-frequency identification (RFID), to name a few.

Some thin film-based electronic devices are connected or integrated with energy storage devices (ESDs), such as batteries and supercapacitors that provide power to the electronic devices. The thin film-based energy storage devices can be fabricated and/or advantageously integrated with ESDs that are also thin-film based, where the thin film-based ESDs are fabricated using similar processes used to fabricate the thin film-based electronic devices. For example, the thin film-based ESDs may be printed using similar printing processes used to fabricate the printed thin film-based electronic devices.

To serve as suitable power sources for the thin film-based electronic devices, the thin film-based ESDs should have compatible attributes. For example, some thin film-based electronic devices are adapted to be flexible devices. To be compatible with these types of devices, the thin film-based ESDs should also be flexible. To be compatible with a wide variety of thin film-based electronic devices having a wide range of power and energy needs (e.g., a capacity range such as 1-100 mAh and a voltage range such as 1.5 V-6 V), the thin film-based ESDs that power these devices should be configurable to meet the different needs. Furthermore, the thin film-based ESDs should deliver these performances at a cost that is compatibly low as the thin film-based electronic devices themselves. To meet these and other needs, there is a need for thin film-based ESDs and manufacturing processes that can provide the versatility including a wide range of capacity and output voltage, configurability, integratability, and relatively low manufacturing cost and compatibility with thin film-based electronic devices.

SUMMARY

In an aspect, a method of fabricating an energy storage device includes printing laterally adjacent and electrically separated current collector layers including a first current collector layer and a second current collector layer over a substrate. The method additionally includes printing an electrode layer of a first type over the first current collector layer and printing an electrode layer of a second type over the second current collector layer. The method further includes printing a separator over one or both of the electrode layers of the first and second types. Printing the separator includes printing over exposed surfaces of one or both of the electrode layers of the first and second types. The electrode layer of the first type includes a first electrode active material and the electrode layer of the second type includes a second electrode active material. A molar ratio between the first electrode active material and the second electrode active material is between 0.25 and 4.0.

In another aspect, a method of fabricating an energy storage device includes printing a plurality of laterally adjacent and electrically separated current collector layers over a substrate. The method additionally includes printing electrode layers of a first type over at least a first subset of the plurality of current collector layers and printing electrode layers of a second type over at least a second subset of the plurality of current collector layers. The method further includes printing a plurality of separator layers to form a plurality of electrically connected cells of the energy storage device, wherein each of the cells comprises one separator of the plurality of separator layers contacting one of the electrode layers of the first type and one of the electrode layers of the second type.

In another aspect, a manufacturing kit for an energy storage device includes an unactivated energy storage device. The unactivated energy storage device includes a substrate,
a plurality of laterally adjacent and electrically separated current collector layers over the substrate. The plurality of current collector layers include a first current collector layer and a second current collector layer. The unactivated energy storage device additionally includes an electrode layer of a first type is over the first current collector layer, an electrode layer of a second type over the second current collector layer, and a dry separator over one or both of the electrode layers of the first and second types. The separator includes an exposed portion through which the dry separator is configured to receive an electrolyte. The manufacturing kit additionally includes an electrolyte configured to be applied to the unactivated energy storage device to activate the energy storage device.

In another aspect, a method of fabricating an electrical system includes printing an energy storage device over a battery-powered core device over a substrate. The core device is configured to receive power through a first power terminal and a second terminal and the energy storage device is configured to provide the power to the battery-powered core device. Printing the energy storage device includes printing a plurality of current collector layers including a first current collector layer and a second current collector layer. At least one of the first or second current collector layers is printed over the first and second power terminals. Printing the energy storage device additionally includes printing an electrode layer of a first type over the first current collector layer, printing an electrode layer of a second type over the second current collector layer, and printing a separator over exposed surfaces of one or both of the electrode layers of the first and second types.

In another aspect, an energy storage device includes a first current collector layer and a second current collector adjacently disposed in a lateral direction over an electrically insulating substrate. The energy storage device additionally includes a first electrode layer of a first type over the first current collector layer, a separator over the first electrode layer and a second electrode layer of a second type different from the first type over the separator. The second electrode layer includes a base portion extending from the second current collector layer in a vertical direction and a lateral extension portion laterally extending from the base portion in the lateral direction to laterally overlap the first electrode layer. One or more of the first current collector layer, the first electrode layer, the separator, the second electrode layer and the second current collector layer is printed layer.

In another aspect, an energy storage device includes a first current collector layer and a second current collector layer over an electrically insulating substrate and adjacently disposed in a lateral direction. The energy storage device additionally includes a first electrode layer of a first type over the first current collector layer, a second electrode layer of a second type over the second current collector layer, and a separator over the first electrode layer and the second electrode layer. One or more of the first current collector layer, the first electrode layer, the separator, the second electrode layer and the second current collector layer is a printed layer. The first electrode layer comprises a first electrode active material and the second electrode layer comprises a second electrode active material, wherein a molar ratio between the first electrode active material and the second electrode active material is between 0.25 and 4.0.

In another aspect, an energy storage device includes a first current collector layer over an electrically insulating substrate, a first electrode layer of a first type over the first current collector layer, a separator over the first electrode layer and covering a top surface and a side surface thereof, a second electrode layer of a second type over the separator, and a second current collector layer comprising a base portion extending from the electrically insulating substrate in a vertical direction and a lateral extension portion laterally extending from the base portion in the lateral direction to overlap the second electrode layer. One or more of the first current collector layer, the first electrode layer, the separator, the second electrode layer and the second current collector layer are printed layers. The first electrode layer comprises a first electrode active material and the second electrode layer comprises a second electrode active material. A molar ratio between the first electrode active material and the second electrode active material is between 0.25 and 4.0.

In another aspect, an energy storage device includes an electrically insulating substrate and a first current collector and a second current collector formed over the electrically insulating substrate. The first current collector comprises a plurality of first current collector finger structures and the second current collector comprises a plurality of second current collector finger structures. The first current collector finger structures and the second current collector finger structures are interleaved to alternate in a lateral direction. A first electrode layer of a first type is formed over the first current collector layer and a second electrode layer of a second type is over the second current collector layer. A separator layer separates the first electrode layer and the second electrode layer.

In another aspect, an energy storage device includes a plurality of laterally adjacent and electrically separated current collectors over an electrically insulating substrate. The energy storage device comprises a plurality of electrically connected energy storage cells. Each of the energy storage cells comprises a first electrode layer of a first type on one of the current collectors, a second electrode layer of a second type on an adjacent one of the current collectors, and a separator contacting and electrically separating the first electrode layer and the second electrode layer.

In another aspect, a method of activating an energy storage device includes providing an unactivated energy storage device. The unactivated energy storage device includes a substrate and a plurality of laterally adjacent and electrically separated current collector layers over the substrate. The plurality of current collector layers includes a first current collector layer and a second current collector layer. The unactivated energy storage device additionally includes an electrode layer of a first type over the first current collector layer, an electrode layer of a second type over the second current collector layer, and a dry separator over one or both of the electrode layers of the first and second types. The separator comprises an exposed portion through which the dry separator is configured to receive an electrolyte. The method additionally includes activating the energy storage device by applying an electrolyte to the dry separator.

In another aspect, a thin film-based electronic device includes a thin film-based core device and a thin film-based energy storage device (ESD) electrically connected to each other. The thin film-based core device and the thin film-based energy storage device are integrated on a common substrate and overlap each other in a direction normal to the common substrate.

In another aspect, a thin film-based electronic device includes a thin film-based energy storage device (ESD) and a thin film-based energy harvesting device and electrically connected to the thin film-based ESD and configured to charge the thin film-based ESD. The thin film-based energy harvesting device and the thin film-based energy storage device are integrated on a common substrate.

In another aspect, a wearable thin film-based electronic device includes a plurality of laterally adjacent and electrically separated current collectors over an electrically insulating substrate. The device additionally includes a plurality of electrically connected energy storage cells. Each of the energy storage cells comprises a first electrode layer of a first type on one of the current collectors, a second electrode layer of a second type on an adjacent one of the current collectors, and a separator contacting and electrically separating the first electrode layer and the second electrode layer. The plurality of electrically connected energy storage cells is configured to be worn by a user.

In another aspect, a configurable energy storage device includes a plurality of laterally adjacent and electrically separated current collectors over an electrically insulating substrate. The energy storage device comprises a plurality of electrically connected energy storage cells. The electrically connected energy storage cells are configured to be detached from each other upon receiving a mechanical force to form a pattern of electrically connected energy storage cells.

In another aspect, an energy storage device includes a plurality of radially arranged and electrically separated current collectors over an electrically insulating substrate. The energy storage device comprises a plurality of radially arranged and electrically connected energy storage cells. Each of the energy storage cells comprises a first electrode layer of a first type on one of the current collectors, a second electrode layer of a second type on an adjacent one of the current collectors, and a separator contacting and electrically separating the first electrode layer and the second electrode layer.

In another aspect, an energy storage device includes an electrically insulating substrate, a first current collector over the electrically insulating substrate and a second current collector over the electrically insulating substrate. The first current collector comprises a plurality of first current collector finger structures. The second current collector comprises a plurality of second current collector finger structures. The first current collector finger structures and the second current collector finger structures are interleaved to alternate in a lateral direction. The first and second current collectors are radially arranged such that one of the first and second current collectors radially surrounds the other of the first and second current collectors. The device additionally includes a first electrode layer of a first type over the first current collector layer, a second electrode layer of a second type over the second current collector layer and a separator layer separating the first electrode layer and the second electrode layer.

BRIEF DESCRIPTION OF THE DRAWINGS

These and other features, aspects, and advantages of the present disclosure are described with reference to the drawings of certain embodiments, which are intended to illustrate certain embodiments and not to limit the invention. In the drawings, features having reference numerals in parenthesis indicate features that are underneath another feature when viewed by the reader.

FIG. 2A illustrates a side view of a thin film-based energy storage device having laterally adjacent current collectors and electrode layers.

FIG. 2B illustrates a plan view of electrode layers of the thin film-based energy storage device illustrated in FIG. 2A.

FIG. 3A illustrates a side view of a thin film-based energy storage device having asymmetric laterally adjacent current collectors and electrode layers, where the ratio of surface areas between the first and second electrode layers is adjusted in accordance with a molar ratio of the active materials.

FIG. 3B illustrates a plan view of electrode layers of the thin film-based energy storage device illustrated in FIG. 3A.

FIG. 10A illustrates a plan view of an electrode arrangement of a thin film-based energy storage device having laterally adjacent current collectors and electrode layers, where the first and second electrodes are rectangular in shape and have widths that overlap in a lateral direction.

FIG. 10B illustrates a plan view of an electrode arrangement of a thin film-based energy storage device having laterally adjacent current collectors and electrode layers, where the first and second electrodes are rectangular in shape and have lengths that overlap in a lateral direction.

FIG. 10C illustrates a plan view of an electrode arrangement of a thin film-based energy storage device having laterally adjacent current collectors and electrode layers, where each of the first and second electrodes has a plurality of regularly spaced rectangular protrusions or fingers, where the rectangular protrusions or fingers of the first and second electrodes are interlaced or interleaved such that they alternate in a lateral direction, for increased overlapping edge lengths of the first and second electrodes.

FIG. 10D illustrates a plan view of an electrode arrangement of a thin film-based energy storage device having laterally adjacent current collectors and electrode layers, where each of the first and second electrodes has a plurality of regularly spaced rounded protrusions or fingers, where the rounded protrusions or fingers of the first and second electrodes are interlaced or interleaved such that they alternate in a lateral direction, for increased overlapping edge lengths of the first and second electrodes.

FIG. 10E illustrates a plan view of an electrode arrangement of a thin film-based energy storage device having laterally adjacent current collectors and electrode layers, where each of the first and second electrodes has a plurality of regularly spaced elongated protrusions or fingers, where the elongated protrusions or fingers of the first and second electrodes are interlaced or interleaved such that they alternate in a lateral direction, for increased overlapping edge lengths of the first and second electrodes.

DETAILED DESCRIPTION

Figure 1:
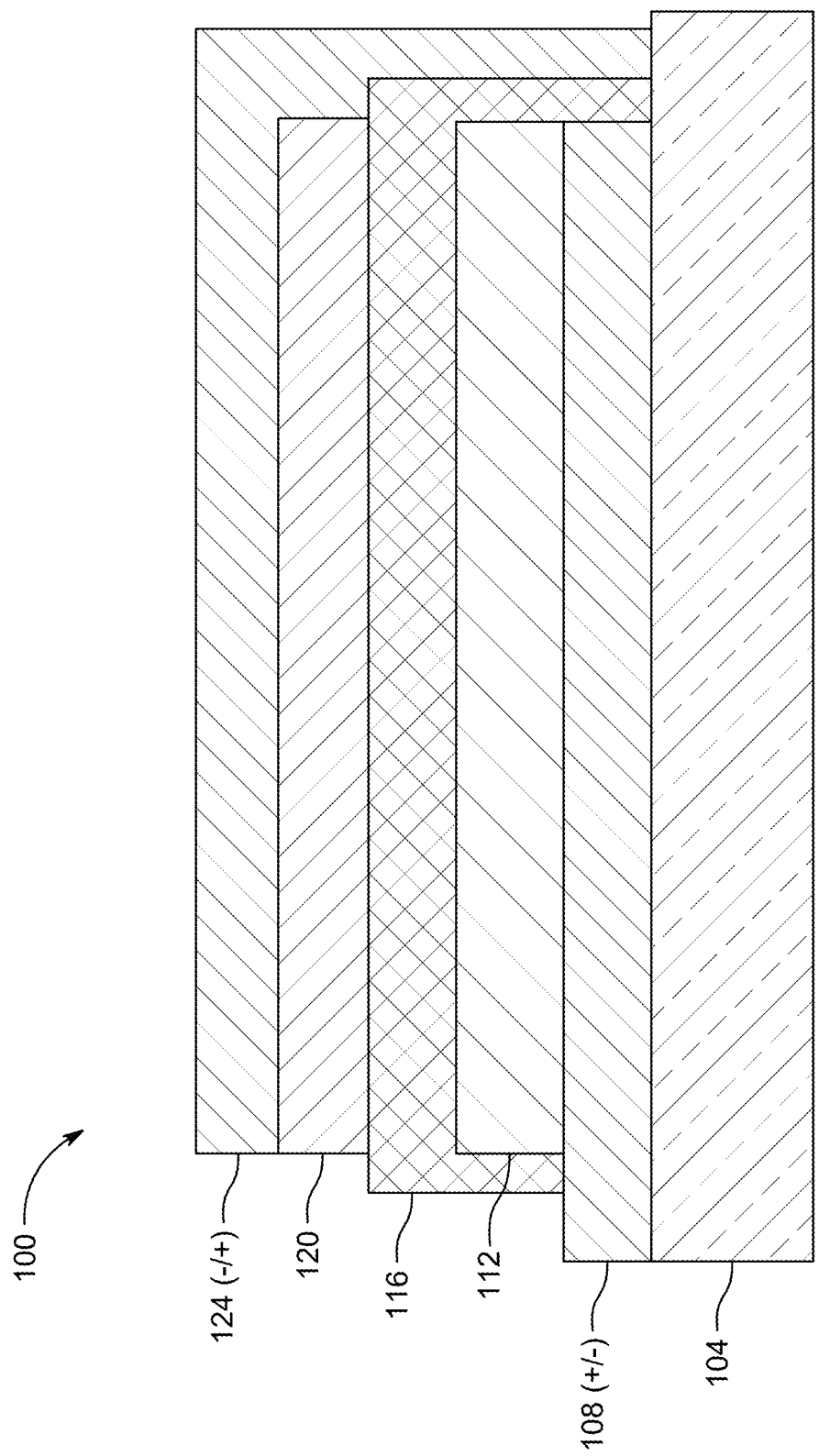
FIG. 1 illustrates a thin film-based energy storage device having vertically stacked current collectors and electrode layers.

Although certain embodiments and examples are described below, those of skill in the art will appreciate that the invention extends beyond the specifically disclosed embodiments and/or uses and obvious modifications and equivalents thereof. Thus, it is intended that the scope of the invention herein disclosed should not be limited by any particular embodiments described below.

As described herein, printing or additive manufacturing refers to a process in which materials are accumulated, grown or increased in mass in a layer-by-layer fashion to to form a two- or three-dimensional object. The added materials can include liquid and/or solid. The object can be added or joined with an existing component, such as a substrate.

Generally, advantages of manufacturing electronic devices by printing over other techniques include compatibility with forming complex shapes, improved form factor, reduced overall thickness, reduced device footprint, ease of integration with other devices, e.g., thin film-based devices, flexibility, reduction in cost, forming large area structures, mass manufacturing, lower material cost and ability to combine with other high throughput manufacturing processes such as roll-to-roll manufacturing, to name a few, As described herein, a printed device refers to a device having at least one layer or feature that is printed using a printing process, having multiple features or layers printed using a printing process, or having all features or layers printed using a printing process.

In various embodiments described herein, one or more components of various devices and apparatuses described advantageously may comprise thin film features. One or more of the thin film features may be printed features. As described herein, suitable printing processes for forming the thin features include gravure printing, screen printing, lithography, flexography, ink-jet printing, rotary screen printing and stenciling, among other suitable printing processes. One or more of these printing processes may be combined with other high volume manufacturing techniques, e.g., roll-to-roll processing. Printing parts of devices or components thereof can provide various advantages, including reduced thickness, compact dimensions and low waste, to name a few. Printed devices can also enable increased functionalities for a given footprint of the device by enabling, among other things, stacking of the printed devices or components thereof. Unlike devices manufactured using other processes, some printed devices can also be flexible, which can be suitable for wearable devices including wearable medical devices, displays, sensors, smartcards, smart packaging, smart clothing, signage, advertisements, among other devices.

According to various embodiments, a thin film-based energy storage device (ESD) comprises electrically separated current collector layers formed on a substrate. The current collector layers include a first current collector layer of a first type, which may be a current collector configured as one of an anode or a cathode of the ESD, and a second current collector layer of a second type, which may be a current collector configured as the other one of the anode or the cathode of the ESD. The first and second current collector layers may be deposited, e.g., printed, over or on a common surface of the substrate. The ESD additionally comprises a first electrode layer of a first type, e.g., a layer of one of an anode or a cathode, that is formed over or on, e.g., printed on, the first current collector layer of the first type. The ESD additionally comprises a second electrode layer of a second type, e.g., a layer of the other of the anode or the cathode, that is formed over or on, e.g., printed on, the second current collector layer of the second type. The ESD further comprises a separator, e.g., a printed separator, that may be formed over or on to contact one or both of the first electrode layer and the second electrode layer.

As described herein, a thin film-based ESD may include one or more of a primary battery, a secondary battery, a supercapacitor and a battery-supercapacitor hybrid device. When the ESD includes a primary battery, the ESD can be configured as a zinc/carbon, zinc/alkaline/manganese, magnesium/manganese dioxide, zinc/mercuric oxide, cadmium/mercuric oxide, zinc/silver oxide, zinc/air, lithium/soluble cathode and lithium/solid cathode primary battery, to name a few. When the ESD includes a secondary battery, the ESD can be configured as a nickel/iron, silver/iron, iron/air, nickel/cadmium, nickel/metal hydride, nickel/zinc, zinc/silver oxide, lithium-ion, lithium/metal, $Zn/MnO_2$, zinc/air, aluminum/air, magnesium/air, and lithium/air/lithium/polymer secondary batteries, to name a few.

In some embodiments, a thin film-based ESD may comprise a supercapacitor in which both electrodes are configured as a double-layer capacitor, both electrodes are configured as a pseudo capacitor, or one electrode is configured as a double-layer while the other electrode is configured as a pseudo capacitor. In some implementations, the thin film-based ESD may comprise a supercapacitor having symmetric printed electrodes, where each of the electrodes comprises, e.g., zinc oxide ($Zn_xO_y$) or manganese oxide ($Mn_xO_y$). In other implementations, the thin film-based ESD may comprise a supercapacitor having symmetric printed electrodes, where each of the electrodes has formed thereon carbon nanotubes. In some implementations, the thin film-based ESD may comprise a supercapacitor having asymmetric printed electrodes, where one of the electrodes comprise, e.g., zinc oxide ($Zn_xO_y$) or manganese oxide ($Mn_xO_y$), while the other of the electrodes comprise carbon nanotubes.

As described herein, supercapacitors, sometimes also referred to as ultracapacitors, electric double layer capacitors (EDLC) or electrochemical capacitors, are relatively new energy storage devices whose characteristics are advantageously similar to traditional electrostatic capacitors in some aspects while being similar to traditional batteries, e.g., secondary batteries, in some other aspects.

Similar to certain batteries, supercapacitors have a cathode or a positive electrode and an anode or a negative electrode that are separated by a porous separator and an electrolyte. For example, the separator may comprise a dielectric material permeable to ions and soaked in the electrolyte. Ion transport which occurs from one electrode to the other as part of an electrochemical reaction during charge or discharge of a battery does not occur in supercapacitors.

While supercapacitors are similar to traditional electrostatic capacitors in some aspects, e.g., relatively fast charging capability, they have much higher capacitance compared to traditional electrostatic capacitors. Unlike traditional electrostatic capacitors that store energy in electrodes separated by a dielectric, supercapacitors store energy at one or both of interfaces between a cathode and an electrolyte and an anode and the electrolyte.

Capacitance values of supercapacitors may be much higher than traditional electrostatic capacitors. Some supercapacitors have lower voltage limits compared to traditional electrostatic capacitors. For example, some supercapacitors are operationally limited to about 2.5-2.8 V. Some supercapacitors may operate at voltages of 2.8 V and higher. Certain such supercapacitors may exhibit a reduced service life.

Supercapacitors generally have much higher power density than batteries because they can transport charge much faster than batteries. Supercapacitors generally have much lower internal resistance compared to batteries and, as a result, they do not generate as much heat during quick charge/discharge. Some supercapacitors can be charged and discharged millions of times, while many secondary batteries can have significantly shorter typical life cycle of 500-10000 times. Some supercapacitors have significantly lower energy density compared to batteries. Some commercial supercapacitors are more expensive (higher cost per Watt) than commercial batteries.

Because of these and other characteristics, supercapacitors are used in applications in which many rapid charge/discharge cycles may be needed rather than long term energy storage. For example, applications of larger units of supercapacitors include cars, buses, trains, cranes and elevators, to name a few, where they are used for regenerative braking, short-term energy storage or burst-mode power delivery. Applications of smaller units of supercapacitors include memory backup for static random-access memory (SRAM). Other current or future applications of supercapacitors include various consumer electronics, including mobile phones, laptops, electric cars and various other devices in which batteries are used. Because they can be recharged much faster compared to batteries, they are especially attractive for devices that can benefit from faster charge rates, e.g., minutes instead of hours that current electric vehicles or mobile phones may spend charging.

In some devices, supercapacitors are used in conjunction with batteries to take advantage of advantageous characteristics of both. In these applications, supercapacitors are used when a quick charge is needed to fill a short-term power need, whereas batteries are used to provide long-term energy. Combining the two into a hybrid energy storage device can satisfy both needs while reducing battery stress, which may in turn enable a longer service life of the battery and the supercapacitor.

Without being bound to any theory, supercapacitors can store energy by different mechanisms, which include electric double-layer capacitance and/or pseudocapacitance. Double layer capacitance has electrostatic characteristics, while pseudocapacitance has electrochemical characteristics. The different mechanisms are described in more detail below. Depending on whether the storage mechanism has double-layer capacitance characteristics and/or pseudocapacitance characteristics, and depending on whether the supercapacitor has two same or symmetric electrodes or two different or asymmetric electrodes, supercapacitors can be configured as one of three distinct groups of supercapacitors according to some embodiments.

A first group of supercapacitors has both electrodes configured as pseudo capacitors, where each of the electrodes comprises a transition metal oxide (e.g., manganese oxide or zinc oxide) and is configured to give rise to pseudo capacitance. For example, the metal oxide may be in the form of nanostructures. A second group of supercapacitors has both electrodes configured as EDLCs, where each of the electrodes comprises carbon (e.g., carbon nanotubes) and is configured to give rise to double layer capacitance. For example, the carbon may be formed as nanostructures. A third group of supercapacitors, which may be referred to as hybrid supercapacitors, has one of the electrodes that is configured as a EDLC and the other of the electrodes that is configured a pseudo capacitor. When included as part of a hybrid capacitor, the electrode configured as the pseudo capacitor may serve as a cathode or a positively charged electrode, and the electrode configured as the EDLC may serve as an anode or a negatively charged electrode.

The ESDs fabricated according to various embodiments offer many advantages. For example, some performance metrics of a thin film-based ESD can be dependent on the thicknesses of various layers of the ESD. The thicknesses of various layers of the ESD can in turn be limited by the deposition technique employed to form the layers. For example, the capacity of some thin film-based ESDs can be limited by thicknesses of the electrode layers that contain the electrode active materials. Due to cracking and/or delaminating of the layers, which may result from film stress and/or interfacial energy, the capacity of the ESD may be limited by the thicknesses of the electrode layers that can be reliably deposited. By printing, relatively thicker layers of one or more layers of the ESDs may be achieved. For example, as described by various examples described herein, electrically connected printed layers can be formed on multiple surfaces of a feature and stacked on top of one another. Thus, by employing various structural features and fabrication methods including printing methods described herein, thin film-based ESDs according to embodiments disclosed herein can have higher capacity, among other advantages.

As used herein, an electrode active material refers to a component of an electrode that is chemically associated with the energy storage mechanism. For example, in batteries, an electrode active material is a component of a cathode or an anode that participates in an electrochemical charge or discharge reaction. In supercapacitors, an electrode active material is a component of a cathode or an anode that participates in electrostatic double layer capacitance (EDLC) or electrochemical pseudocapacitance.

Printing one or more layers of the thin film-based ESD may enable customization of the operational current and/or resistance of the ESD. For example, in part because printing allows for higher levels of customization of the shape and thickness of the individual layers, the surface areas of the electrodes that may be available for electrochemical reactions of the ESD device may be customized more easily. Printing one or more layers of the thin film-based ESD allows multiple units of ESDs or cells to be electrically connected in series and/or in parallel, to customize the voltage and/or capacity of the ESD.

Printing one or more layers of the thin film-based ESD may further enable reduction in the overall thickness and/or footprint of various thin film-based devices integrating the thin film-based ESD. This is in part because printing allows for higher levels of customization of the shape and thicknesses of the individual layers.

Printing one or more layers of the thin film-based ESD may further enable reduction in the overall number of process steps. For example, one or more masking steps that may be employed in subtractive patterning techniques may be omitted by printing one or more layers. In addition, by printing different layers laterally and/or simultaneously, the number of overall processing steps can be reduced.

Printing one or more layers of the thin film-based ESD may further enable higher levels of integration with the thin film-based electronic devices powered by the ESD. This may be because similar materials may be used to print different components of the ESD and the electronic device powered by the ESD. Some layers of the ESD and the electronic device may even be printed simultaneously.

As described herein, in various embodiments, some of the layers of the ESD are printed, while in other embodiments, all layers of the ESD are printed. The layers that are not printed may be deposited by a suitable method, including plating, evaporation, sputtering, chemical vapor deposition or any other thin film deposition techniques.

Vertically Stacked Versus Laterally Adjacent Electrode Configurations in Thin Film-Based Energy Storage Devices Generally, thin film-based energy storage devices (ESDs), e.g., printed ESDs, may be categorized based on the relative orientations of the current collectors and/or the electrode layers. The first category of ESDs includes thin film-based energy storage devices having vertically stacked current collectors and electrode layers, and the second category of ESDs includes thin film-based energy storage devices having laterally adjacent current collectors and electrode layers. Both categories of ESDs can be fully printed on a substrate and provide various advantages described above, compared to ESDs in which the current collectors and/or electrodes are formed separately, e.g., on different substrates, and subsequently integrated by adjoining them with a separator disposed therebetween. The ESDs according to various embodiments described herein having laterally adjacent current collectors on the same side of the substrate are advantageous for integrating with other devices on the same substrate, at least because the electrical connections can easily be made, e.g., by printing the current collectors that extend into or contact conductive leads of the integrated device.

FIG. 1 illustrates an example of a thin film-based energy storage device (ESD) 100 having vertically stacked current collectors and electrode layers. The ESD 100 includes a substrate 104 on which a stack of layers is formed. The stack of layers includes a first current collector 108 of a first type formed over or on the substrate 104, a first electrode layer 112 of a first type formed over or on the first current collector 108, a separator 116 formed over or on the first electrode layer 112, a second electrode layer 120 of a second type formed over or on the separator 116 and a second current collector 124 of a second type formed over or on the second electrode layer 120. The ESD 100 may be fabricated in five printing impressions or processes, including sequentially printing the first current collector 108, the first electrode layer 112, the separator 116, the second electrode layer 120 and the second current collector 124.

The first electrode layer 112 has lateral dimensions that are the same or smaller than those of the first current collector 108 such that the first electrode layer 112 if formed laterally within the lateral footprint of the first current collector 108. The separator 116 is formed on the first electrode layer 112 to electrically separate the first current collector 108 and the first electrode layer 112 from the second electrode layer 120 and the second current collector 124. In the illustrated embodiment the separator 116 contacts the first current collector 108 on a first side, extends to encapsulate the first electrode layer 112, and extends on a second side to cover a side surface of the first current collector 108 and to contact the substrate 104. The second electrode layer 120 has lateral dimensions that are the same or smaller than those of the separator 116 such that the second electrode layer 120 extends laterally within the lateral footprint of the separator. The second current collector 124 covers the second electrode layer and extends vertically to cover side surfaces of the second electrode layer 120 and the separator 116 and to contact the substrate 104.

While not shown for clarity, in various embodiments disclosed herein, the first current collector 108 may be electrically connected to further conductive structures, e.g., printed circuit patterns or a first electrical terminal of an electronic device to be powered by the ESD 100, and the second current collector 124 may be electrically connected to further conductive structures, e.g., printed circuit patterns or a second electrical terminal of the device to be powered by the ESD 100. In addition, while not shown for clarity, in various embodiments disclosed herein, thus formed ESD may be covered or encapsulated by protective or passivating layers or structures.

Still referring to FIG. 1, in operation, when a voltage is applied between the first current collector 108 and the second current collector 124, ions may be exchanged between the first electrode layer 112 and the second electrode layer 120 through the separator 116, thereby charging or discharging the ESD 100. Advantageously, a substantial or a predominant portion of the ionic exchange may occur in a vertical direction between overlapping portions of the first electrode layer 112 and the second electrode layer 120. Thus, a larger area of overlap between the first electrode layer 112 and the second electrode layer 120 can lead to higher current during charge/discharge, lower resistance, higher power and/or shorter time to charge.

As described herein, a current collector of a first type refers to one of a positive or a negative current collector, and a current collector of a second type refers to the other of the positive or the negative current collector. Similarly, an electrode of a first type refers to one of a positive or a negative electrode, or one of a cathode or an anode, and an electrode of a second type refers to the other of the positive or the negative electrode, or the other of the cathode or the anode. As described herein, the positive current collector and the electrode correspond to a cathode and the negative current collector and the electrode correspond to an anode. Thus, in FIG. 1, the first current collector 108 and the first electrode layer 112 may be one of a positive or negative current collector and one of a positive or negative electrode, respectively, and the second current collector 124 and the second electrode 120 may be the other of the positive or negative current collector and one of the positive or negative electrode, respectively.

FIG. 2A illustrates a side view of an example of a thin film-based ESD 200 having laterally adjacent current collectors and electrode layers, according to embodiments. FIG. 2B illustrates a plan view of electrode layers of the printed energy storage device illustrated in FIG. 2A. Similar to the ESD 100 illustrated with respect to FIG. 1, the ESD 200 includes a substrate 104, a first current collector 108, a second current collector 124, a first electrode layer 112, a second electrode layer 120 and a separator 116. Unlike the ESD 100 illustrated in FIG. 1, in the ESD 200, the first and second current collectors 108, 124 are formed laterally adjacent to each other over or on the substrate 104 and are separated by a gap 210 in a lateral direction, instead of being vertically separated as in the ESD 100 described above with respect to FIG. 1. The first electrode layer 112 is formed over or on the first current collector 108 and the second electrode layer 120 is formed over or on the second current collector 124. Thus, the first electrode layer 112 and the second electrode layer 120 are also disposed laterally adjacent to each other and separated by the gap 210 in the lateral direction, instead of being vertically separated. The separator 120 is formed over or on to electrically separate the first and second electrode layers 112, 120.

The first electrode layer 112 has lateral dimensions that are about the same or smaller than those of the first current collector 108 such that the first electrode layer 112 is formed laterally within the footprint of the first current collector 108. Similarly, the second electrode layer 120 has lateral dimensions that are about the same or smaller than those of the second current collector 124 such that the second electrode layer 120 is formed laterally within the footprint of the second current collector 124. The separator 116 is formed over or on, e.g., contacts, a first side surface and a second side surface of the first current collector 108 and encapsulates the first electrode 112, and is formed over or on, e.g., contacts, a first side surface and a second side surface of the second current collector 124 and encapsulates the second electrode layer 120. The separator 116 fills the gap 210 formed between the first and second electrode layers 112, 120, thereby electrically separating the side surfaces of the first and second electrode layers 112, 120 facing each other in the lateral direction. The separator 116 also fills the portion the gap 210 formed between the first and second current collectors 108, 124, thereby electrically separating the side surfaces of the first and second current collectors 108, 124 facing each other.

Still referring to FIGS. 2A and 2B, in operation, when a voltage is applied between the first current collector 108 and the second current collector 124, ions may be exchanged between the first electrode layer 112 and the second electrode layer 120 through the separator 116, thereby charging or discharging the ESD 200. Unlike the ESD 100 (FIG. 1), because of the lateral arrangement of the first and second electrode layers 112, 120, a substantial or a predominant portion of the ionic exchange may occur in a lateral direction. The ionic exchange can occur between side surfaces and top surfaces of the first and second electrode layers 112, 120. The relative amounts of ionic current between the side surfaces and the top surfaces can vary depending on the thickness of the layers (and the area of overlap between the side surfaces) and the areas of the top surfaces. When the area of overlap between the side surfaces is relatively large, e.g., a substantial or a predominant portion of the ionic exchange may occur between overlapping portions of the side surfaces of the first electrode layer 112 and the second electrode layer 120 facing each other across the gap 210.

When one or more layers of the ESD 200 are printed, the method of fabricating the ESD 200 includes depositing, e.g., printing, the first current collector 108 and the second current collector 124 that are laterally adjacent and electrically separated over or on a common substrate 104. The first and second current collector layers 108 and 124 can be printed, simultaneously, and can be formed of the same material. After printing the first and second current collectors 108, 124, the first electrode layer 112 and the second electrode layer 120 are deposited, e.g., printed, over or on the respective current collectors 108 and 124, respectively. After printing the first and second electrodes 112, 120, the separator 116 is deposited, e.g., printed, over or on the first and second electrode layers 112, 120. When the first and second current collector layers 108, 124 are simultaneously printed, the illustrated ESD 200 may be fabricated in four deposition steps or printing impressions, including simultaneously printing the first and second current collectors 108, 124, printing the first electrode layer 112, printing the second electrode layer 124 and printing the separator 116.

Thus, compared to the method of fabricating the ESD 100 having vertically stacked electrodes as illustrated in FIG. 1, the ESD 200 having laterally disposed electrodes can advantageously be fabricated, e.g., printed, in fewer process steps, e.g., in as few as four process steps or printing impressions, compared to five process steps or printing impressions used in fabricating the ESD 100 illustrated in FIG. 1.

The thicknesses of the current collectors can vary depending on the application. For example, in some implementations, it may be desirable to have thicker first and second current collectors 108, 124 for lower electrical resistance. In some implementations, it may be desirable to have thicker first and second electrode layers 112, 120 to provide higher capacity. In ESD 200, thicker electrode layers 112, 120 may also provide higher current capability.

In various embodiments described herein, each of the individual layers or the entire ESD can have a thickness in a range of 1-10 microns, 10-50 microns, 50-100 microns, 100-200 microns, 200-300 microns, 300-400 microns, 400-500 microns, 500-600 microns, 600-700 microns, 700-800 microns 800-900 microns, 900-1000 microns, 1000-1200 microns, 1200-1400 microns, 1400-1600 microns, 1600-1800 microns, 1800-2000 microns, or a thickness in a range defined by any of these values.

It will be appreciated that vertical electrode arrangements (e.g., ESD 100 in FIG. 1) and lateral electrode arrangements (e.g., ESD 200 in FIGS. 2A-2B) offer same or different advantages. As discussed above, the ESD 200 (FIGS. 2A-2B) can be fabricated with relatively fewer process steps and can be thinner compared to the ESD 100 (FIG. 1). On the other hand, ESD 100 (FIG. 1) can have a smaller lateral footprint compared to the ESD 200 (FIGS. 2A-2B) for the same capacity and current. Compared to the ESD 100 (FIG. 1), the ESD 200 may advantageously be permitted to have a lower overall device thickness and/or relatively thicker individual layers for similar overall thickness, because the lower overall number of vertically stacked layers may reduce the risk of cracking and/or delamination at the interfaces. On the other hand, the ESD 200 (FIGS. 2A-2B) may have relatively lower current capability compared to the ESD 100 (FIG. 1) because of relatively smaller overlap between electrodes. In the following, various other embodiments and their components that aim to optimize the advantages offered by the two different types of ESDs illustrated with respect to FIG. 1 and FIGS. 2A/2B are described. Compared to the ESD 100 (FIG. 1), the second current collector 124 of the ESD 200 (FIG. 2) does not have relatively long vertical portion extending from the substrate 104, which can reduce the overall resistance of the ESD 200. In addition, when the vertical height of the ESD 100 is relatively high, a mechanical support layer (not shown in FIG. 1) may be provided to support the vertical portion of the second current collector 124 of the ESD 100, which is advantageously not needed in the ESD 200.

Printing Methods for Fabricating Thin Film-Based Energy Storage Devices

One or more layers of the ESDs disclosed herein can be printed from an ink containing the component materials. The one or more layers or the entire ESD device can be printed using a suitable printing technique. Example printing processes that can be used to print the one or more layers include coating, rolling, spraying, layering, spin coating, lamination and/or affixing processes, for example, screen printing, inkjet printing, electro-optical printing, electroink printing, photoresist and other resist printing, thermal printing, laser jet printing, magnetic printing, pad printing, flexographic printing, hybrid offset lithography, gravure and other intaglio printing, die slot deposition, among other suitable printing techniques.

The inks for printing one or more layers of the ESDs disclosed herein can be prepared by combining various ink components, including various active materials associated with the electrochemical reaction of the ESDs with a suitable solvent and/or a binder, and mixing using a suitable techniques such as mixing using a stir bar, mixing with a magnetic stirrer, vortexing (using a vortex machine), shaking (using a shaker), planetary centrifugal mixing, by rotation, three roll milling, ball milling, sonication and mixing using mortar and pestle, to name a few.

After printing the one or more layers using an ink, the one or more layers can be treated using one or more post-printing processes, including drying/curing processes including short wave infrared (IR) radiation, medium wave IR-radiation, hot air conventional ovens, electron beam curing ultraviolet (UV) curing and near infrared radiation, among other techniques.

Compositions and Materials of Layers of Thin Film-Based Energy Storage Devices

In the following, compositions, materials and structures of various layers of thin film ESDs according to embodiments are described.

The thin film-based ESDs comprise various layers formed, e.g., printed, on a substrate 104. The substrate may be formed of a suitable material, which may have attributes such as being flexible or rigid, thermally conductive or insulating, optically transparent or opaque, or organic or inorganic, among other attributes. When the first and second current collectors 108, 124 are directly formed thereon, the substrate 104 is formed of a sufficiently electrically insulating material such that the first and second current collectors 108, 124 are not electrically shorted or the leakage current therebetween is sufficiently low. As described herein, an electrically insulating material refer to a material having negligible electronic carriers such as electrons and holes that may be generated thermally, electrically or optically under ordinary operational conditions, and exclude semiconductor materials such as silicon. However, the substrate 104 may include an electrically conductive or semiconducting material, whose surface region has been rendered sufficiently electrically insulating, e.g., by forming an insulating layer or a coating on a semiconducting or conductive substrate prior to forming the first and second current collectors 108, 124, such that they are not electrically shorted.

Suitable classes of materials that can be included as part of the substrate 104 include, but not limited to, a polymeric material, a textile-based material, a device, a metallic material, a semiconductor material or a cellulose-based material. Specific examples of the substrate 104 include, e.g., a plastic (e.g., polyester, polyimide, polycarbonate), a dielectric (e.g., a metal oxide, metal nitride, metal carbide), a polyester film (e.g., Mylar), a polycarbonate film, a semiconductor (e.g., silicon), a conductor (e.g., an aluminum foil, a copper foil, a stainless steel foil), a carbon foam, or a paper (e.g., a graphite paper, a graphene paper, a cardboard, a coated paper, such as a plastic-coated paper, and/or a fiber paper), or combinations thereof, and/or the like.

According to various embodiments, the first electrode layer 112 may be one of a cathode or an anode and the second electrode layer 120 may include the other of the cathode or the anode. The cathode of an energy storage device may include a cathode electrode active material, such as a silver-containing material or a manganese-containing material. For example, the cathode may include a silver (I) oxide ($Ag_2O$), a silver (I,III) oxide (AgO), a mixture comprising silver (I) oxide ($Ag_2O$) and manganese (IV) oxide ($MnO_2$), manganese (II, III) oxide ($Mn_3O_4$), manganese (II) oxide (MnO), manganese (III) oxide ($Mn_2O_3$), and/or manganese oxyhydroxide (MnOOH), a mixture comprising silver(I) oxide ($Ag_2O$) and nickel oxyhydroxide (NiOOH), silver nickel oxide ($AgNiO_2$), combinations thereof, and/or the like. The anode of an energy storage device may include an anode electrode active material, such as, such as zinc, cadmium, iron, nickel, aluminum, metal hydrate, hydrogen, combinations thereof, and/or the like. In some embodiments, the anode can include zinc powder.

In some embodiments, the thin film-based ESDs disclosed herein may include, e.g., as part of one or more of the first electrode layer 112, the second electrode layer 120 or the separator 116, a non-aqueous electrolyte. The non-aqueous electrolyte may in turn include an organic electrolyte based on acetonitrile, propylene carbonate, ethylene carbonate, diethyl carbonate, dimethyl carbonate, ethyl acetate, 1,1,1,3,3,3-hexafluoropropan-2-ol, adiponitrile, 1,3-propylene sulfite, butylene carbonate, Y-butyrolactone, Y-valerolactone, propionitrile, glutaronitrile, adiponitrile, methoxyacetonitrile, 3-methoxypropionitrile, N,N-dimethylformamide, N,N-dimethylacetamide, N-methylpyrrolidinone, N-methyloxazolidinone, N,N"-dimethylimidazolininone, nitromethane, nitroethane, sulfonate, 3-methylsulfonate, dimethylsulfoxide, trimethyl phosphate, or a mixture thereof, among other organic electrolytes.

In some embodiments, the electrolyte may include an ionic liquid. As described herein, ionic liquids are organic molten salts which consist essentially of ions and are liquid at temperature below 100° C. An ionic liquid has a cation and anion. The ionic liquid according to embodiments can include any combination from the list of cations and the list of anions below.

The cation of the ionic liquid can include one or more of: butyltrimethylammonium, 1-ethyl-3-methylimidazolium, 1-butyl-3-methylimidazolium, 1-methyl-3-propylimidazolium, 1-hexyl-3-methylimidazolium, choline, ethylammonium, tributylmethylphosphonium, tributyl(tetradecyl)phosphonium, trihexyl(tetradecyl)phosphonium, 1-ethyl-2,3-methylimidazolium, 1-butyl-1-methylpiperidinium, diethylmethylsulfonium, 1-methyl-3-propylimidazolium, 1-ethyl-3-methylimidazolium, 1-methyl-1-propylpiperidinium, 1-butyl-2-methylpyridinium, 1-butyl-4-methylpyridinium, 1-butyl-1-methylpyrrolidinium, diethylmethylsulfonium, or a combination thereof.

The anion of the ionic liquid can include one or more of: tris(pentafluoroethyl)trifluorophosphate, trifluoromethanesulfonate, hexafluorophosphate, tetrafluoroborate, ethyl sulfate, dimethyl phosphate, trifluoromethanesulfonate, methansulfonate, triflate, tricyanomethanide, dibutylphosphate, bis(trifluoromethylsulfonyl)imide, bis-2,4,4-(trimethylpentyl) phosphinate, iodides, chlorides, bromides, nitrates, or a combination thereof.

In some embodiments, the electrolyte may further include an electrolyte salt, which may be organic-based, acid-based, base-based or inorganic-based. For example, an organic salt that may be included as part of the electrolyte includes one or more of: tetraethylammonium tetrafluoroborate, tetraethylammonium difluoro(oxalate)borate, methylammonium tetrafluoroborate, triethylmethylammonium tetrafluoroborate, tetrafluoroboric acid dimethyldi ethylammonium, triethylmethylammonium tetrafluoroborate, tetrapropylammonium tetrafluoroborate, methyltributylammonium tetrafluoroborate, tetrabutylammonium tetrafluoroborate, tetrahexylammonium tetrafluoroborate, tetramethylammonium tetrafluoroborate, tetraethyl phosphonium tetrafluoroborate, tetrapropylphosphonium tetrafluoroborate, tetrabutylphosphonium, tetrafluoroborate or a combination thereof.

An acid-based electrolyte that may be included as part of the electrolyte includes one or more of $H_2SO_4$, HCl, $HNO_3$, $HClO_4$, a combination thereof and the like.

A base-based electrolyte that may be included as part of the electrolyte includes one or more of KOH, NaOH, LiOH, $NH_4OH$, a combination thereof and the like.

An inorganic-based salt that may be included as part of the electrolyte includes one or more of LiCl, $Li_2SO_4$, $LiClO_4$, NaCl, $Na_2SO_4$, $NaNO_3$, KCl, $K_2SO_4$, $KNO_3$, $Ca(NO_3)_2$, $MgSO_4$, $ZnCl_2$, $Zn(BF_4)_2$, $ZnNO_3$, a combination thereof and the like.

Embodiments are not limited to organic electrolytes or ionic liquids. In other embodiments, the ESDs according to embodiments includes an aqueous electrolytes based on water.

In some embodiments, a low viscosity additive may be added to the electrolyte. The low viscosity additive that may be included as part of the electrolyte includes one or more of water, alcohols such as methanol, ethanol, N-propanol (including 1-propanol, 2-propanol (isopropanol or IPA), 1-methoxy-2-propanol), butanol (including 1-butanol, 2-butanol (isobutanol)), pentanol (including 1-pentanol, 2-pentanol, 3-pentanol), hexanol (including 1-hexanol, 2-hexanol, 3-hexanol), octanol, N-octanol (including 1-octanol, 2-octanol, 3-octanol), tetrahydrofurfuryl alcohol (THFA), cyclohexanol, cyclopentanol, terpineol; lactones such as butyl lactone; ethers such as methyl ethyl ether, diethyl ether, ethyl propyl ether, and polyethers; ketones, including diketones and cyclic ketones, such as cyclohexanone, cyclopentanone, cycloheptanone, cyclooctanone, acetone, benzophenone, acetylacetone, acetophenone, cyclopropanone, isophorone, methyl ethyl ketone; esters such ethyl acetate, dimethyl adipate, proplyene glycol monomethyl ether acetate, dimethyl glutarate, dimethyl succinate, glycerin acetate, carboxylates; carbonates such as propylene carbonate; polyols (or liquid polyols), glycerols and other polymeric polyols or glycols such as glycerin, diol, triol, tetraol, pentaol, ethylene glycols, diethylene glycols, polyethylene glycols, propylene glycols, dipropylene glycols, glycol ethers, glycol ether acetates, 1,4-butanediol, 1,2-butanediol, 2,3-butanediol, 1,3-propanediol, 1,4-butanediol, 1,5-pentanediol, 1,8-octanediol, 1,2-propanediol, 1,3-butanediol, 1,2-pentanediol, etohexadiol, p-menthane-3,8-diol, 2-methyl-2,4-pentanediol; tetramethyl urea, n-methylpyrrolidone, acetonitrile, tetrahydrofuran (THF), dimethyl formamide (DMF), N-methyl formamide (NMF), dimethyl sulfoxide (DMSO); thionyl chloride; sulfuryl chloride, or a combination thereof. Among other advantages, the low viscosity additive may improve the spreading speed of the electrolyte when being printed. It will be appreciated that the disclosed additives can be substantially electrochemically stable in combination of various printed electrochemical reactants described herein.

In some embodiments, the electrolyte includes a surfactant. For example, the surfactant may be nonionic. The nonionic surfactant that may be included as part of the electrolyte includes one or more of cetyl alcohol, stearyl alcohol, and cetostearyl alcohol, oleyl alcohol, polyoxyethylene glycol alkyl ethers, octaethylene glycol monododecyl ether, glucoside alkyl ethers, decyl glucoside, polyoxyethylene glycol octylphenol ethers, Triton® X-100 (sold by Sigma-Aldrich®), nonoxynol-9, glyceryl laurate, polysorbate, poloxamers, or a combination thereof. Among other advantages, the surfactant may improve the spreading speed of the electrolyte when being printed. It will be appreciated that the disclosed additives can be substantially electrochemically stable in combination of various printed electrochemical reactants described herein.

In some embodiments, the separator may include a filler material. The filler material may include one or more of diatom frustules, zeolites, cellulose fibers, fiberglass, alumina, silica gel, molecular sieve carbon, natural-clay based solids, polymeric absorbents or a combination thereof, among other filler materials.

In some embodiments, the separator may include a polymer binder. The polymer binder may include one or more of polymers (or equivalently, polymeric precursors or polymerizable precursors) such as polyvinyl pyrrolidone (PVP), polyvinyl alcohol (PVA), polyvinylidene fluoride, polyvynylidene fluoride-trifluoroethylene, polytetrafluoroethylene, polydimethylsiloxane, polyethelene, polypropylene, polyethylene oxide, polypropylene oxide, polyethylene glycol-hexafluoropropylene, polyethylene terefphtalatpolyacrylonitryle, polyvinyl butyral, polyvinylcaprolactam, polyvinyl chloride; polyimide polymers and copolymers (including aliphatic, aromatic and semi-aromatic polyimides), polyamides, polyacrylamide, acrylate and (meth)acrylate polymers and copolymers such as polymethylmethacrylate, polyacrylonitrile, acrylonitrile butadiene styrene, allylmethacrylate, polystyrene, polybutadiene, polybutylene terephthalate, polycarbonate, polychloroprene, polyethersulfone, nylon, styrene-acrylonitrile resin; polyethylene glycols, clays such as hectorite clays, garamite clays, organomodified clays; saccharides and polysaccharides such as guar gum, xanthan gum, starch, butyl rubber, agarose, pectin; celluloses and modified celluloses such as hydroxyl methylcellulose, methylcellulose, ethyl cellulose, propyl methylcellulose, methoxy cellulose, methoxy methylcellulose, methoxy propyl methylcellulose, hydroxy propyl methylcellulose, carboxy methylcellulose, hydroxy ethylcellulose, ethyl hydroxyl ethylcellulose, cellulose ether, cellulose ethyl ether, chitosan, or a combination thereof.

It will be appreciated that, while not illustrated for clarity, a protective film may be formed on top of various ESDs disclosed herein to provide mechanical, electrical and chemical protection to the ESDs from the outside world. The protective film may be, e.g., laminated or printed. While the packaging of the ESDs are not discussed for brevity, it will be appreciated that the packaging forms an integral part of the thin film-based ESDs and thus part of finished products.

Thin Film-Based Energy Storage Device Configurations

As described above with respect to FIGS. 1 and 2A/2B, thin film-based ESDs include two general types, namely thin film-based ESDs having vertically stacked electrode layers and current collectors, such as the example ESD 100 described above with respect to FIG. 1, and thin film-based ESDs having laterally adjacent current collectors and electrodes, such as the example ESD 200 described above with respect to FIGS. 2A/2B. As discussed above, each of the two general types of thin film-based ESDs can have certain advantages over the other of the two types of thin film-based ESDs. For example, ESDs having laterally disposed current collectors and electrodes can be advantageous for being capable of being printed in fewer number of impressions or process steps and accommodating greater layer thicknesses of the electrodes and/or current collectors. On the other hand, ESDs having vertically disposed electrode layers and current collectors can be advantageous for higher current capability due to larger areas of overlap between opposing electrode layers and a shorter travel distance therebetween for ions. In the following, various embodiments of the two general types of thin film-based ESDs are disclosed, which can offer these and other advantages based in part on the physical arrangements of their component layers.

In various thin film-based ESDs, relative volumes and/or masses of electrode active materials maybe adjusted to be different between electrode active materials of opposite polarities for several reasons. For example, in thin film-based ESDs such as batteries that involve electrochemical reactions, relative amounts of first and second electrode active materials, e.g., cathode and anode active materials, may be adjusted to be different based on the electrochemical reaction underlying the ESDs. For example, in thin film-based ESDs where a ratio between the amounts of the first electrode active material and the second electrode active material that participate in an electrochemical reaction is about 1:1 on a molar basis, the first and second electrode active materials may be disposed in respective electrode layers at a ratio of about 1:1 on a molar basis. However, in thin film-based ESDs where the ratio of the amounts of the first electrode active material and the second electrode active material that participate in the electrochemical reaction is greater/less than 1:1 on a molar basis, or due to various other structural and material differences between the first and second electrode active materials, the relative volumes and/or masses of the first and second electrode active materials may be adjusted to be significantly different. In various embodiments, the volumes and/or the masses of the electrode active materials can be adjusted by adjusting the areas and/or the thickness of the electrodes. FIGS. 3A and 3B illustrate a thin film-based ESD 300 in which the volumes and/or masses of the active materials of the first and second electrode layers 112, 120 can be adjusted by adjusting at least the surface areas of the first and second electrode layers 112, 120.

FIG. 3A illustrates a side view of a thin film-based energy storage device 300 having asymmetric laterally adjacent current collectors and electrode layers, where the ratio of surface areas between the first and second electrode layers is adjusted in accordance with a molar ratio of the active materials. FIG. 3B illustrates a plan view of electrode layers of the thin film-based energy storage device illustrated in FIG. 3A. Similar to the ESD 200 illustrated with respect to FIGS. 2A and 2B, the ESD 300 includes first and second current collectors 108, 124 are formed laterally adjacent to each other on a substrate 104 and are separated by a gap 210 in a lateral direction. The ESD 300 additionally includes a first electrode layer 112 and a second electrode layer 120 formed over or on the first current collector 108 and the second current collector 124, respectively, and are also formed laterally adjacent to each other and separated by the gap 210 in the lateral direction. The separator 120 is formed over or on the first and second electrodes 112, 120. Unlike the ESD 200 of FIGS. 2A and 2B, however, the lateral footprints or the surface areas of the first and second electrode layers 112, 120 are different and asymmetric. In particular, the proportion of the surface areas of the first and second electrode layers 112, 120 is adjusted according to the stoichiometric ratios of the electrode active materials of the first and second electrodes, e.g., cathode and anode active materials, according to the underlying electrochemical reaction, as described above. For example, when the ratio of the amounts of the first and second electrode active materials, e.g., cathode and anode active materials, involved in the underlying electrochemical reaction is 1:1 on a molar basis, a ratio $V_1/V_2$ between a first volume $V_1$ of the first electrode layer 112 containing the first electrode active material and a second volume $V_2$ of the second electrode layer 120 containing the second electrode active material may be proportional to a ratio $m_1/m_2$ of the first molar mass $m_1$ of the first electrode active material to the second molar mass $m_2$ of the second electrode active material, and to a ratio $\rho_2/\rho_1$ of the second density $\rho_2$ of the second electrode active material to the first density $\rho_1$ of the second electrode active material. To adjust the ratio $V_1/V_2$, in some implementations, the surface areas of the first and second electrode layers 112, 120 are adjusted while keeping their thicknesses relatively constant. In these implementations, when the ratio of the first and second electrode active materials, e.g., cathode and anode active materials, involved in an electrochemical reaction is 1:1 on the basis a molar ratio, in geometries where the first and second electrode layers 112, 120 can be approximated as rectangular slabs having approximately the same thicknesses, a ratio $A_1/A_2$ between a first surface area $A_1$ of the first electrode layer 112 and a second surface area $A_2$ of the second electrode layer 120 may be proportional to the ratio $m_1/m_2$ and to the ratio $\rho_2/\rho_1$.

Still referring FIGS. 3A/3B, the first electrode layer comprises a first electrode active material and the second electrode layer comprises a second electrode active material, wherein a molar ratio between the first electrode active material and the second electrode active material is between 0.1 and 0.4, 0.4 and 0.7, 0.7 to 1.0, 1.0 to 1.3, 1.3 to 1.6, 1.6 to 1.9, 1.9 to 2.2, 2.2 to 2.5, 2.5 to 2.8, 2.8 to 3.1, 3.1 to 3.4, 3.4 to 3.7, 3.7 to 4.0, 4.0 to 4.3, or in a range defined by any of these values, where the molar ratio can correspond to the underlying electrochemical reaction of the ESD. For example, as an illustrative example, when the ESD comprises an alkaline battery in which the first electrode active material comprises zinc and the second electrode active material comprises $MnO_2$, the molar ratio between the first electrode active material and the second electrode active material can be nominally about 0.5, e.g., between about 0.4 and 0.7. In another illustrative example, when the ESD comprises an alkaline battery in which the first electrode active material comprises zinc and the second electrode active material comprises $Ag_2O$, the molar ratio between the first electrode active material and the second electrode active material can be nominally about 1.0, e.g., between about 0.7 and 1.3.

Figure 4:
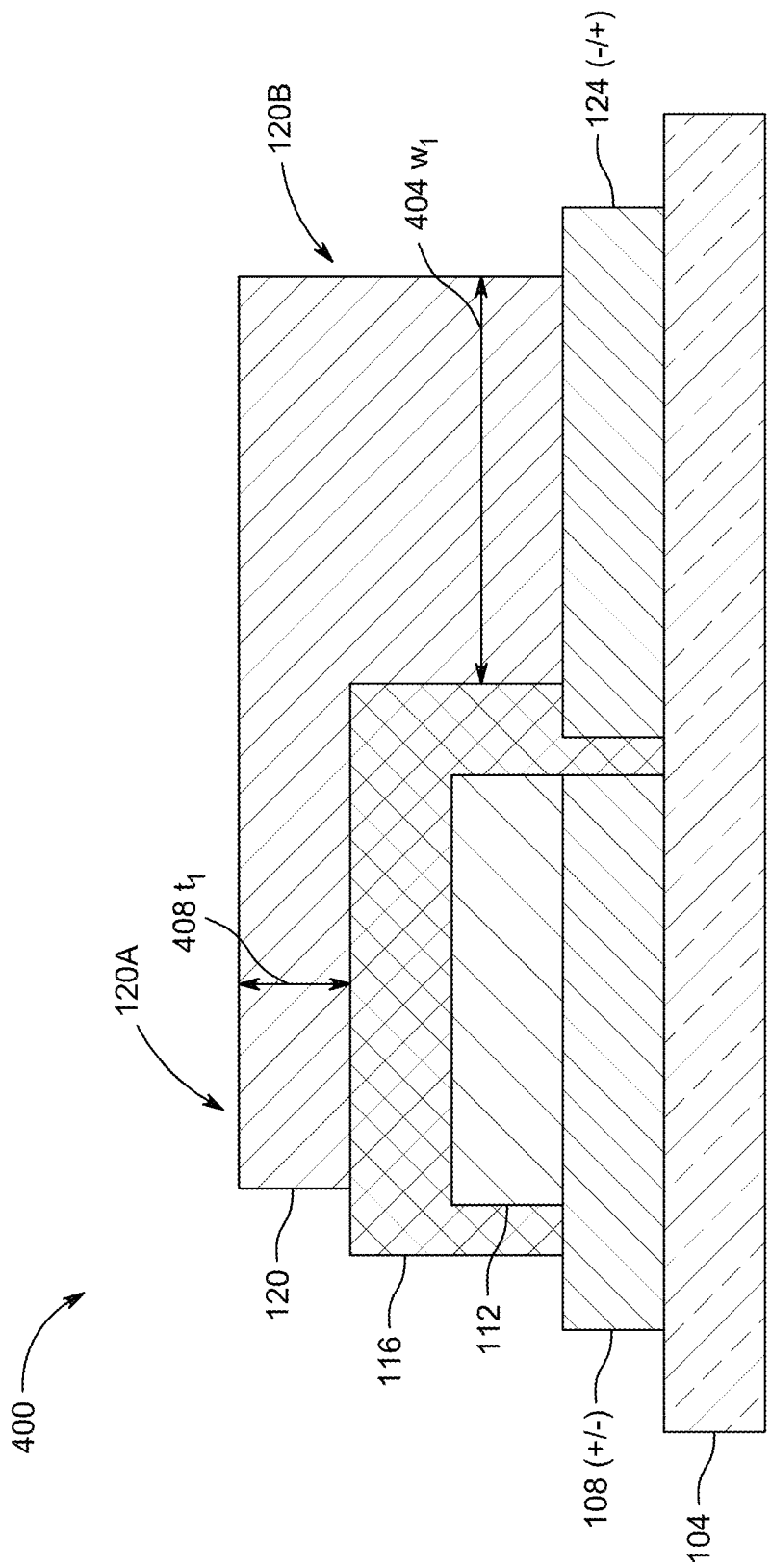
FIG. 4 illustrates a side view of a thin film-based energy storage device having laterally adjacent current collectors and electrode layers that have overlapping portions in the vertical direction.

In various thin film-based ESDs such as batteries that involve electrochemical reactions, it may be desirable to shorten the distance of travel of the ions involved in the underlying electrochemical reaction between the electrode active materials of the first and second electrode layers 112, 120, while limiting the number of deposition steps or printing impressions low, e.g., four steps or impressions. It may also be desirable to increase the area of overlap between the first and second electrode layers 112, 120 to increase the current while and keeping the degrees of freedom with respect to being able to adjusting the volumes of electrode active materials as described above with respect to FIG. 3. To address these and other needs, an ESD can be configured as a thin film-based ESD 400 illustrated with respect to FIG. 4, according to embodiments. FIG. 4 illustrates a side view of a thin film-based ESD 400 having laterally adjacent current collectors and electrode layers that have overlapping portions in the vertical direction. Similar to the ESD 300 illustrated with respect to FIGS. 3A/3B, the ESD 400 includes a first current collector 108 and a second current collector 124 formed over or on a substrate 104 and adjacently disposed and separated by a gap in a lateral direction. Also similar to the ESD 300 (FIGS. 3A, 3B), the ESD 400 has a first electrode 112 formed over the first current collector 108. However, unlike the ESD 300 illustrated in FIGS. 3A/3B, in the ESD 400, the separator 116 is formed on or over the first electrode layer 112 and the first current collector 108, prior to forming the second electrode 120, while leaving a portion of the second electrode 124 exposed for forming thereon the second electrode layer 120. Thereafter, the second electrode 120 is formed over the separator 116 and over the second current collector 124. The second electrode layer 120 comprises a base portion 120B extending from the second current collector 124 in a vertical direction and a lateral extension portion 120A laterally extending from the base portion in the lateral direction to overlap the first electrode layer 112. The base portion 120B and the lateral extension portion 120A directly contacts the vertical and lateral surfaces of the separator 116. The electrode configuration of the ESD 400 offers various advantages.

In operation, when a voltage is applied between the first current collector 108 and the second current collector 124, ions may be exchanged between the first electrode layer 112 and the second electrode layer 120 through the separator 116, thereby charging or discharging the ESD 400. Advantageously, a substantial or a predominant portion of the ionic exchange may occur in a vertical direction between overlapping portions of the first electrode layer 112 and the second electrode layer 120. Thus, advantageously, in a similar manner as described above with respect to the ESD 100 of FIG. 1, the area of overlap between the first electrode 112 and the second electrode 120 can be controlled to adjust the amount of ionic current during charge/discharge. For example, by substantially laterally overlapping the lateral extension portion 120A of the second electrode layer 120 and the first electrode layer 112, the overlapping area available of ionic conduction between the first and second electrode layers 112 and 120 can be correspondingly increased, thereby enabling higher current, higher power and/or faster charging of the ESD. 400

In addition to the higher ionic current, the electrode configuration of the ESD 400 can advantageously allow for flexible adjustment of the relative amounts or volumes of the first and second electrode layers 112, 120 according to a stoichiometric ratio of the respective electrode active materials involved in the underlying electrochemical reaction of the ESD 400. For example, depending on the volume (area and thickness) of the first electrode layer 108 formed on the first current collector 108, the amount of the second electrode layer 120 can be adjusted by adjusting the width ($w_1$) 404 of the base portion 120B as well as the thickness ($t_1$) 408 of the lateral extension portion 120A.

The inventors have discovered that the electrode configuration of the ESD 400 can be optimized to enhance the ionic conduction between the first and second electrode layers 108, 120, as well as the electronic conduction in the second electrode 120 by adjusting a ratio between the width ($w_1$) 404 of the base portion 120B and the thickness ($t_1$) 408 of the lateral extension portion 120A. In various embodiments, an effective ratio $w_1/t_1$ for obtaining various desirable operational parameters described herein, including the current and voltage of the ESD, can be in a range defined by any of two of 1:1, 2:1, 3:1, 4:1, 5:1, 6:1, 7:1, 8:1, 9:1 and 10:1 or greater.

As described above, the capacity of an ESD can depend on, among other things, the volumes of the electrode layers. One way to increase the capacity is to increase the volumes of the electrode layers, for a given thickness, by increasing the coverage areas of the electrode layers. However, increasing the coverage areas of the electrode layers, may not be desirable or practical, as increasing the coverage areas of some thin film-based ESDs, e.g., ESDs having laterally adjacent electrode layers such as the ESD 200 described above with FIGS. 2A/2B, directly increases the overall device footprint. One way to increase the battery capacity without increasing the overall device footprint, is to deposit thicker electrode layers. However, it will be appreciated that, thicker electrode layers can be more prone to cracking or delamination due to, the film stress that is proportional to the film thickness. The cracks or delamination can cause various problems, e.g., reduction in battery capacity, as well as safety concerns. In the following, various configurations of ESDs are described, which can increase the capacity of the ESD while mitigating one or more of these potential downsides.

Figure 5:
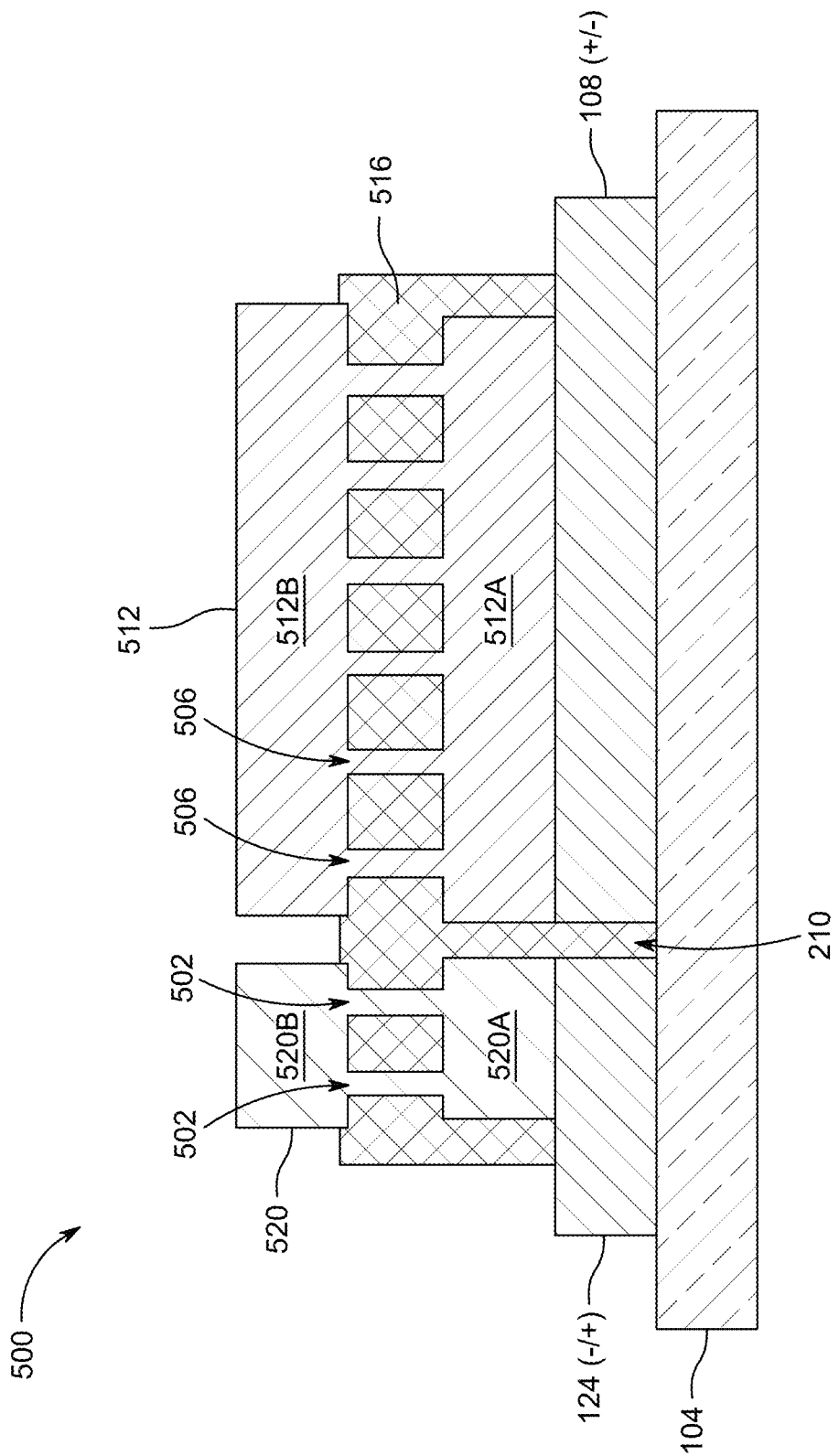
FIG. 5 illustrates a side view of a having laterally adjacent current collectors and electrode layers, where the electrode layers are formed on opposing major surfaces of a perforated separator, for increased capacity without increasing the overall lateral footprint of the thin film-based energy storage device.
Figure 6:
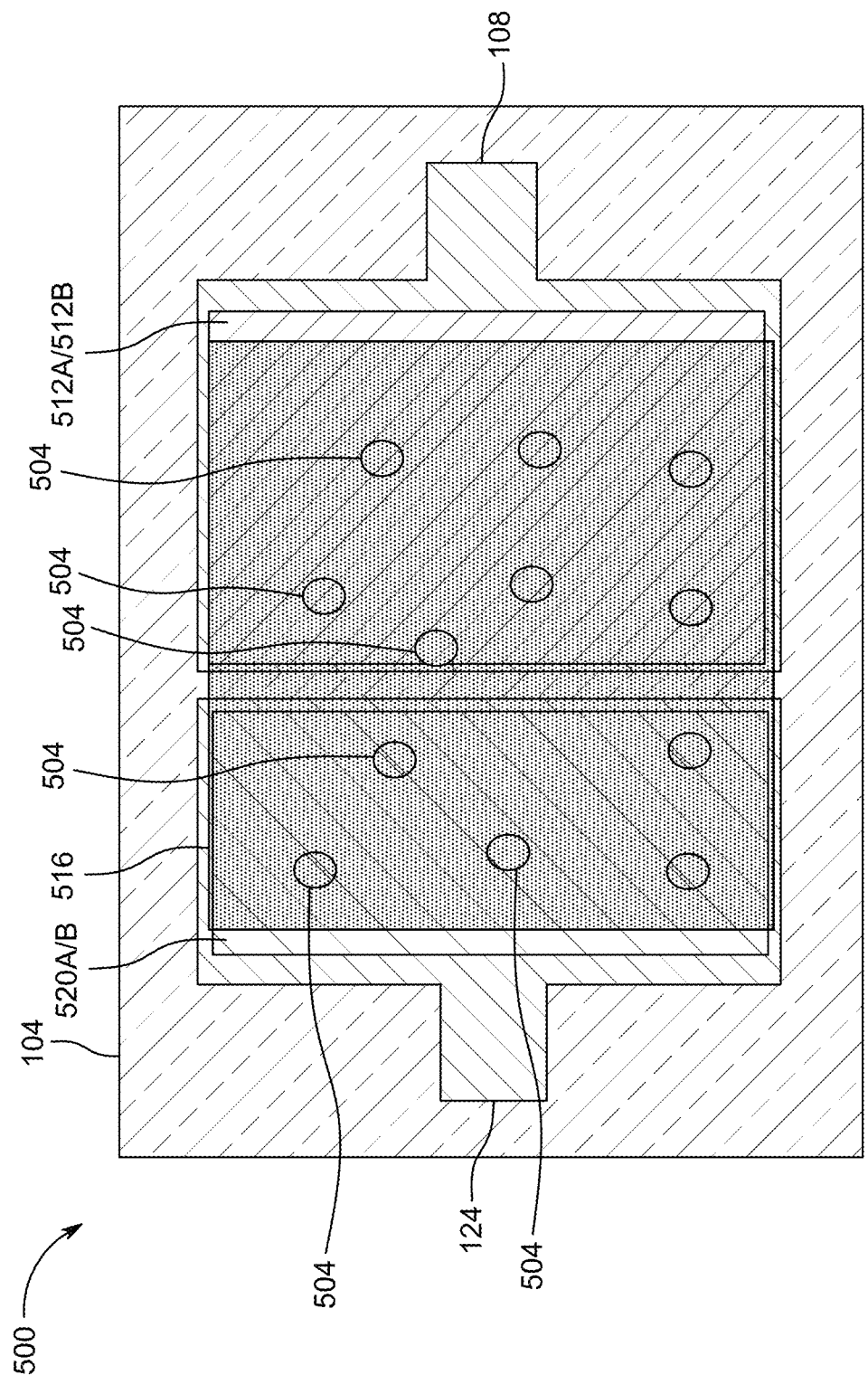
FIG. 6 illustrates a plan view of thin film-based energy storage device illustrated in FIG. 5.

FIG. 5 illustrates a side view of a thin film-based energy storage device (ESD) 500 having laterally adjacent current collectors and electrode layers, where the electrode layers are formed on opposing major surfaces of a perforated separator, for increased capacity without increasing the overall lateral footprint of the thin film-based ESD. FIG. 6 illustrates a plan view of thin film-based energy storage device illustrated in FIG. 5. In particular, to further increase the capacity of the ESD by increasing the volume and/or mass of the electrode layers, the ESD 500 comprises one or both of the first and second electrodes 512, 520 that are formed on opposing sides of a perforated separator 516. The ESD 500 has various features that are analogous to the ESD 300 (FIGS. 3A/3B) described above, including adjacently disposed first and second current collectors 108, 124 formed over or on a substrate 104, first and second electrodes 512A, 520A adjacently formed thereover or thereon, respectively, and the separator 516 that is formed over or on the first and second electrode layers 512A, 520A. The details of features that are analogous to those described with respect to FIGS. 3A/3B are omitted herein for brevity. Similar to the ESD 300 described above, the first and second electrode layers 512A, 520A are formed between the separator 516 and the first and second current collectors 108, 124, respectively. The capacity of ESD 500 can be adjusted by adjusting the respective lateral coverage areas of the first and second electrode layers 512A, 520A. However, unlike the ESD 300 (FIGS. 3A/3B), the separator 516 comprises perforations or openings 506 formed therethrough over the first electrode layer 512A and perforations or openings 502 formed therethrough over the second electrode layer 520A. In addition, additional first and second electrode layers 512B, 520B are formed over or on the outer surface of the separator 516. Thus, the first electrode 512 comprises first and additional first electrode layers 512A, 512B formed on opposing sides of the separator 516, and the second electrode 520 comprises second and additional second electrode layers 520A, 520B formed on opposing sides of the separator 516. The two layers of each of the first and second electrodes 512, 520 can be formed by, e.g., depositing or printing twice, once on the respective ones of the current collectors 108, 124, and a second time on the separator 516. To provide electrical and ionic continuity between the electrode layers and the additional electrode layers, the openings or perforations 502 may be filled when the additional second electrode layer 520B is deposited or printed, and the openings or perforations 506 may be filled when the additional first electrode layer 512B is deposited or printed. The first electrode active material of the first electrode 512 fills the perforations 506 to electrically connect the first and additional electrode layers 512A, 512B of the first electrode 512 formed on opposing sides of the separator 516, and the second electrode active material of the second electrode 520 fills the perforations 502 to electrically connect the second and additional second electrode layers 520A, 520B of the second electrode layer formed on opposing sides of the separator 516. Thus, as configured, relative to ESD configurations in which the electrode layers are formed only on one side of the separator (e.g., ESD 300 of FIG. 3), the ESD 500 can have higher capacity for the same lateral footprint of the ESD 500. For example, if the combined volumes and/or masses of the electrode active materials of the first and second electrodes 512, 520 are doubled with respect to those of the ESD 300 (FIGS. 3A/3B), the capacity can approximately be correspondingly doubled. In addition, because the individual layer thicknesses of electrode layers are not proportionally increased, the built-up stress in the electrode layers can be kept at relatively low values, thereby achieving the higher capacity without a proportionally increased risk of cracking or delamination.

Still referring to FIG. 5, it will be appreciated that the shape and density of the openings or perforations 502, 506 may be adjusted to sufficiently facilitate the electronic and ionic conduction between the electrode layers on the opposing sides of the separator 516. Furthermore, the shape and size of the openings or perforations 502, 506 may be suitably selected depending on the printing process employed. The shape and size of the openings or perforations 506 may be suitably selected such that, when the additional first electrode layer 512B is printed on the separator 516, the perforations or openings 506 are sufficiently filled with the ink of the addition first electrode layer 512B. Similarly, the shape and size of the openings or perforations 502 may be suitably selected such that, when the additional second electrode layer 520B is printed on the separator 516, the perforations or openings 506 are sufficiently filled with the ink of the addition first electrode layer 512B. For example, the openings or perforations 502, 506 may have an average size of 0.1 mm to 0.5 mm, 0.5 mm to 1.0 mm, 1.0 mm to 1.5 mm, 1.5 mm to 2.0 mm, 2.0 mm to 2.5 mm, 2.5 mm to 3.0 mm, 3.0 mm to 3.5 mm, 3.5 mm to 4.0 mm, 4.0 to 4.5 mm, 4.5 mm to 5.0 mm, or in a range defined by any of these values. The openings or perforations 502, 506 may further be formed such that an average inter-opening distance may be average size ranging from 0.5 mm to 1.0 mm, 1.0 mm to 1.5 mm, 1.5 mm to 2.0 mm, 2.0 mm to 2.5 mm, 2.5 mm to 3.0 mm, 3.0 mm to 3.5 mm, 3.5 mm to 4.0 mm, 4.0 to 4.5 mm, 4.5 mm to 5.0 mm, or in range defined by any of these values. The openings or perforations 502, 506 may have any suitable shape such as polygonal or circular shapes. Other opening sizes, inter-opening distances and shapes are also possible.

Figure 7:
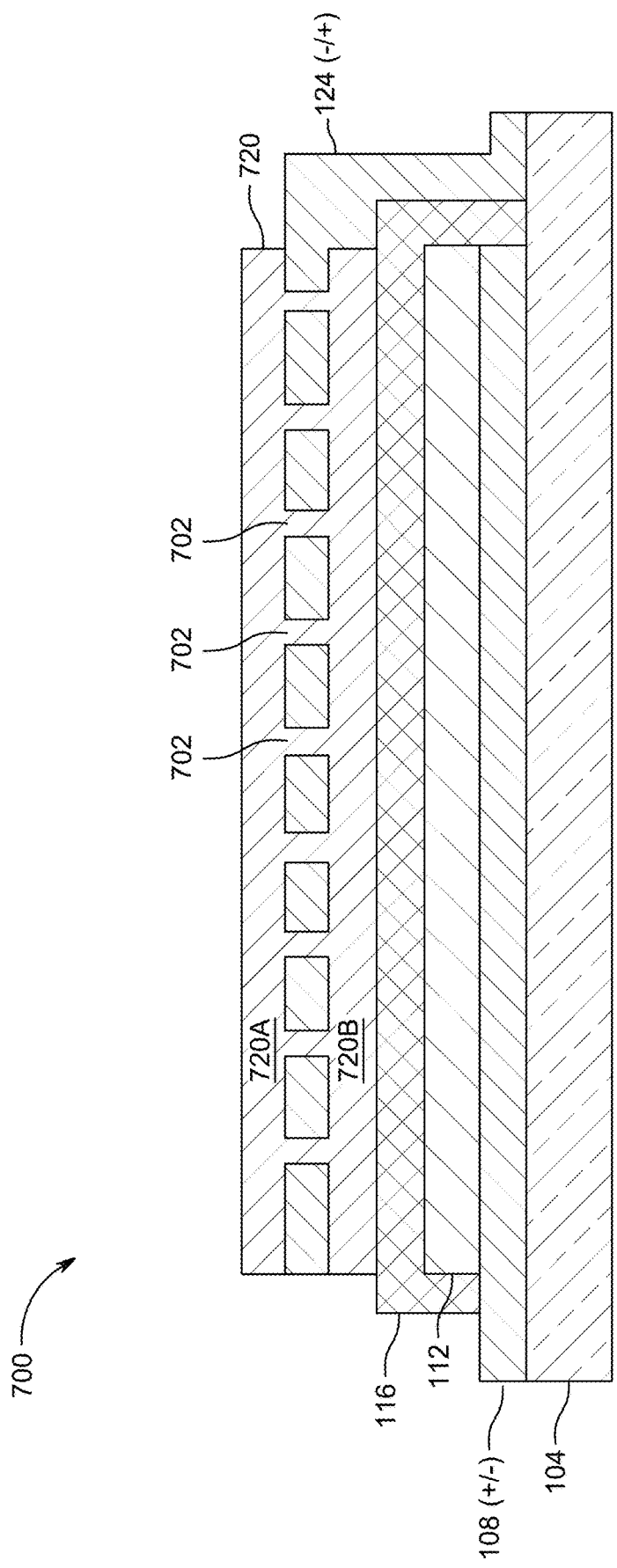
FIG. 7 illustrates a side view of a thin film-based energy storage device having vertically stacked current collectors and electrode layers, where one of the current collectors has perforations formed therethrough, and has opposing major surfaces having electrode layers formed thereon, for increased capacity without increasing the overall lateral footprint of the thin film-based energy storage device.

As described above, volumes and/or masses of the electrode active materials of the first and/or second electrode layers of a thin film-based ESD can be increased for a given area by forming electrode layers on both sides of a perforated separator. In a similar manner, the volumes and/or masses of the first and/or second electrode layers of a thin film-based ESD can be increased for a given area by forming electrode layer one or both sides of a current collector, e.g., a perforated current collector. FIG. 7 illustrates a side view of a thin film-based energy storage device 700 having current collectors and electrode layers that are vertically stacked, where electrode layers are formed on opposing major surfaces of a current collector, e.g., a perforated current collector, for increased capacity without increasing the overall lateral footprint of the thin film-based ESD. The ESD 700 has some features that are analogous to the ESD 100 (FIG. 1) described above, including the relative arrangements of different layers including a substrate 104 on which a first current collector 108, a first electrode layer 112, a separator 116, a second electrode 720 and a second current collector 124 are formed in a stack configuration. The details of features that are analogous to those of FIG. 1 are omitted herein for brevity. Similar to the ESD 100 described above, the second electrode layer 720B is formed between the separator 116 and the second current collector 124. The capacity of ESD 700 can be adjusted by adjusting the respective lateral coverage areas of the first and second electrode layers 112, 720B. However, unlike the ESD 100 (FIG. 1), the second electrode 720 comprises an additional second electrode layer 720A formed over or on the outer surface of the second current collector 124. Thus, the second electrode 720 comprises the second electrode layer 720B and the additional second electrode layer 720A that are formed on opposing sides of the second current collector 124, which may be perforated. The two layers of the second electrode 720 can be formed by, e.g., depositing or printing twice, once on the separator 116 and a second time on the second current collector 124. To provide electrical and ionic continuity between the second electrode layer 720B and the additional second electrode layer 720A, the second current collector 124 has a plurality of openings or perforations 702 that are formed therethrough. The openings or perforations 702 may be filled when the additional second electrode layer 720A is deposited or printed, thereby allowing for electron and ionic transfer between the second electrode layer 720B and the additional second electrode layer 720A of the second electrode 720 that are formed on opposing sides of the second current collector layer 124. Thus, as configured, relative to ESD configurations in which the electrode layers are formed only on one side of the current collector (e.g., ESD 100 of FIG. 1), the ESD 700 can have higher capacity for the same lateral footprint of the ESD. In addition, because the individual layer thicknesses of the second electrode layer 720B and the additional second electrode layer 720A are not proportionally increased, the built-up stress in the electrode layers can be kept at relatively low values, thereby achieving the higher capacity without a proportionally increased risk of cracking or delamination.

The openings or perforations 702 can have the shape, density and size that are similar to those described above with respect to FIGS. 5 and 6.

Figure 8:
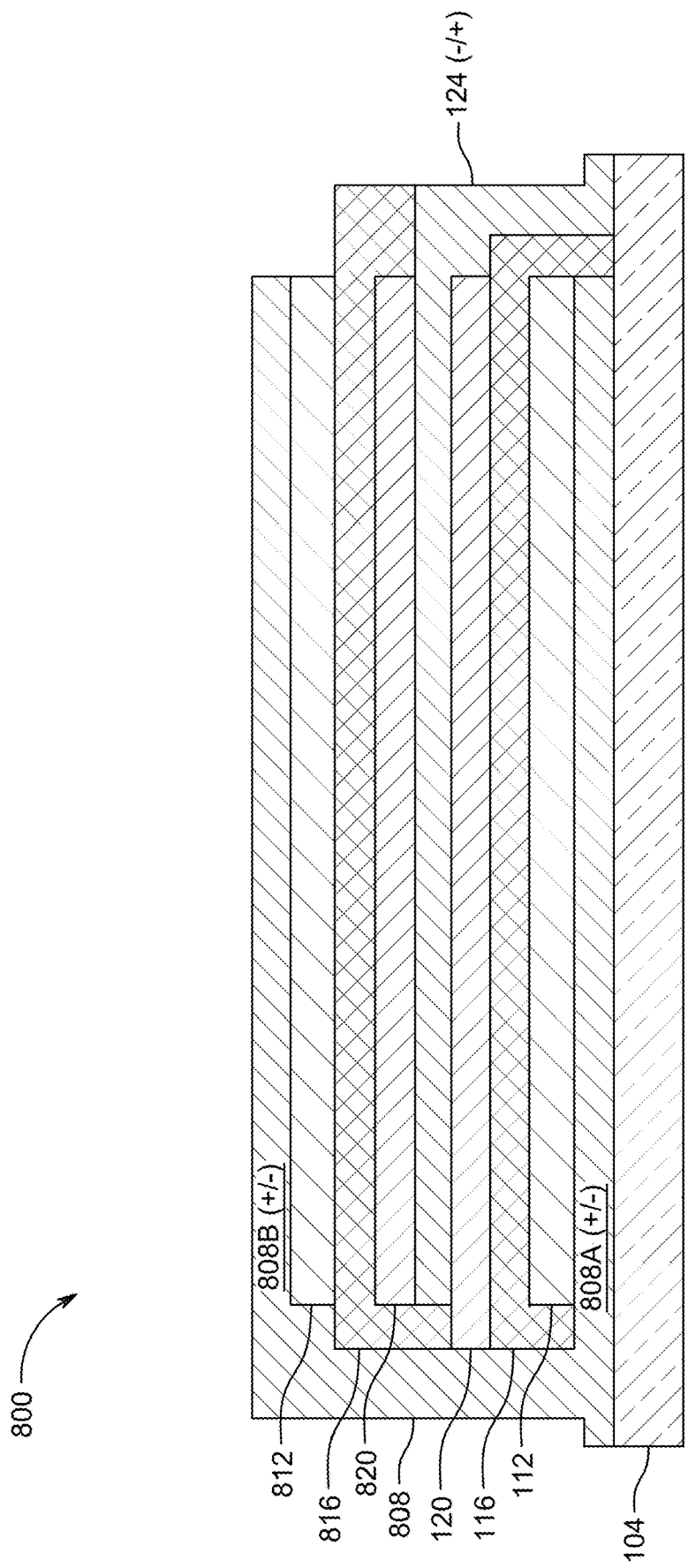
FIG. 8 illustrates a side view of a thin film-based energy storage device having vertically stacked current collectors and electrode layers, where two first electrode layers, two second electrode layers and two separators are configured as two energy storage devices electrically connected in parallel, for increased capacity without increasing the overall lateral footprint of the thin film-based energy storage device.

In some embodiments, the capacity of the ESD can be increased without increasing the device footprint by stacking a plurality of first and second electrode layers to form more than one ESD unit or cell, and electrically connecting then in parallel. FIG. 8 illustrates a side view of a thin film-based energy storage device 800 having vertically stacked current collectors and electrode layers, where two first electrode layers, two second electrode layers and two separators are configured as two energy storage devices electrically connected in parallel, for increased capacity without increasing the overall lateral footprint of the thin film-based ESD. The ESD 800 has some features that are analogous to the ESD 100 (FIG. 1) described above, including a substrate 104 on which a first portion 808A of a first current collector 808, a first electrode layer 112 a first separator 116, a second electrode layer 120 and a second current collector 124 are successively formed in a stack configuration. The details of stack that are analogous to those of FIG. 1 are omitted herein for brevity. Unlike the ESD 100 (FIG. 1), the ESD 800 additionally includes additional successively formed layers including an additional second electrode layer 820, a second separator 816 and an additional first electrode layer 812, and a second portion 808B of the first current collector 808 are further successively formed as a stack. The first and second portions 808A, 808B are electrically connected as a single first current collector 808 on which the first and additional first electrode layers 112, 812 are formed. The second and additional second electrode layers 120, 820 are formed on the second current collector 124, which are separated from the first and additional first electrode layers 112, 812 by the first and second separators 116, 816, respectively. Thus, as configured, the ESD 800 comprises two ESD units or cells formed on opposing sides of the second current collector 124 that are electrically connected in parallel. Thus, relative to ESD configurations in which a single stack of layers is formed (e.g., ESD 100 of FIG. 1), the ESD 800 can have higher capacity for the same lateral footprint of the ESD. In addition, because the individual layer thicknesses of the first and second electrode layers 112, 120 and the additional first and second electrode layers 812, 820 are not proportionally increased, the built-up stress in the electrode layers can be kept at relatively low values, thereby achieving the higher capacity without a proportionally increased risk of cracking or delamination.

Still referring to FIG. 8, in other embodiments, while not illustrated, the capacity of the ESD 800 can be further increased by configuring the second portion 808B of the first current collector 808 to have perforations or openings formed therethrough, in a similar manner as described above with respect to the second current collector 124 of the ESD 700 of FIG. 7.

Figure 9:
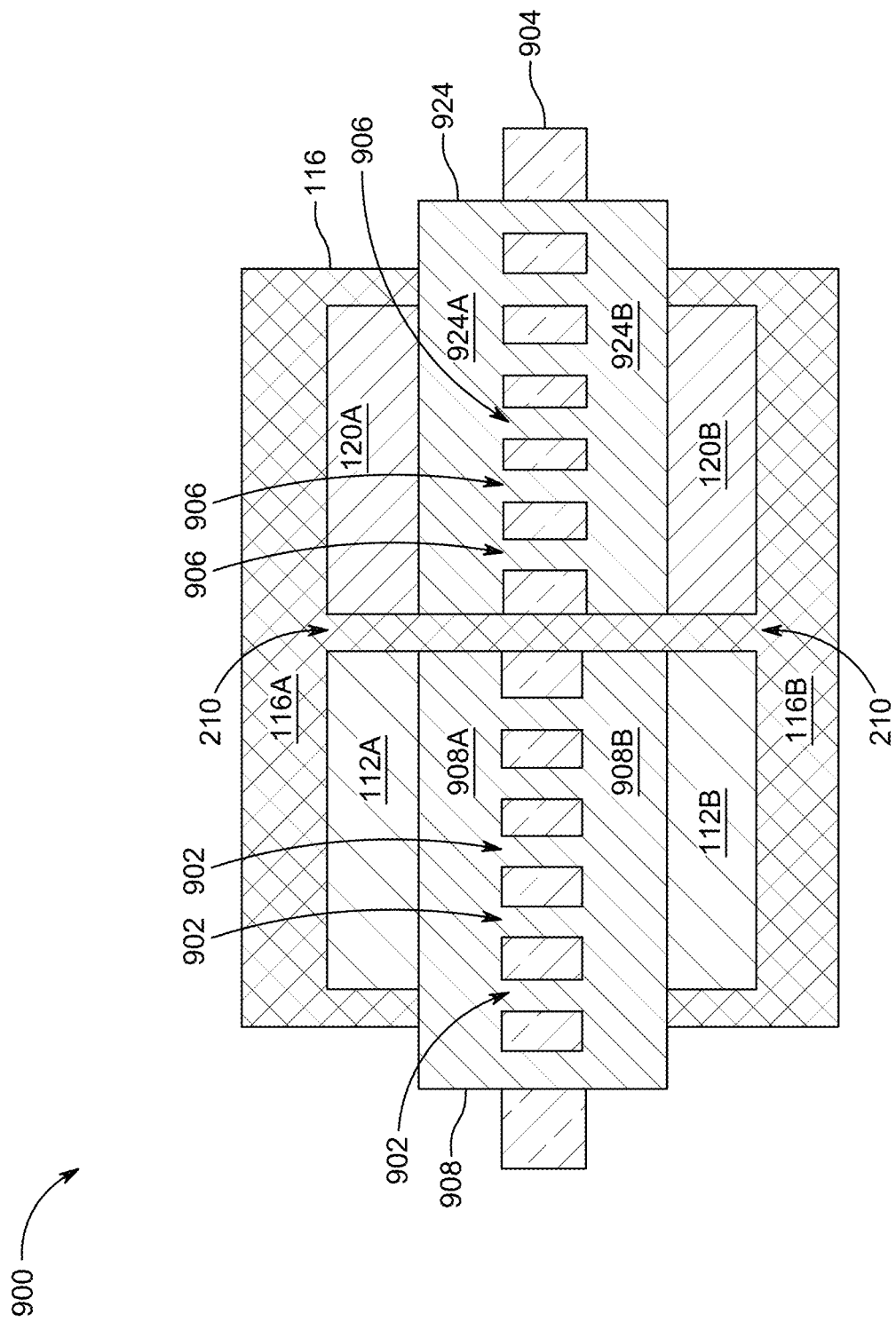
FIG. 9 illustrates a side view of a thin film-based energy storage device having laterally adjacent current collectors and electrode layers, where the current collector layers and the electrode layers are formed on opposing surfaces of a perforated substrate, for increased capacity without increasing the overall lateral footprint of the thin film-based energy storage device.

In some embodiments, the capacity of the ESD can be increased by having a plurality of first and second electrodes on both sides of a substrate. Accordingly, FIG. 9 illustrates a side view of a thin film-based energy storage device 900 having laterally adjacent current collectors and electrode layers, where the current collector layers and the electrode layers are formed on opposing surfaces of a substrate, e.g., a perforated substrate, for increased capacity without increasing the overall lateral footprint of the thin film-based ESD. In the illustrated embodiments, the substrate 904 has a plurality of perforations or openings 902, 906 formed therethrough. On each side of the perforated substrate 904, various layers that are analogous to the ESD 300 (FIGS. 3A/3B) described above are formed, including adjacently disposed first and second current collectors formed on a substrate, adjacently disposed first and second electrode active layers and a separator formed over the first and second electrode layers. Accordingly, the first current collector 908 comprises a first current collector layer 908A and an additional first current collector layer 908B formed on opposing sides of the substrate 904. The first and additional first current collector layers 908A, 908B of the first current collector 908 are electrically connected through the plurality of openings or perforations 902 formed therethrough. In a similar manner, the second current collector 924 comprises a second current collector layer 924A and an additional second current collector layer 924B formed on opposing sides of the substrate 904. The second and additional second current collector layers 924A, 924B of the second current collector 924 are electrically connected through the plurality of openings or perforations 906 formed therethrough.

Still referring to FIG. 9, on the first side of the substrate 904, a first electrode layer 112A is formed on the first current collector layer 908A of the first current collector 908, and on the second side of the substrate 904, an additional first electrode 112B is formed on the additional first current collector layer 908B of the first current collector 908. In a similar manner, on the first side of the substrate 904, a second electrode layer 120A is formed on the second collector layer 924A of the second current collector 924, and on the second side of the substrate 904, an additional second electrode layer 120B is formed on the additional second collector layer 924B of the second current collector 924. The separator 116 comprises a first separator layer 116A formed on the first side of the substrate 904 to cover the first electrode layer 112A and the second electrode layer 120A, and a second separator layer 116B formed on the second side of the substrate 904 to cover the additional first electrode layer 112B and the additional second electrode layer 120B. The first and second separator layers 116A, 116B of the separator 116 are connected through the gap 210 formed between the first and second current collectors 908, 924, between the first electrode layer 112A and the second electrode layer 120A, and between the additional first electrode layer 112B and the additional second electrode layer 120B.

To manufacture the ESD 900, the two layers of the first current collector 908 can be formed by, e.g., depositing or printing twice, once on the first side of the substrate 904 and a second time on the second side of the substrate 904. The openings or perforations 902 may be filled when either or both of the first current collector layer 908A and the additional first current collector layer 908B are deposited or printed, thereby allowing for electronic continuity between the first current collector layer 908A and the additional first current collector layer 908B that are formed on opposing sides of the substrate 904. Similarly, the two layers of the second first current collector 924 can be formed by, e.g., depositing or printing twice, once on the first side of the substrate 904 and a second time on the second side of the substrate 904. The openings or perforations 906 may be filled when either or both of the second current collector layer 924A and the additional second current collector layer 924B are deposited or printed, thereby allowing for electronic continuity between the second current collector layer 924A and the additional second current collector layer 924B that are formed on opposing sides of the substrate 904. Thereafter, first and additional first electrode layers 112A, 112B are formed on the first and additional first current collector layers 908A, 908B of the first current collector 908, respectively, and second and additional second electrode layers 120A, 120B are formed on the second and additional second current collector layers 924A, 924B of the second current collector 924, respectively. The separator 116 can be formed in one of four ways: (a) on one of two sides of the substrate 904, (b) on one side of the substrate 904 and through the gap 210 to reach the other side of the substrate 904; (c) on both sides of the substrate 904; and (d) on both sides of the substrate 904 and through the gap 210. Thus, as configured, relative to ESD configurations in which the electrode layers are formed only on one side of the substrate (e.g., ESD 300 of FIGS. 3A/3B), the ESD 900 can have higher capacity for the same lateral footprint of the ESD. The openings or perforations 902 formed in the substrate 904 between the layers of the first current collector 908, the openings or perforations 906 formed in the substrate 904 between the layers of the second current collector 924 can have the size, the inter-opening distances, shapes and any other characteristics described above with respect to the openings or perforations formed through the separator as described in FIGS. 5 and 6. While not illustrated, the capacity of the ESD 900 can be further increased by configuring the first and second separator layers 116A, 116B of the separator 116 to have perforations formed therethrough, followed by forming further layers of the first and second electrodes on the first and second separator layers 116A, 116B, and in the perforations formed therethrough, in a similar manner as described above with respect to the ESD 500 of FIGS. 5 and 6.

It will be appreciated that the electrode layer arrangements of the ESDs described above with respect to FIGS. 5-9 advantageously provide, in addition to tuning relative amounts or volumes of the individual active materials of the first and second electrode layers, an additional degree of freedom for adjusting the molar ratio between active materials of the first and second electrode layers, without substantially increasing the overall lateral footprint of the ESDs. The arrangements can be particularly beneficial in implementations of thin film-based ESDs where the molar ratio between the first electrode active material and the second electrode active material is substantially greater or less than 1.0, e.g., greater than 1.3 or less than 0.7.

Electrode and Current Collector Shapes for Enhanced Electrode Overlap in Thin Film-Based Energy Storage Devices As described above, e.g., with respect to FIGS. 2A/2B, when a voltage is applied between current collectors in ESDs having laterally disposed electrode layers, a substantial portion of the ionic exchange may occur in a lateral direction. For example, the ionic exchange may occur between overlapping surfaces of the electrode layers, e.g., between overlapping surfaces of the first electrode layer 112 and the second electrode layer 120 in the lateral direction across the gap 210 in the illustrated ESD 200 in FIGS. 2A/2B. The inventors have discovered that higher ionic exchange may be achieved in various ESDs by increasing the area of overlap between the electrode layers. In the following, various embodiments of ESDs are configured to enhance the ionic exchange between the electrodes by increasing the overlap area between the electrodes for higher current, higher current density and/or shorter charging times.

FIGS. 10A-10E illustrate plan views of different electrode overlap arrangements 1000A-1000E of thin film-based energy storage devices having laterally adjacent current collectors and electrode layers, where the first and second electrodes have different shapes and for different amounts of overlap area therebetween. Each of the electrode overlap arrangements 1000A-1000E include a first electrode layer 112 and a second electrode layer 120 that are laterally disposed relative to each other, in a similar manner as described above with respect to, e.g., FIGS. 3A/3B). In the electrode overlap arrangement 1000A illustrated in FIG. 10A, each of the first and second electrode layers 112, 120 are rectangular in shape and are elongated in a first lateral direction e.g., the horizontal direction, and have widths that overlap in the first lateral direction. In the electrode overlap arrangement 1000B of FIG. 10B, each of the first and second electrode layers 112, 120 are rectangular in shape and are elongated in a second lateral direction, e.g., the vertical direction, and have lengths that overlap in the second lateral direction. In the electrode overlap arrangement 1000C of FIG. 10C, each of the first and second electrode layers 112, 120 has a strap portion and a plurality of regularly spaced rectangular protrusions or fingers, where the rectangular protrusions or fingers of the first and second electrode layers 112, 120 are interlaced or interleaved such that they alternate in a lateral direction, e.g., the horizontal direction, for increased overlapping edge lengths of the first and second electrode layers 112, 120. In the electrode overlap arrangement 1000D of FIG. 10D, each of the first and second electrode layers 112, 120 has a strap portion and a plurality of regularly spaced rounded protrusions or fingers, where the rounded protrusions or fingers of the first and second electrode layers 112, 120 are interlaced or interleaved such that they alternate in a lateral direction, e.g., the horizontal direction, for increased overlapping edge lengths of the first and second electrode layers 112, 120. In the electrode overlap arrangement 1000E of FIG. 10E, each of the first and second electrode layers 112, 120 has a strap portion and a plurality of regularly spaced protrusions, fingers, tines or spikes, where the elongated protrusions, fingers, tines or spikes of the first and second electrode layers 112, 120 are interlaced or interleaved such that they alternate in a lateral direction, e.g., the horizontal direction, for increased overlapping edge lengths of the first and second electrodes.

To show the effect of the different electrode overlap arrangements on the resulting ion exchange, batteries having the different electrode overlap arrangements as illustrated in FIGS. 10A-10E were fabricated by printing. To directly compare the resulting electrical characteristics of the batteries, each of the different batteries having the different arrangements 1000A-1000E were printed to have the same lateral coverage or surface area of the respective first electrode layer 112 of the first type and the respective second electrode layer 120 of the second type. In addition, the different batteries having the different electrode overlap arrangements 1000A-1000E were printed to have the same thicknesses, the same coverage or surface areas of the first electrode layer 112 and the same coverage or surface areas of the second electrode layer 120. In addition, the different batteries having the different electrode overlap arrangements 1000A-1000E were printed to have same widths of the gaps 210 between the first and second electrode layers 112, 120. Thus, the electrical characteristics were compared for different batteries arrangements 1000A-1000E with respect to lengths of overlap, which is equivalent to the areas of overlap, between first and second electrode layers 112, 120 across the gaps 210 as the variable. In each of the fabricated batteries, the first and second electrode layers 112, 120 were printed on respective current collectors, and a separator having the same electrolyte composition was deposited on top of the electrode layers 112, 120 to fill the gap 210 therebetween, in a similar manner as described above with respect to the ESD 200 (FIGS. 2A/2B). The resistance was measured between the current collectors for on each of the batteries having the different electrode arrangements 1000A-1000E using a step current method. The measured resistance values for the ESDs having different electrode overlap arrangements 1000A-1000E are shown in TABLE 1, as a function of the length of overlap between the first and second electrode layers 112, 120. One can clearly see that the resistance is inversely proportional to the length of overlap between the first and second electrode layers 112, 120.

TABLE 1

Experimental Correlation Between Overlap Length Between Electrodes and Battery Resistance

| Electrode Arrangement | Length of Overlap Between Electrodes (cm) | Resistance (Ohms) |
| --- | --- | --- |
| Horizontal Rectangular (FIG. 10A) | 1.4 | 1222 |
| Vertical Rectangular (FIG. 10B) | 2.5 | 698 |
| Interlacing Strapped Rectangular Protrusions (FIG. 10C) | 10.2 | 371 |
| Interlacing Strapped Rounded Protrusions (FIG. 10D) | 11.4 | 335 |
| Interlaced Strapped Fingers (FIG. 10E) | 59.9 | 150 |

The experimental measurements of the resistance of the batteries having different electrode overlap arrangements 1000A-1000E show that the ionic exchange, as measured by ion current density, shows a clear dependence on the length of the overlap, which is equivalent to the area of overlap, between the first and second electrode layers 112, 120. Thus, based the observed relationship between the overlap area and the resistance, the inventors have determined that electrode overlap arrangements having relatively large amount of overlap between the electrodes may be employed in applications where relatively higher current, higher power and/or faster charge rates are desired. On the other hand, electrode overlap arrangements having relatively small amount of overlap between the electrodes may be employed in applications where relatively lower current, lower power and/or lower self-discharge rates are desired.

Figure 11B:
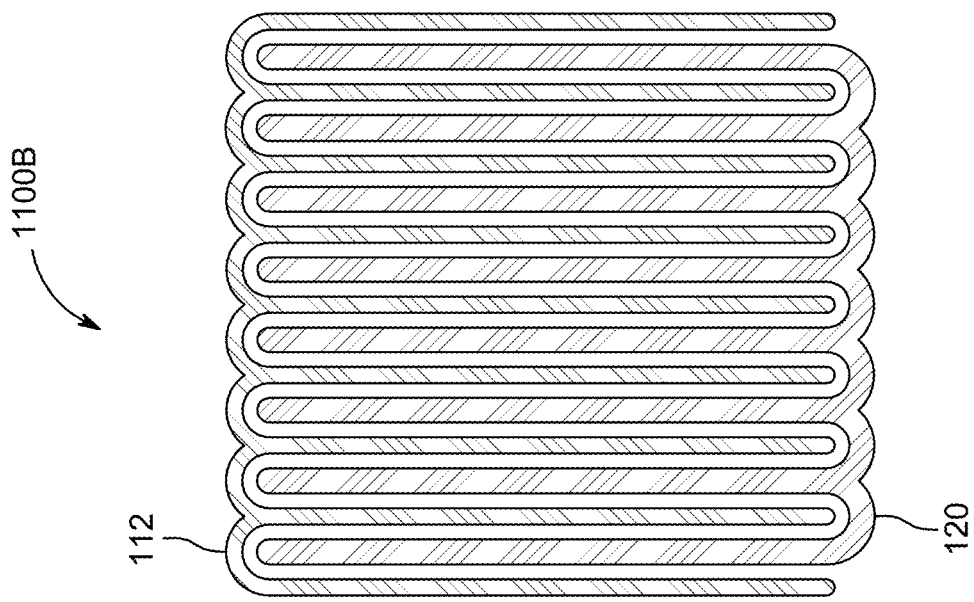
FIG. 11B illustrates a plan view of an electrode arrangement of a thin film-based energy storage device having laterally adjacent current collectors and electrode layers, similar to the arrangement illustrated in FIG. 10E, where the first and second electrodes have different surface areas, where the ratio of surface areas between the first and second electrode layers is adjusted in accordance with a molar ratio of the active materials.
Figure 11A:
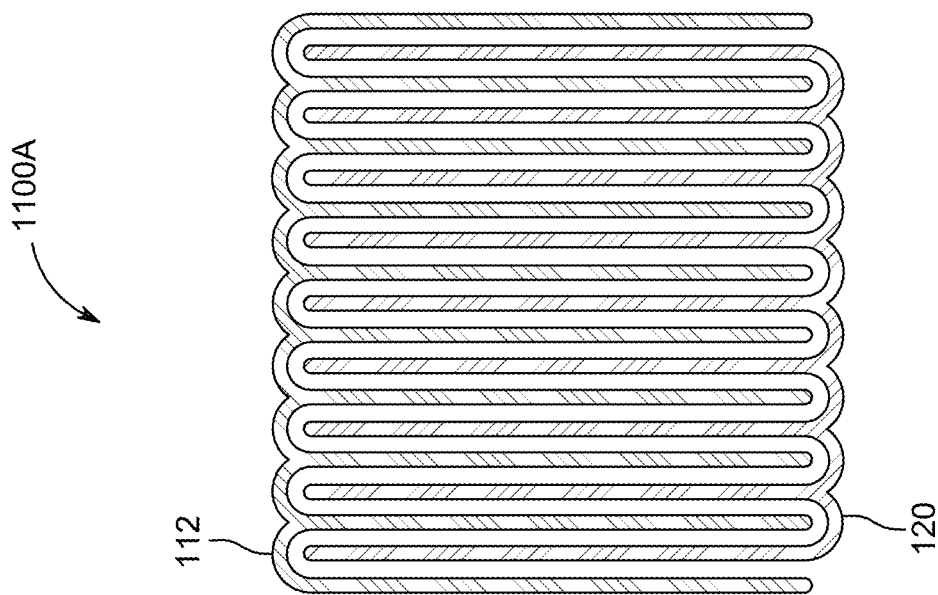
FIG. 11A illustrates a plan view of an electrode arrangement of a thin film-based energy storage device having laterally adjacent current collectors and electrode layers, similar to the arrangement illustrated in FIG. 10E, where the first and second electrodes have about the same surface area.

Still referring to FIGS. 10A-10E, it will be appreciated that, while in each of the illustrated electrode overlap arrangements 1000A-1000E, the first and second electrode layers 112, 120 have the same footprints or surface areas, embodiments are not so limited. In other embodiments, in each of the illustrated electrode overlap arrangements 1000A-1000E, the ratio of the footprints or surface areas can be adjusted according to the molar ratio associated with the electrochemical reaction between the electrode active materials. For example, as described above with respect to FIGS. 3A and 3B, the surface areas of the first and second electrodes layers 112, 120 may be adjusted to be different, according to the stoichiometric ratios of the cathode and anode active materials. As described above, as an illustrative example, when the thicknesses of the first and second electrode layers 112, 120 are about the same and when the ratio of the amounts of the first and second electrode active materials, e.g., cathode and anode active materials, associated with the electrochemical reaction is 1:1 on the basis of a molar ratio, a ratio $A_1/A_2$ of a first coverage or surface area $A_1$ of the first electrode layer 112 to a second surface area $A_2$ of the second electrode layer 120 may be proportional to a ratio $m_1/m_2$ of the first molar mass $m_1$ of the first electrode active material to the second molar mass $m_2$ of the second electrode active material, and to a ratio $\rho_2/\rho_1$ of the second density $\rho_2$ of the second electrode active material to the first density $\rho_1$ of the second electrode active material. By way of example, FIGS. 11A and 11B illustrate plan views of electrode overlap arrangements of a thin film-based ESD in which first and second electrode layers 112, 120 have the same and different surface areas, respectively. FIG. 11A illustrates a plan view of an electrode arrangement of a thin film-based energy storage device 1100A having laterally adjacent current collectors and electrode layers, similar to the arrangement illustrated in FIG. 10E, where the first and second electrode layers 112, 120 have about the same surface area. Each of the first and second electrode layers 112, 120 has a strap portion and a plurality of regularly spaced fingers or protrusions, where the fingers or protrusions of the first and second electrode layers 112, 120 alternate in a horizontal direction. On the other hand, FIG. 11B illustrates a plan view of an electrode arrangement of a thin film-based energy storage device 1100B having laterally adjacent current collectors and electrode layers, similar to the arrangement illustrated in FIG. 11A, except that the first and second electrode layers 112, 120 have different surface areas, and where the ratio of surface areas between the first and second electrode layers 112, 120 is adjusted in accordance with a molar ratio of the active materials associated with the electrochemical reaction. In the illustrated embodiment, the second electrode layer 120 has a larger footprint compared to the first electrode layer 112.

Figure 12B:
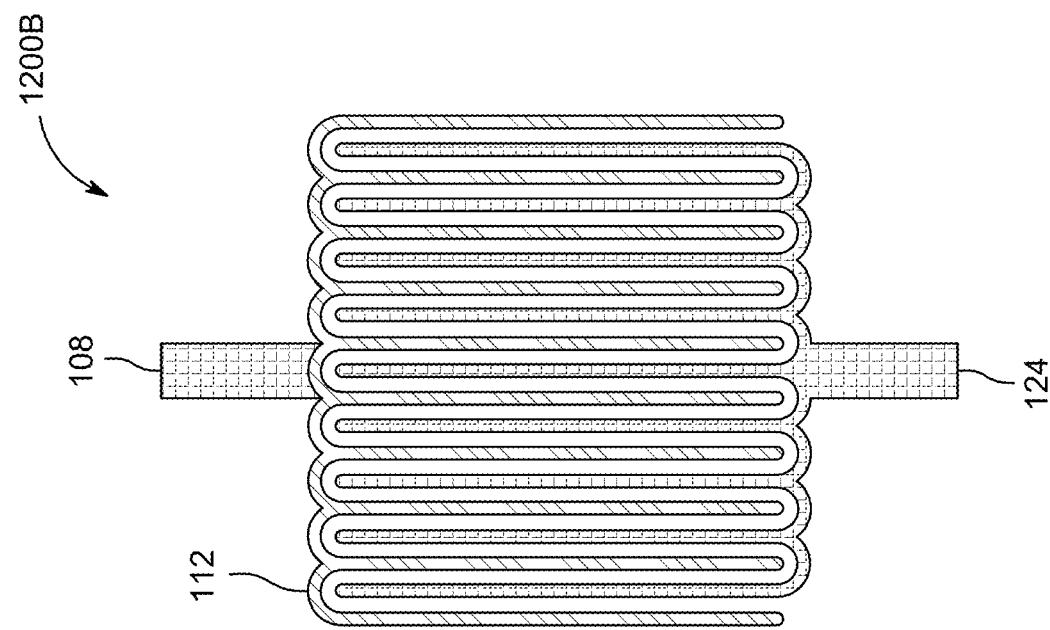
FIG. 12B illustrates a plan view of an intermediate structure at a further stage in fabrication of the energy storage device, after depositing a first electrode layer over the first current collector illustrated in the intermediate structure illustrated in FIG. 12A.
Figure 12A:
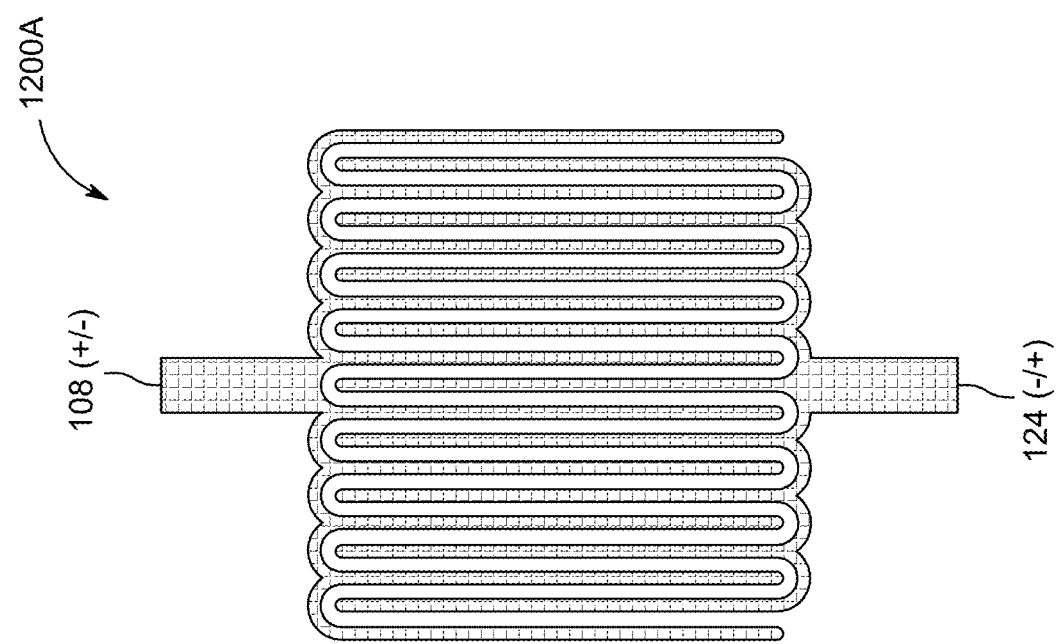
FIG. 12A illustrates a plan view of an intermediate structure at a stage in fabrication of thin film-based energy storage device having laterally adjacent current collectors and electrode layers, similar to the arrangement illustrated in FIG. 10E, after depositing first and second current collectors.
Figure 12D:
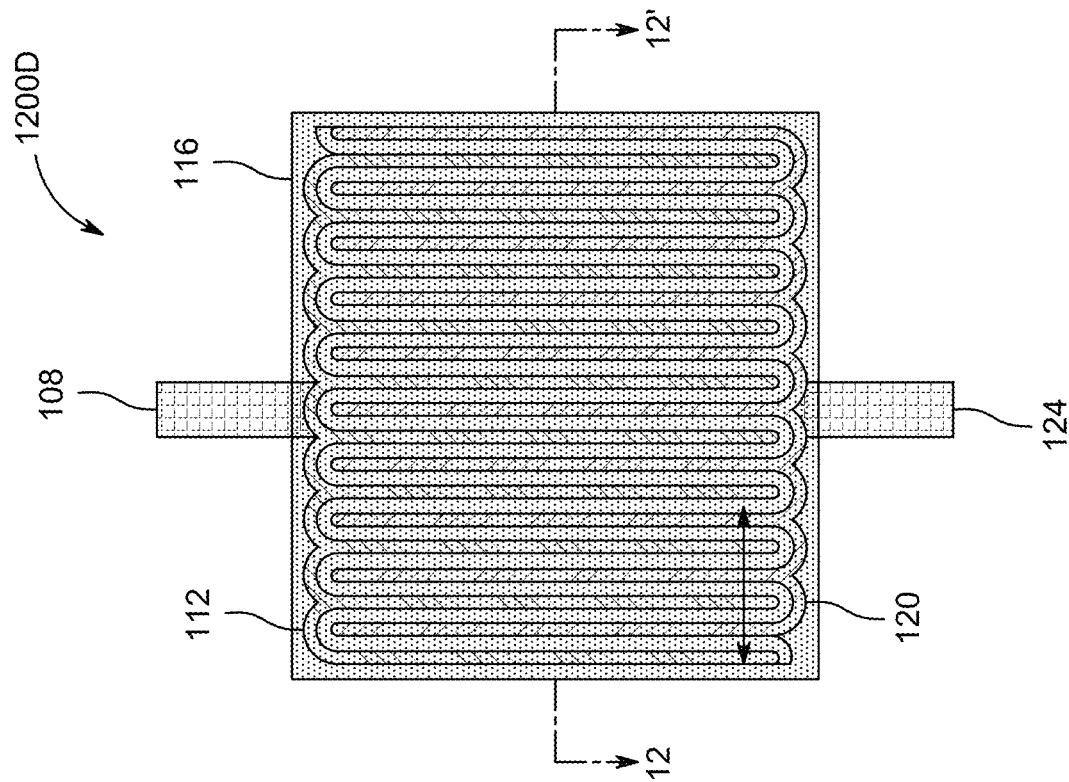
FIG. 12D illustrates a plan view of an intermediate structure at a further stage in fabrication of the energy storage device, after depositing a separator over the first and second electrode layers illustrated in the intermediate structure illustrated in FIG. 12C.
Figure 12C:
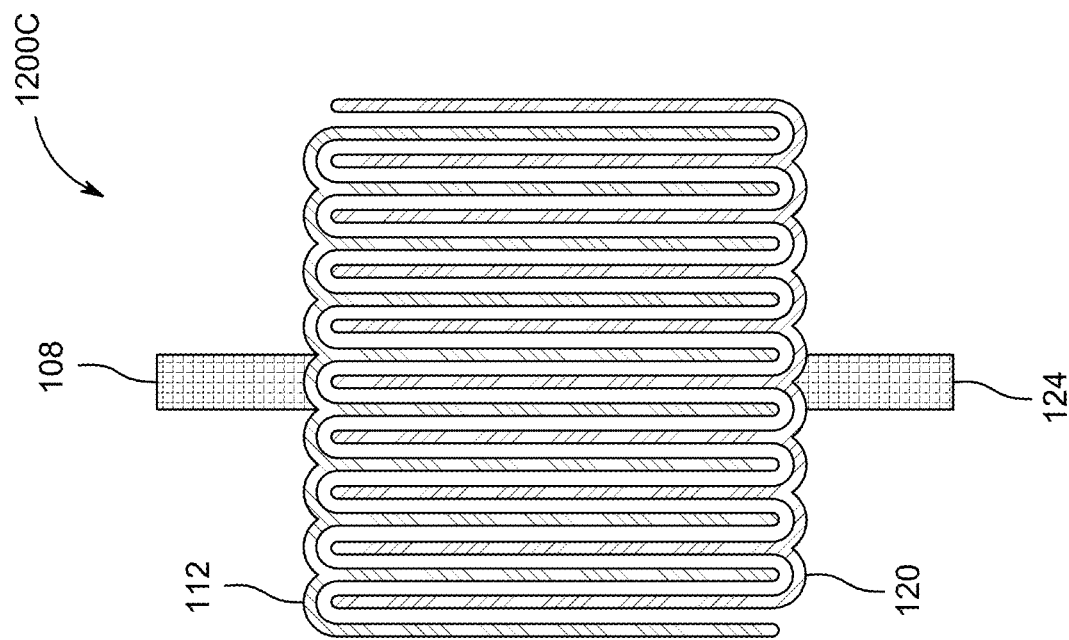
FIG. 12C illustrates a plan view of an intermediate structure at a further stage in fabrication of the energy storage device, after depositing a second electrode layer over the second current collector illustrated in the intermediate structure illustrated in FIG. 12B.
Figure 13:
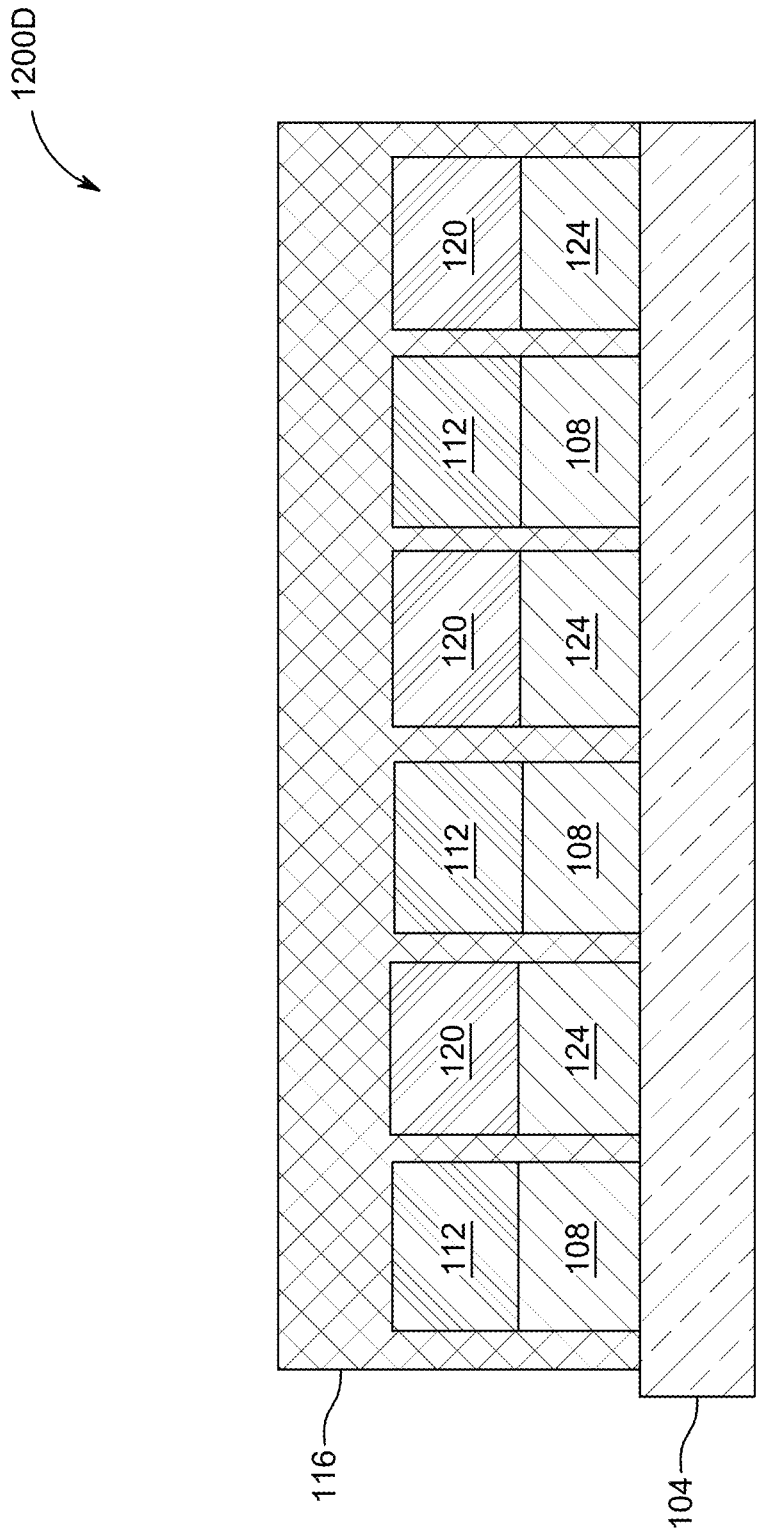
FIG. 13 illustrates a cross-sectional view of a thin film-based energy storage device having laterally adjacent current collectors and electrode layers, similar to the arrangement illustrated in FIG. 10E, that is fabricated according to the fabrication process illustrated in FIGS. 12A-12D.

FIGS. 12A-12D illustrate plan views of intermediate structures 1200A-1200D at various stages of fabricating a thin film-based energy storage device 1200D having laterally adjacent current collectors and electrode layers, similar to the arrangement illustrated in FIG. 10E, that are configured for increased ionic exchange and current, in a similar manner as described above with respect to FIGS. 11A and 11B. The resulting ESD 1200D has an electrode overlap arrangement similar to that illustrated in FIGS. 11A and 11B. FIG. 13 illustrates a cross-sectional view of the ESD 1200D of FIG. 12D through the section 12-12'. Referring to FIG.

12A, the intermediate structure 1200A illustrates as-deposited or as-printed first and second current collectors 108, 124, where each of the laterally adjacent first and second current collectors 108, 124 has a tab, a strap portion and a plurality of regularly spaced fingers or protrusions that are integrated as a single thin film layer, e.g., a printed thin film layer. The fingers or protrusions of the first and second current collectors 108, 124 alternate in the first lateral direction, e.g., the horizontal direction. The intermediate structure 1200B of FIG. 12B illustrates the intermediate structure 1200A of FIG. 12A after a first electrode layer 112 deposited, e.g., printed, over or on the first current collector 108. The intermediate structure 1200C of FIG. 12C illustrates the intermediate structure 1200B of FIG. 12B after a second electrode layer 120 is deposited, e.g., printed, over or on the second current collector 124. As illustrated, the first electrode layer 112 generally follows the lateral contours of the first current collector 108, and the second electrode layer 120 generally follows the lateral contours of the second current collector 124. As described above, e.g., with respect to FIGS. 2A/2B, fingers or protrusions of one or both of the first and second electrode layers 112, 120 can have a lateral width that is about the same narrower than the fingers or protrusions of the underlying first and second current collectors 108, 124, respectively. Thus, each of the first and second electrode layers 112, 120 has a strap portion and a plurality of regularly spaced fingers or protrusions, where the fingers of the first and second electrodes alternate in a first lateral direction, e.g., the horizontal direction, in a similar manner as described above with respect to FIGS. 10E, 11A and 11B. The intermediate structure 1200D of FIG. 12 illustrates the intermediate structure 1200C of FIG. 12C after a separator 112 is deposited or printed over or on the first and second electrode layers 112, 120 and to fill the gap 210 formed therebetween. As illustrated in FIG. 12D, the separator layer 116 may be blanket deposited or printed. As illustrated in FIG. 13 illustrating a cross-sectional view of the ESD 1200D through the section 12-12' of the plan vie of the ESD 1200D illustrated in FIG. 12D, the fingers of the first and second electrode layers 112 and 120 formed over corresponding fingers of the first and second current collectors 108, 124, respectively, alternate in a horizontal direction, where adjacent fingers of the first and second electrode layers 112 and 120 are separated by a gap 210 therebetween.

In operation, when a voltage is applied between the first current collector 108 and the second current collector 124, ions may be exchanged between the first electrode layer 112 and the second electrode layer 120 through the separator 116, where, because of the lateral arrangement of the first and second electrode layers 112, 120, a substantial or a predominant portion of the ionic exchange may occur in a lateral direction, e.g., between overlapping portions of the side surfaces of the fingers of the first electrode layer 112 and the fingers of the second electrode layer 120 across the plurality of gaps 210. Because of the increased length of overlap between the first electrode layer 112 and the second electrode layer 120, the ionic conduction can be greatly enhanced, as experimentally demonstrated with respect to TABLE 1 and FIGS. 10A-10E.

Figure 14B:
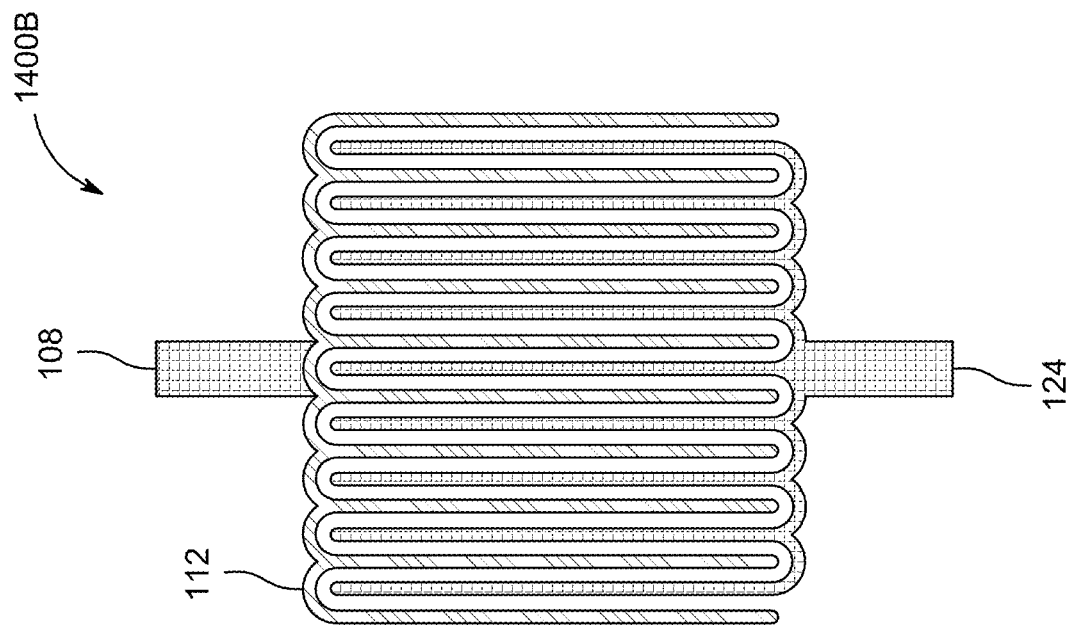
FIG. 14B illustrates a plan view of an intermediate structure at a further stage in fabrication of the energy storage device, after depositing a first electrode layer over the first current collector illustrated in the intermediate structure illustrated in FIG. 14A.
Figure 14A:
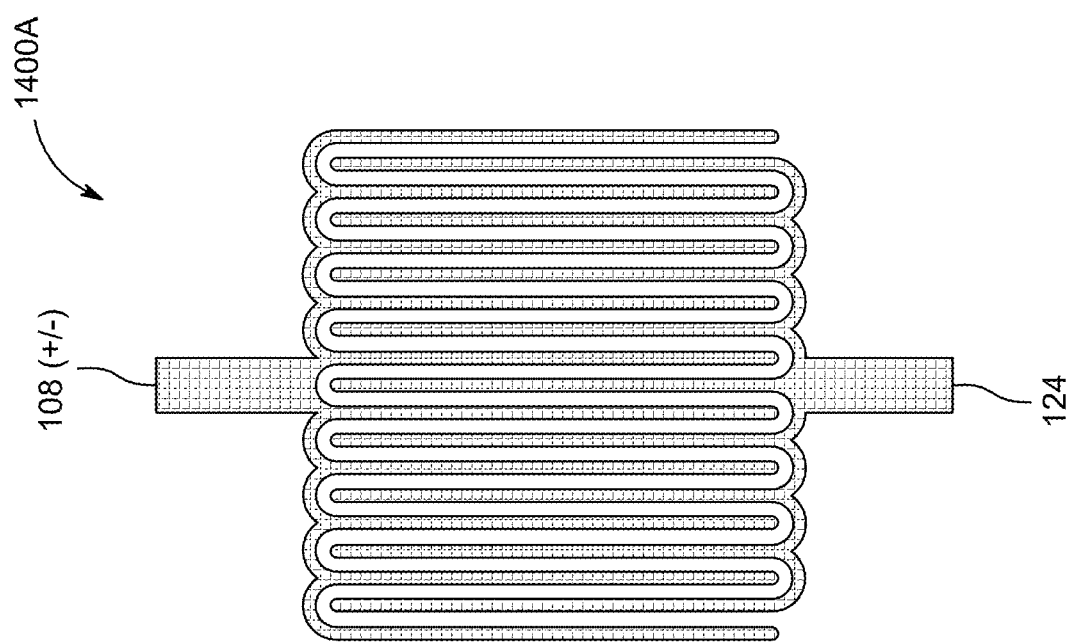
FIG. 14A illustrates a plan view of an intermediate structure at a stage in fabrication of a thin film-based energy storage device having laterally adjacent current collectors and electrode layers that have overlapping portions in the vertical direction, after depositing first and second current collectors each having a plurality of regularly spaced elongated protrusions or fingers, where the elongated protrusions or fingers are interlaced or interleaved such that they alternate in a lateral direction.
Figure 14D:
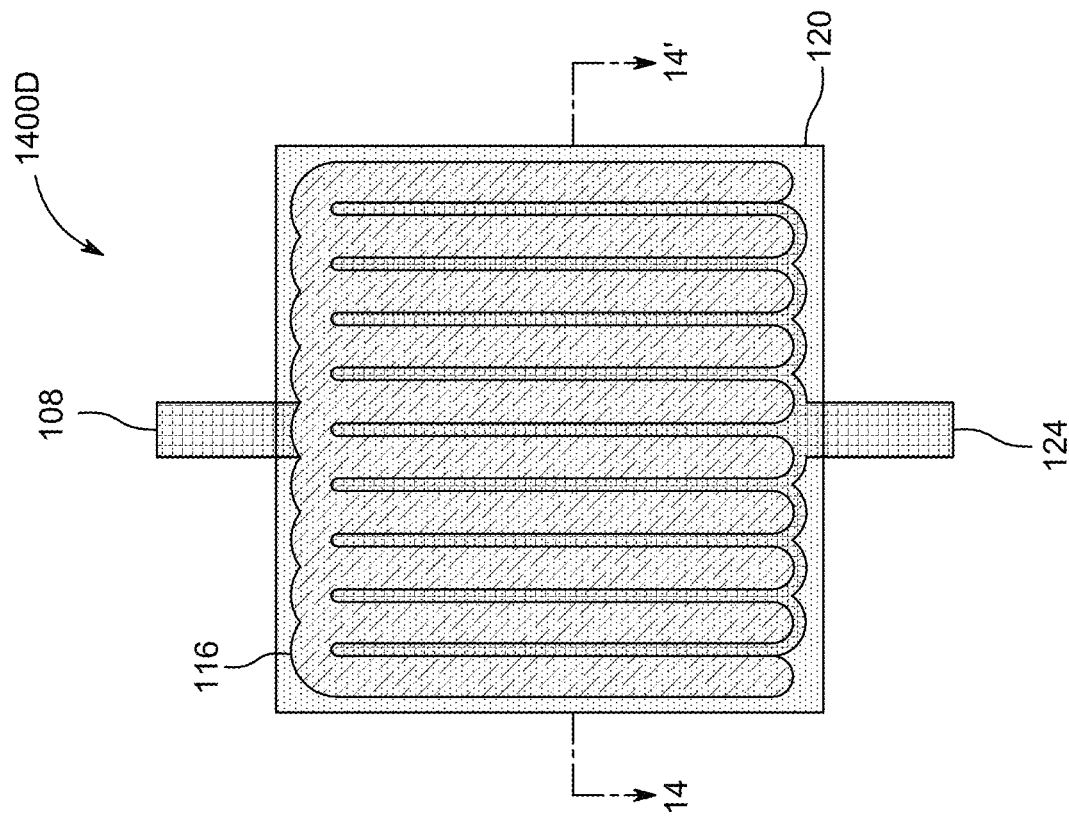
FIG. 14D illustrates a plan view of an intermediate structure at a further stage in fabrication of the energy storage device, after depositing a second electrode layer over the separator and over the second current collector illustrated in the intermediate structure illustrated in FIG. 14C.
Figure 14C:
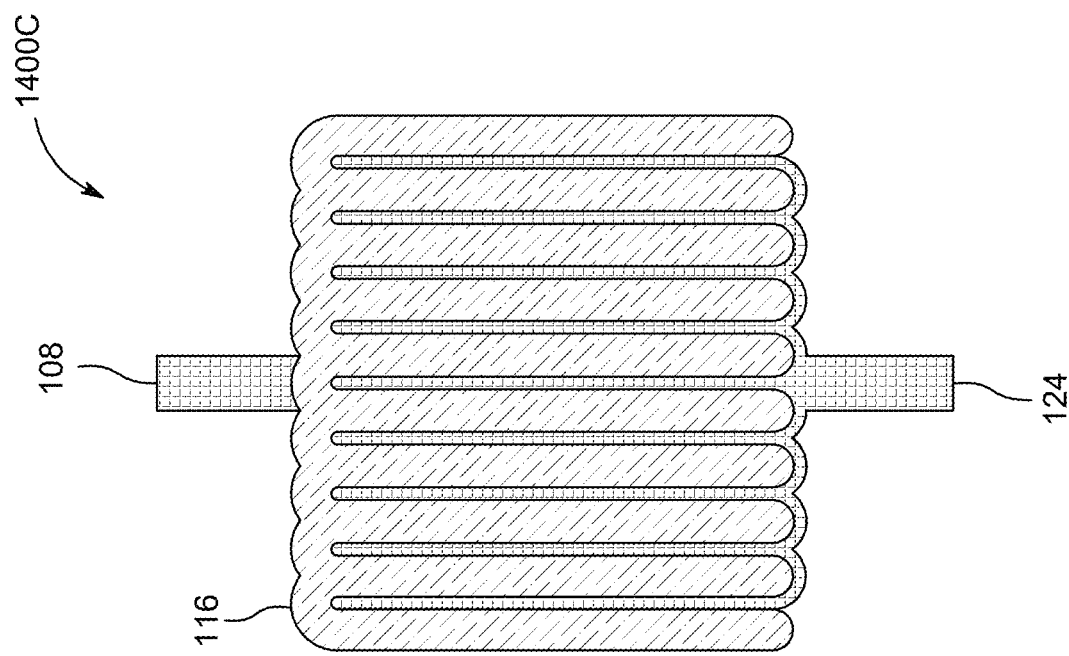
FIG. 14C illustrates a plan view of an intermediate structure at a further stage in fabrication of the energy storage device, after depositing a separator over the first electrode layer illustrated in the intermediate structure illustrated in FIG. 14C.
Figure 15:
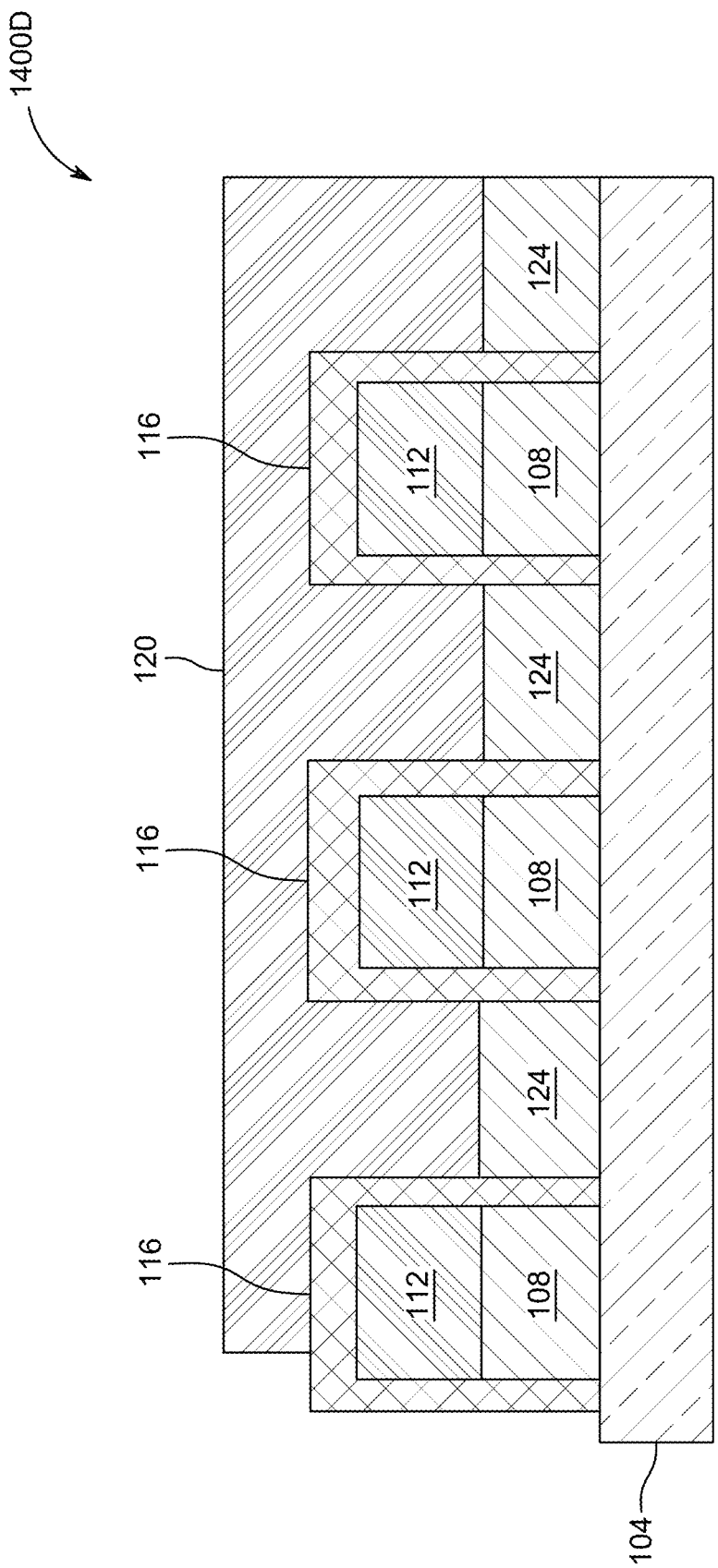
FIG. 15 illustrates a cross-sectional view of a thin film-based energy storage device having laterally adjacent current collectors and electrode layers that have overlapping portions in the vertical direction, that is fabricated according to the fabrication process illustrated in FIGS. 14A-14D.

FIGS. 14A-14D illustrate plan views of intermediate structures 1400A-1400D at various stages of fabricating a thin film-based energy storage device 1400D having laterally adjacent current collectors and electrode layers that have overlapping portions in the vertical direction and are configured for increased ionic exchange and current. FIG. 15 illustrates a cross-sectional view of the ESD 1400D illustrated in FIG. 14D through the section 14-14'. Referring to FIG. 14A, the intermediate structure 1400A illustrates as-deposited or as-printed first and second current collectors 108, 124, where each of the laterally adjacent first and second current collectors 108, 124 has a tab, a strap portion and a plurality of regularly spaced fingers or protrusions that are integrated as a single thin film layer, e.g., a printed thin film layer. Similar to FIG. 12A, the fingers or protrusions of the first and second current collectors 108, 124 alternate in the first lateral direction, e.g., the horizontal direction. The intermediate structure 1400B of FIG. 14B illustrates the intermediate structure 1400A of FIG. 14A after a first electrode layer 112 is deposited, e.g., printed, over or on the first current collector 108. As described above, e.g., with respect to FIG. 4, the fingers of the first electrode layer 112 can have lateral widths that are narrower than the underlying fingers of the first current collector 108. The intermediate structure 1400C of FIG. 14C illustrates the intermediate structure 1400B of FIG. 14B after a separator layer 116 is deposited, e.g., printed, over or on the first electrode layer 112. As illustrated, the separator layer 116 generally follows the lateral contours of and encapsulates to electrically separate the first electrode layer 112 and the first current collector 108. The intermediate structure 1400D of FIG. 14 illustrates the intermediate structure 1400C of FIG. 14C after a second electrode layer 120 is deposited or printed over or on to cover the separator layer 116 and the second current collector 124, and to fill the gaps between adjacent fingers of the first electrode layer 112. As illustrated in FIG. 14D, the second electrode layer 120 may be blanket-deposited. As illustrated in FIG. 15 representing a cross-sectional view of the ESD 1400D through the section 14-14' illustrated with respect to the intermediate structure 1400D of FIG. 14D, the separator layer 116 covers or encapsulates the fingers formed by the stack of the first current collector 108 and the first electrode layer 112. The second electrode layer 120 is formed on the fingers of the second current collector 124 and fills the gaps formed between separator-covered fingers of the first electrode layer 112, such that the fingers first electrode layer 112 and the second electrode layer 120 filling the gaps formed between adjacent ones of the fingers of the first electrode layers 112 alternate in a horizontal direction.

In operation, when a voltage is applied between the first current collector 108 and the second current collector 124, ions may be exchanged between the first electrode layer 112 and the second electrode layer 120 through the separator 116, where, because of the separator layer 116 formed over the top and side surfaces of or encapsulates the plurality of the fingers of first electrode layer 112, the ionic exchange between the first and second electrode layers 112, 120 may occur in a vertical direction between fingers of the first electrode layer 112 and portions of the second electrode layer 120 disposed thereover, and in lateral directions between fingers of the first electrode layer 112 and portions of the second electrode layer 120 filling gaps formed between adjacent ones of the fingers of the first electrode layer 112. Because of the increased overlap between the first electrode layer 112 and the second electrode layer 120, the ionic conduction can advantageously be greatly enhanced, at least by amounts experimentally demonstrated with respect to TABLE 1 and FIGS. 10A-10E.

In addition to the higher ionic conduction, the electrode configuration of the ESD 1400D can advantageously allow for flexible adjustment of the relative amounts or volumes of the first and second electrode layers 112, 120 according to a stoichiometric ratio of the respective electrode active materials involved in the underlying electrochemical reaction of the ESD 1400D, in a similar manner as described above with respect to FIG. 4.

Serially Connected Thin Film-Based Energy Storage Devices

Among others, an advantage of using thin film-based deposition techniques such as printing for fabricating energy storage devices is the ability to form a plurality of patterned structures simultaneously, e.g., as part of the same impression. As a result, such thin film-based techniques are advantageous for fabricating a plurality of electrically connected ESD units or cells using the same number of printing steps or impressions as in fabricating a single unit of ESD. For example, by printing, a plurality of current collectors and electrode layers can be simultaneously formed and electrically connected in-situ, instead of forming individual current collectors or electrode layers and electrically connecting them afterwards. By electrically connecting one or more ESD cells or units in series, the net operational output voltage can be customized for different applications, because the net ESD voltage is proportional to the sum of the output voltages of the number of ESDs in series. By electrically connecting one or more ESD cells or units in parallel, the net operational capacity can be customized for different applications, because the net ESD capacity is proportional to the sum of the capacities of the number of ESD cells or units in parallel. Thus, by printing a plurality of ESD cells or units in series and/or in parallel, an ESD having customized operational voltage and/or capacity can be fabricated with the same number of printing steps and impressions as printing a single cell or unit of ESD. In the following, various embodiments are described in which a plurality of ESD units or cells are electrically connected in series or in parallel or a combination of both.

Figure 16:
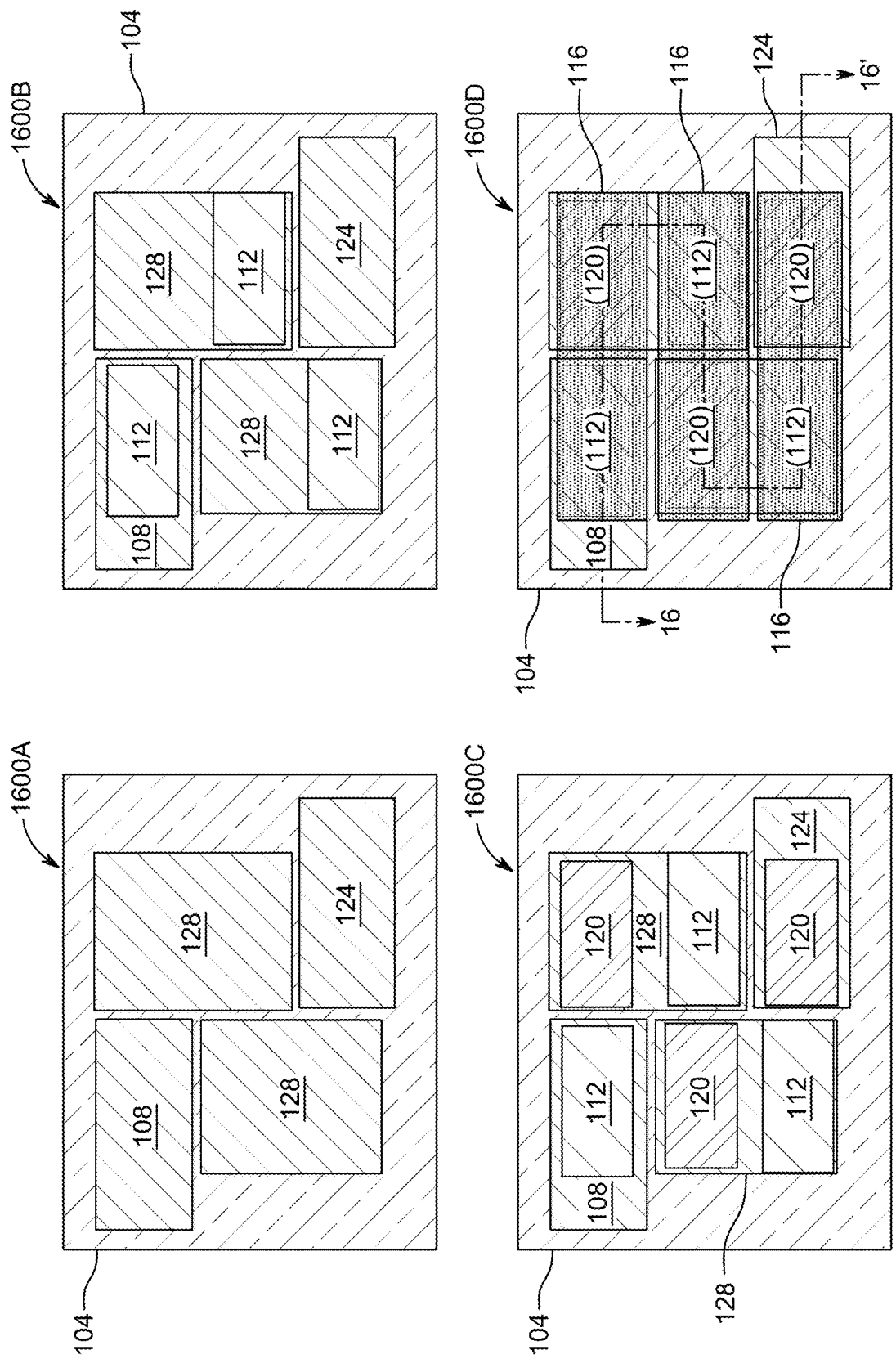
FIG. 16 illustrates plan views of intermediate structures at various stages of fabrication of a thin film-based energy storage device having laterally adjacent current collectors and electrode layers, where the energy storage device includes three units or cells that are connected in electrical series. The stages of fabrication include four impressions that form three layer levels.
Figure 17:
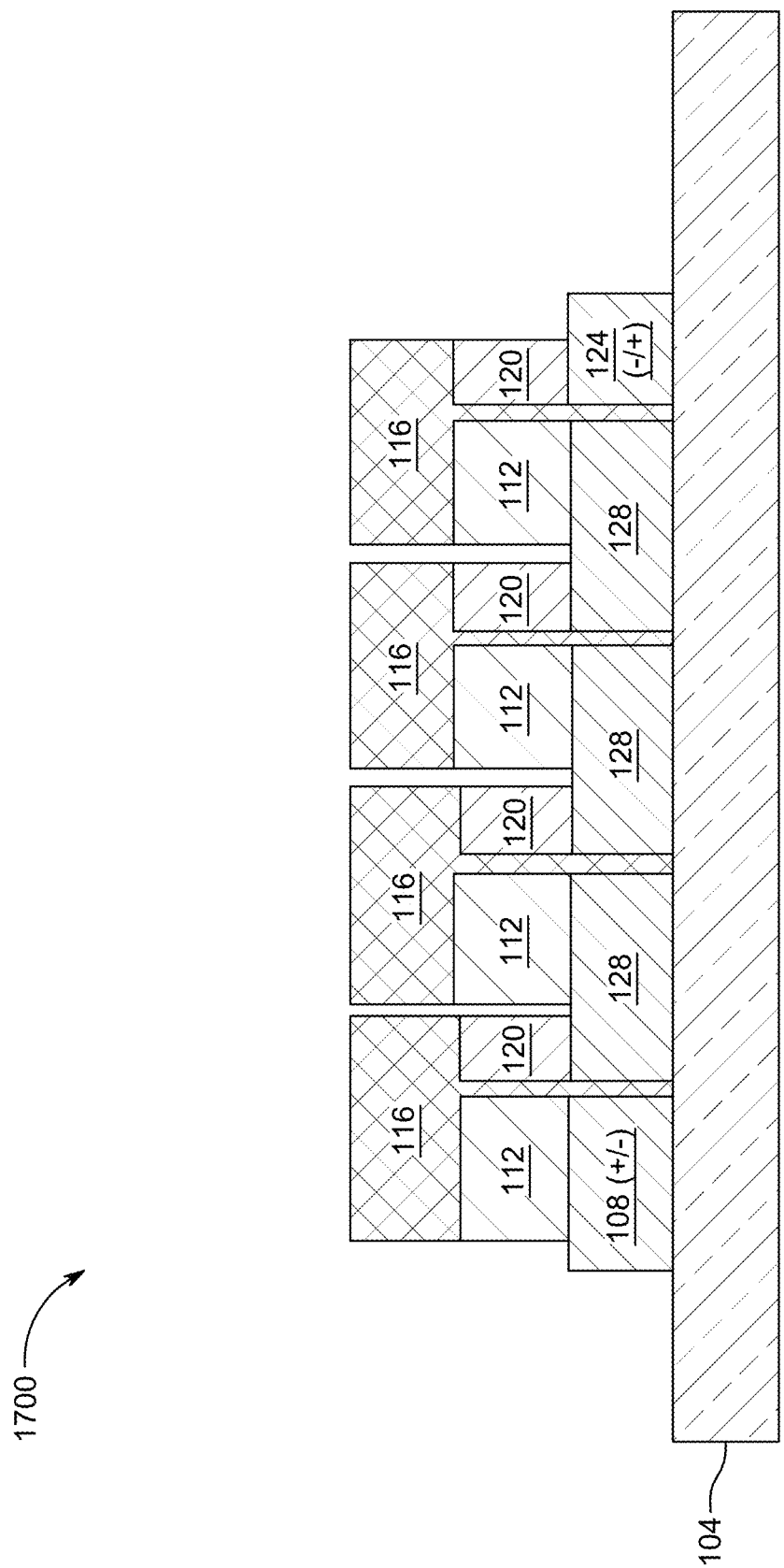
FIG. 17 illustrates a side view of a thin film-based energy storage device having laterally adjacent current collectors and electrode layers, where the energy storage device is fabricated according to the fabrication process illustrated in FIG. 16, and includes four units or cells that are connected in electrical series.

FIG. 16 illustrates plan views of intermediate structures at various stages of fabricating a thin film-based energy storage device (ESD) 1600D having a plurality of ESD cells or units that are electrically connected series, where each of the ESD units comprises laterally adjacent current collectors and electrodes in a similar manner as described above with FIGS. 2A/2B. In the illustrated embodiment, the ESD 1600D includes three units or cells that are connected in electrical series. FIG. 17 illustrates a cross-sectional view of a thin film-based ESD 1700 comprising a plurality of serially connected ESD units each having laterally adjacent current collectors and electrode layers, where the energy storage device is fabricated according to the fabrication process similar to that illustrated in FIG. 16. The ESD 1700 can correspond to the ESD 1600D of FIG. 16 through the section 16-16', except the ESD 1700 includes four units or cells that are connected in electrical series.

The intermediate structure 1600A illustrates a substrate 104 on which a first current collector 108 configured for a first polarity, a second current collector 124 configured for a second polarity opposite to the first polarity, and a plurality of intermediate current collectors 128 are deposited or printed. The intermediate structure 1600B illustrates the intermediate structure 1600A after a first electrode layer 112 is deposited or printed over or on the first current collector 108 and over or on a portion of each of the intermediate current collectors 128. The intermediate structure 1600C illustrates the intermediate structure 1600B after a second electrode layer 120 is deposited or printed over or on the second current collector 124 and over or on a portion of each of the intermediate current collectors 128. The second electrode layer 120 is formed adjacent to the first electrode 112 on each of the intermediate current collectors 128. Thus formed, the first and second electrode layers 112, 120 that are disposed laterally adjacent to each other on different ones of the current collectors 108, 128, 124 are separated by a gap therebetween, in a similar manner to the gap 210 described above with respect to ESDs having laterally disposed electrode layer arrangements (e.g., FIGS. 2A/2B). The intermediate structure 1600D illustrates the intermediate structure 1600C after depositing or printing a separator 116 over each of laterally adjacent pairs of the first and second electrode layers 112, 120. As illustrated in FIG. 17 representing a cross-sectional view of the ESD 1700 that is similar to the view of the section 16-16' through the ESD 1600D, each pair of the first and second electrode layers 112, 120 disposed on electrically separated ones of the current collectors 108, 128, 124 and separated by a gap therebetween. The first and second electrode layers 112, 120 of each ESD unit or cell is formed on different ones of the current collectors 108, 128, 124 while being connected by a separator layer 116 that fills the gap formed therebetween. Thus configured, each of the pairs of first and second electrodes 112, 120 connected by the separator 116 in the horizontal direction represents a unit of ESD, and each of the intermediate electrodes 128 serves to electrically connect in series the first and second electrodes 112, 120 of adjacent ESD units or cells. In the illustrated ESD 1600D illustrated in FIG. 16, three serially connected units or cells of ESDs are formed, where the second electrode layer 120 of the first (uppermost) ESD unit is electrically connected to the first electrode layer 112 of the second (middle) ESD unit, and the second electrode layer 120 of the second (middle) ESD unit is electrically connected to the first electrode layer 112 of the third (lower) ESD unit. The ESD 1700 (FIG. 17) may be similarly arranged with four serially connected units or cells. However, fewer or more units or cells can be connected in series.

It will be appreciated that the multiple units or cells of ESDs described above with respect to FIGS. 16 and 17 may be fabricated in four deposition steps or printing impressions that form three layer levels, including depositing or printing the current collectors 108, 124, 128, depositing or printing the first electrode layers 112, depositing or printing the second electrode layers 120 and depositing or printing the separator 116.

It will be appreciated that, by forming serial connections between adjacent ESD units or cells through intermediate current collector layers 128, the adjacent ESD units or cells can advantageously be directly connected without a need for a separate wire that connects the adjacent ESD units or cells, thereby reducing the amount of electrical wiring connecting the adjacent ESD units or cells. By reducing the amount of electrical wiring and the series resistance between the adjacent ESD units or cells, the amount of excess voltage and/or energy that may be attributed to the series resistance of the electrical wiring can in turn be reduced or eliminated.

In operation, referring to FIG. 17, when a voltage is applied between the first current collector 108 and the second current collector 124 of the thin film-based ESD 1700, ions may be exchanged between the first electrode layer 112 and the second electrode layer 120 of each unit or cell of the ESD 1700 through the corresponding separator 116 formed therebetween. Because of the lateral arrangement of the first and second electrode layers 112, 120, a substantial or a predominant portion of the ionic exchange may occur in a lateral direction, e.g., between overlapping portions of the side surfaces of the first electrode layers 112 and the second electrode layers 120 across the separator-filled gaps 210. Because the adjacent ESD cells or units are electrically connected in series, the output voltages of the individual ESD cells or units are combined as the output voltage of the resulting ESD 1700.

Figure 18:
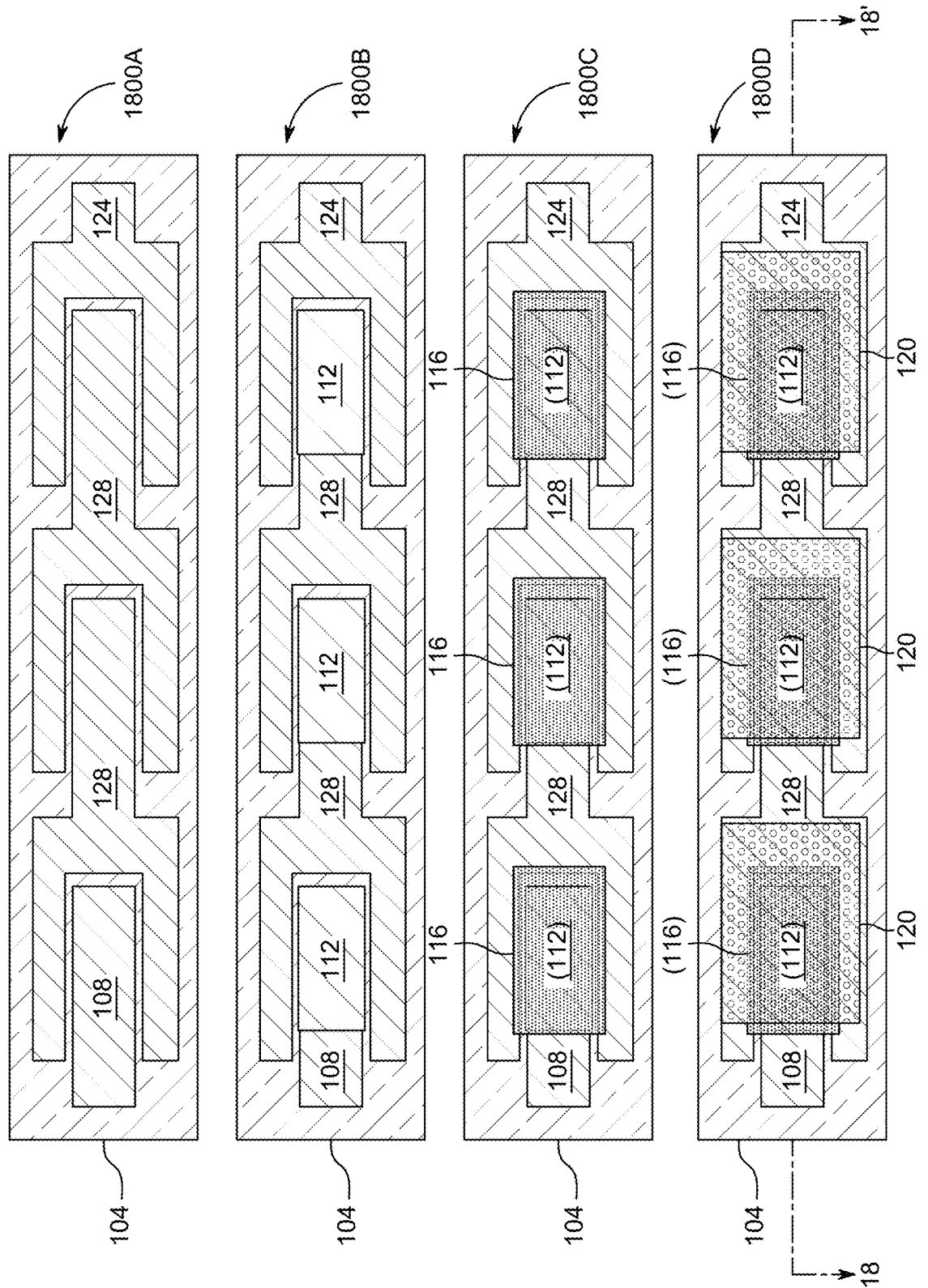
FIG. 18 illustrates plan views of intermediate structures at various stages of fabrication of thin film-based energy storage device having laterally adjacent current collectors and electrode layers that have overlapping portions in the vertical direction, where the energy storage device includes three units or cells that are connected in electrical series. The stages of fabrication include four impressions that form three layer levels.
Figure 19:
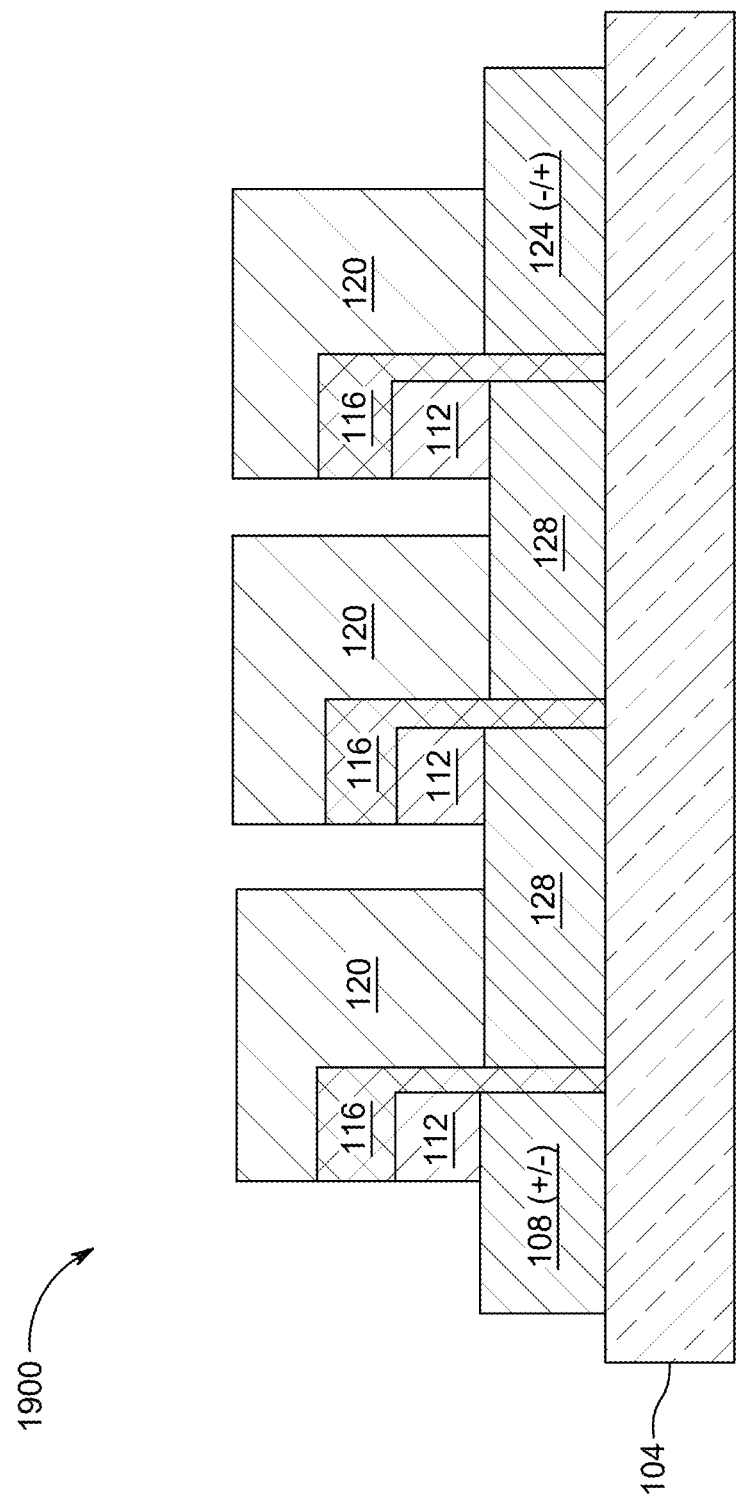
FIG. 19 illustrates a side view a thin film-based energy storage device having laterally adjacent current collectors and electrode layers that have overlapping portions in the vertical direction, where the energy storage device is fabricated according to the fabrication process illustrated in FIG. 18, and includes three units or cells that are connected in electrical series.

FIG. 18 illustrates plan views of intermediate structures at various stages of fabricating a thin film-based energy storage device (ESD) 1800D having a plurality of ESD units or cells that are electrically connected in series, where each of the ESD units comprises laterally adjacent current collectors and electrode layers that have overlapping portions in the vertical direction, in a similar manner as described above with respect to FIG. 4. FIG. 19 illustrates a cross-sectional view of a thin film-based ESD 1900 comprising a plurality of serially connected ESD units that can correspond to the ESD 1800D illustrated in FIG. 18 through the section 18-18'. The intermediate structure 1800A illustrates a substrate 104 on which a first current collector 108 configured for a first polarity, a second current collector 124 configured for a second polarity opposite to the first polarity, and a plurality of intermediate current collectors 128 are deposited or printed. The intermediate current collectors 128 and the second current collector 124 are shaped as a tuning fork. The first current collector 108 is disposed between "prongs" of a first intermediate current collector 128, the "handle" portion of the first intermediate current collector 128 is disposed between "prongs" of a second intermediate current collector 128, and the "handle" portion of the second intermediate current collector 128 is disposed between the "prongs" of the second current collector 124. The intermediate structure 1800B illustrates the intermediate structure 1800A after a first electrode layer 112 is deposited or printed over or on the first current collector 108 and over or on a portion, e.g., the "handle portion," of each of the intermediate current collectors 128. The intermediate structure 1800C illustrates the intermediate structure 1800B after a separator 116 is deposited or printed over or on each of the first electrode layers 112. The intermediate structure 1800D illustrates the intermediate structure 1800C after depositing or printing a second electrode layer 120 over or on each of the separators 116. As illustrated in the ESD 1900 of FIG. 19 representing a cross-sectional view of the section 18-18' through the intermediate structure 1800D in FIG. 18, each of the adjacent pairs of the first and second electrode layers 112, 120 formed on different ones of the current collectors 108, 128, 124 and separated in the horizontal by a gap therebetween. The adjacent ones of the first and second electrode layers 112, 120 that are configured as part of an ESD unit or cell are formed on different ones of the adjacent current collectors 108, 128, 124 while being connected by a separator layer 116 that fills the gap formed therebetween. Thus configured, each of the pairs of first and second electrode layers 112, 120 connected by a separator in the horizontal direction represents a unit of ESD, and each of the intermediate electrodes 128 serves to electrically connect in series the first and second electrodes 112, 120 of adjacent ESD units or cells. In the illustrated ESD 1800D and ESD 1900 of FIGS. 18 and 19, respectively, three serially connected units or cells of ESDs are formed, where the second electrode 120 of the first (leftmost) ESD unit is electrically connected to the first electrode 112 of the second (middle) ESD unit, and the second electrode 120 of the second (middle ESD) unit is electrically connected to the first electrode 112 of the third (rightmost) ESD unit. However, additional units of ESD units may be connected in series.

It will be appreciated that the multiple units or cells of ESDs described above with respect to FIGS. 18 and 19 may be fabricated in four deposition steps or printing \impressions that form three layer levels, including depositing or printing the current collectors 108, 124, 128, depositing or printing the first electrode layers 112, depositing or printing the separator 116, and depositing or printing the second electrode layers 120.

In operation, referring to FIG. 19, when a voltage is applied between the first current collector 108 and the second current collector 124 of the thin film-based ESD 1900, ions may be exchanged between the first electrode layer 112 and the second electrode layer 120 of each unit of ESD through the corresponding separator 116. Because of the vertically overlapping portions of the first and second electrode layers 112, 120, a substantial or a predominant portion of the ionic exchange may occur in the vertical direction between the overlapping portions of the first electrode layers 112 and the second electrode layers 120. Because the adjacent ESD units or cells are electrically connected in series, the output voltages of the individual ESD units or cells are combined as the output voltage of the resulting ESD 1900.

Figure 20:
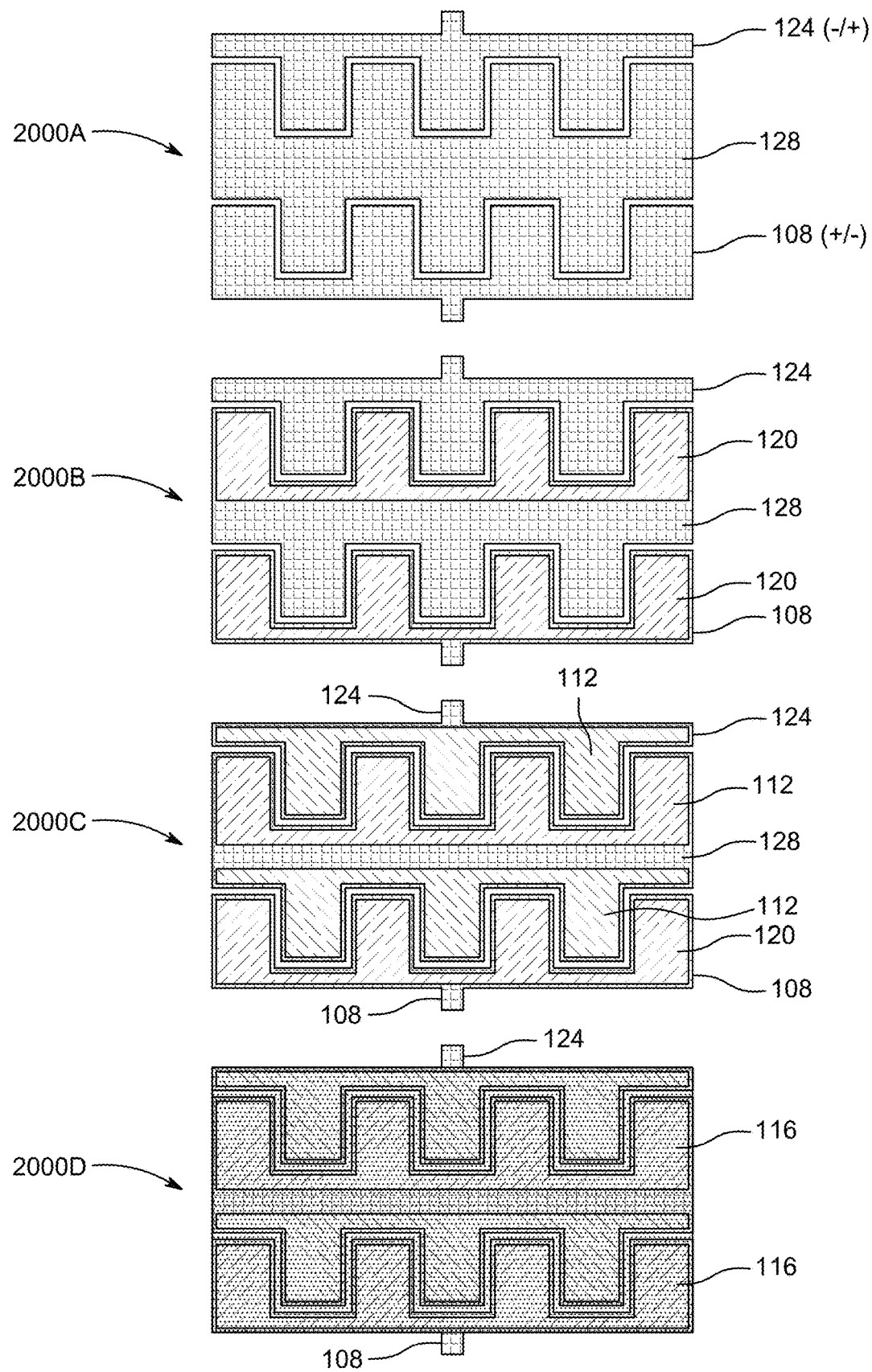
FIG. 20 illustrates plan views of intermediate structures at various stages of fabrication of a thin film-based energy storage device having laterally adjacent current collectors and electrode layers, where each of the first and second electrodes has a plurality of regularly spaced rectangular protrusions or fingers, where the rectangular protrusions or fingers of the first and second electrodes are interlaced or interleaved such that they alternate in a lateral direction. The energy storage device includes two units or cells that are connected in electrical series and is fabricated in four impressions that form three layer levels.

FIG. 20 illustrates plan views of intermediate structures at various stages of fabricating a thin film-based energy storage device (ESD) 2000D having a plurality of ESD cells or units that are electrically connected series. Each of the cells or units comprises laterally adjacent current collectors and electrode layers, where each of the first and second electrodes has a plurality of regularly spaced rectangular protrusions or fingers, where the rectangular protrusions or fingers of the first and second electrodes are interlaced or interleaved such that they alternate in a lateral direction. The intermediate structure 2000A illustrates a first current collector 108 configured for a first polarity, a second current collector 124 configured for a second polarity opposite to the first polarity, and an intermediate current collector 128 formed between the first and second current collectors 108, 124 that are each deposited or printed. In a similar manner as described above with respect to FIG. 10C, each of the first, second and intermediate electrodes 108, 124, 128 has a strap portion and a plurality of regularly spaced rectangular protrusions or fingers, where the rectangular protrusions or fingers of the first and second electrodes alternate in a first lateral direction. The intermediate structure 2000B illustrates the intermediate structure 2000A after a first electrode layer 112 is deposited or printed over or on the first current collector 108 and over or on a portion of the intermediate current collectors 128. The intermediate structure 2000C illustrates the intermediate structure 2000B after a second electrode layer 120 is deposited or printed over or on the second current collector 124 and over or on a portion of the intermediate current collector 128 and adjacent to the first electrode layer 112. The first and second electrodes 112, 120 on the intermediate electrode 128 are physically separated from each other by a gap in the second lateral orthogonal to the first lateral direction. The intermediate structure 2000D represents the intermediate structure 2000C after depositing or printing a separator 116 over each of pairs of first and second electrode layers 112, 120. Thus configured, each of the adjacent pairs of first and second electrode layers 112, 120, that are physically connected, e.g., in the second lateral direction, represents a unit of ESD, and the intermediate electrodes 128 serves to electrically connect in series the first and second electrodes 112, 120 of adjacent units of ESDs. In the illustrated embodiment, two units of ESDs are formed, where the second electrode 120 of the first (upper) ESD unit is electrically connected to the first electrode 112 of the second (lower) ESD unit. However, additional units of ESD units may be connected in series.

It will be appreciated that the multiple units or cells of ESD 2000D may be fabricated in four deposition steps or printing impressions that form three layer levels, including depositing or printing the current collectors 108, 124, 128, depositing or printing the first electrode layers 112, depositing or printing the second electrode layers 120 and depositing or printing the separator 116.

In operation, when a voltage is applied between the first current collector 108 and the second current collector 124 of the thin film-based ESD 2000D, ions may be exchanged between the first electrode 112 and the second electrode 120 of each ESD cell or unit through the corresponding separator 116, in a similar manner as described above with respect to FIG. 17, where, the output voltages of the individual ESD units are combined as the output voltage of the resulting ESD 2000D.

Figure 21:
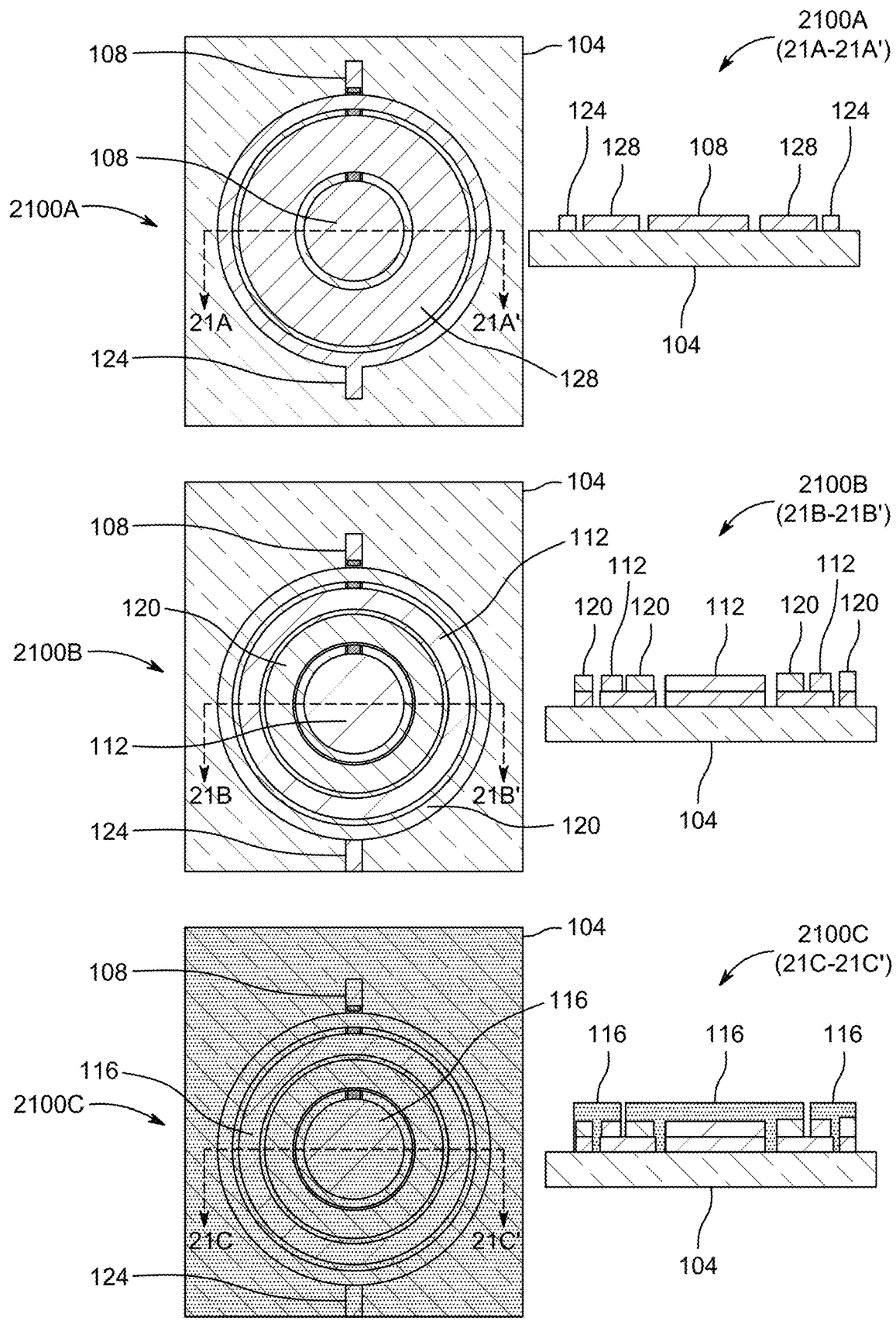
FIG. 21 illustrates plan views and corresponding cross-sectional views of intermediate structures at various stages of fabrication of a thin film-based energy storage device having laterally adjacent current collectors and electrode layers, where each of the first and second electrodes are configured as a plurality of concentric rings. The energy storage device includes two units or cells that are connected in electrical series and is fabricated in four impressions that form three layer levels.

In the embodiments described above, the electrodes of the thin film-based ESDs comprising serially connected ESD units are alternatingly arranged in a lateral direction. However, other shapes of the current collectors and/or electrode layers are possible for reducing the lateral footprint occupied by the ESD. FIG. 21 illustrates plan views and corresponding cross-sectional views of intermediate structures at various stages of fabrication of a thin film-based energy storage device 2100C having laterally adjacent current collectors and electrode layers, where each of the first and second electrodes are configured as a plurality of concentric rings or radially adjacent current collectors and electrodes.

The intermediate structure 2100A illustrates an intermediate structure after the current collectors are printed. Referring to the plan view (left) and a cross sectional view (right) through the section 21A-21A', the intermediate structure 2100A includes a circular first current collector 108 disposed at a central region and configured for a first polarity. The first current collector 108 is surrounded by a circular intermediate current collector 128 concentrically surrounding the first current collector 108. The intermediate structure 2100A further includes a circular second current collector 124 concentrically surrounding the intermediate current collector 128 and configured for a second polarity opposite to the first polarity. To electrically isolate the electrode tab of the first current collector 108 while having lateral access thereto outside the second current collector 124, a conductive line connecting the first current collector 108 to the corresponding electrode tab may be formed under the first current collector 108 and the intermediate current collector 128 and electrically isolated therefrom by an insulating layer (not shown) formed between the conductive line and the second and intermediate current collectors 124, 128.

Still referring to FIG. 21, the intermediate structure 2100B illustrates the intermediate structure 2100A after circular first electrode layers 112 are deposited or printed over or on the first current collector 108 and over or on an outer portion of the intermediate current collector 128, and after circular second electrode layers 120 are deposited or printed over or on the second current collector 108 and over or on inner portion of the intermediate current collectors 128. Referring to the plan view on the left and a corresponding cross sectional view through the section 21B-21B' on the right, the first electrode layer 112 formed on the first current collector 108, the second electrode layer 120 formed on the inner portion of the intermediate current collector 128, the first electrode layer 112 formed on the outer portion of the intermediate current collector 128 and the second electrode layer 120 formed on the second current collector 124 are concentrically formed successively in a radially outward direction. The first and second electrode layers 112, 120 on the intermediate electrode 128 are separated from each other by a gap in the radial direction.

The intermediate structure 2100C illustrates the intermediate structure 2100B after a separator 116 is deposited or printed over or on the first electrode layers 112 and over or on the second electrode layers 120, and in the gaps formed between adjacent current collectors. Thus configured, adjacent pairs of the first and second electrodes 112, 120 in the radial direction that are physically connected by a separator therebetween represents an ESD unit or cell, and the intermediate electrode 128 serves to electrically connect in series the first and second electrode layers 112, 120 of adjacent units or cells of the serially connected ESDs. In the illustrated embodiment, two units of ESDs are serially connected, where the second electrode layer 120 of the first (inner) ESD unit or cell is electrically connected to the first electrode layer 112 of the second (outer) ESD unit through the intermediate current collector 128. However, additional units of ESD units may be connected in series.

In operation, when a voltage is applied between the first current collector 108 and the second current collector 124 of the thin film-based ESD 2100C, ions may be exchanged in a radial direction between the first electrode layer 112 and the second electrode layer 120 of each ESD unit or cell through the corresponding separator 116, in a similar manner as described above with respect to FIG. 17, where the output voltages of the individual ESD units or cells are combined as the output voltage of the resulting ESD 2100C.

Still referring to FIG. 21, in some embodiments, the coverage or surface areas of the first and second electrode layers of each of the ESD units or cells are about the same. In these embodiments, to keep the electrode layers of successive ESD units to have about the same areas, the outer one of the electrode layers of each of the ESD units may be narrower than a corresponding inner one of the electrode layers. However, embodiments are not so limited, and coverage or surface areas of the first and second electrode layers of each of the ESD units or cells may be different, e.g., to accommodate the difference in molar volumes of the electrode active materials, as described above with respect to, e.g., FIGS. 3A/3B.

Figure 22:
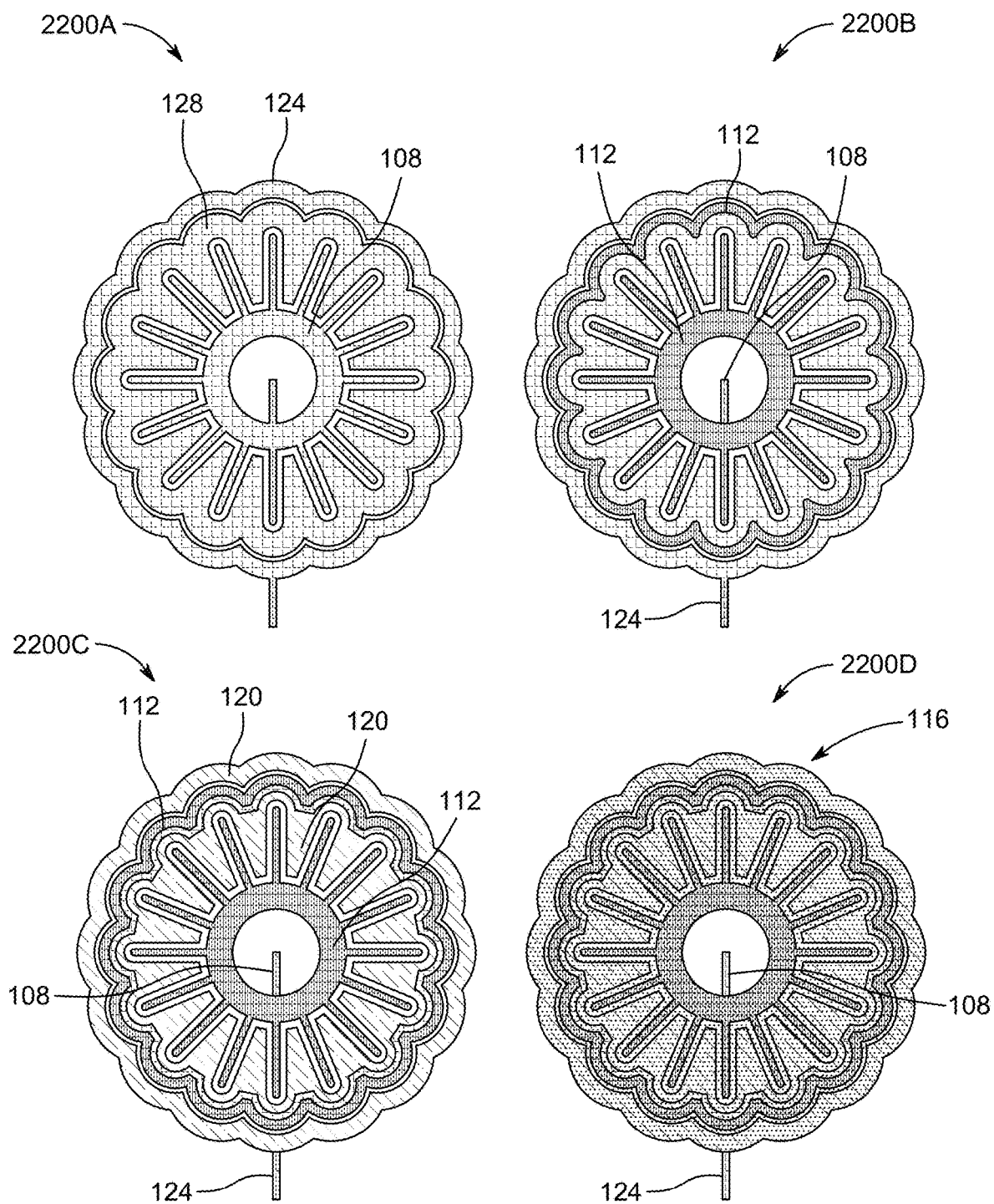
FIG. 22 illustrates plan views of intermediate structures at various stages of fabrication of a thin film-based energy storage device having laterally adjacent current collectors and electrode layers, where each of the first and second electrodes are configured as a plurality of concentric rings having a plurality of regularly spaced elongated protrusions or fingers, where the elongated protrusions or fingers of the first and second electrodes are interlaced or interleaved such that they alternate in a circular direction, for increased overlapping edge lengths of the first and second electrodes. The energy storage device includes two units or cells that are connected in electrical series and is fabricated in four impressions that form three layer levels.

FIG. 22 illustrates intermediate structures at various stages of fabricating a thin film-based energy storage device (ESD) 2200D having a plurality of ESD units that are electrically connected series, where each of the ESD units comprises laterally adjacent current collectors and electrode layers, where each of the first and second electrodes are configured as a plurality of concentric rings or radially adjacent current collectors and electrodes, in a similar manner as described above with FIG. 21. Unlike the ESD 2100C illustrated in FIG. 21, however, in the illustrated embodiment in FIG. 22, the current collectors and the electrodes are shaped such that that the area of overlap between adjacent electrode of opposite polarity is enhanced for ionic exchange and/or shorter charging times with a plurality of protrusions or fingers.

The intermediate structure 2200A illustrates an intermediate structure after the current collectors are printed. Similar to the intermediate structure 2100A described above with respect to FIG. 21, the intermediate structure 2200A includes a circular first current collector 108 having fingers or protrusions pointing radially outward that is disposed at a central region and configured for a first polarity. The intermediate structure 2200B additionally includes a circular intermediate current collector 128 surrounding the first current collector 108 and having protrusions pointing radially inward and protrusions pointing radially outward. The intermediate structure 2200B further comprises a circular second current collector 124 surrounding the intermediate current collector 128 having protrusions pointing radially inward and protrusions pointing radially outward and configured for a second polarity opposite to the first polarity. That is, while the overall radial arrangement is similar to the intermediate structure 2100A illustrated in FIG. 21C, unlike the intermediate structure 2100A, the outer perimeter of the first circular current collector 108 includes a plurality of regularly spaced radial spikes, protrusions or fingers that radially surround a central strap portion. In addition, the inner perimeter of the intermediate current collector 128 includes a plurality of regularly spaced radial spikes, protrusions or fingers radially surrounded by an outer strap portion. The protrusions, fingers or spikes of the first circular current collector 108 and the fingers or spikes of the intermediate current collector 128 are interlaced such that, in an analogous manner as described above with respect to FIG. 10E, the fingers or spikes of the first circular current collector 108 and the intermediate current collector 128 are alternatingly formed at a given radius in a circular direction. The outer perimeter of the intermediate current collector 128 includes a plurality of regularly spaced radial protrusions or corrugations and the inner perimeter of the second current collector 124 includes a plurality of regularly spaced radial protrusions or corrugations. The protrusions or corrugations of the intermediate current collector 128 and the protrusions or corrugations of the second current collector 124 are interlaced such that, in an analogous manner as described above with respect to FIG. 10E, the protrusions or corrugations of the intermediate circular current collector 128 and the second current collector 124 are alternatingly formed at a given radius in a circular direction.

The intermediate structure 2200B illustrates the intermediate structure 2100A after the first electrode layers 112 are deposited or printed over or on the first current collector 108 including the fingers, spikes or protrusions and over or on an outer portion of the intermediate current collector 128 including the protrusions and corrugations.

The intermediate structure 2200C illustrates the intermediate structure 2200B after the second electrode layers 124 are deposited or printed over or on the second current collector 124 including the protrusions or corrugations and over or on an inner portion of the intermediate current collector 128 including the fingers, spikes or protrusions of the intermediate current collector 128.

Thus formed, the inner first electrode layer 112 on the first current collector 108 comprises outward-pointing fingers, spikes or protrusions and the inner second electrode 120 on the intermediate current collector 128 comprises inward-pointing fingers, spikes or protrusions. The fingers, spikes or protrusions of the first electrode layer 112 and the fingers, spikes or protrusions of the second electrode layer 120 are interlaced with each other and are alternatingly formed at a given radius in a circular direction. Similarly, the outer first electrode layer 112 on the intermediate current collector 128 comprises protrusions or corrugations and the outer second electrode layer 120 on the second current collector 124 comprises protrusions or corrugations. The protrusions or corrugations of the first electrode layer 112 and the protrusions or corrugations of the adjacent second electrode layer 120 are interlaced and are alternatingly formed at a given radius in a circular direction.

The intermediate structure 2200D illustrates the intermediate structure 2100B after a separator 116 is deposited or printed over or on the first electrodes 112 and over or on the second electrodes 120, and in the gaps formed between adjacent electrodes, in a similar manner as described above with respect to FIG. 21. Thus configured, adjacent pairs of first and second electrode layers 112, 120 in the radial direction that are physically connected by a separator therebetween represents an ESC unit or cell, and the intermediate electrode 128 serves to electrically connect in series the first and second electrode layers 112, 120 of adjacent units or cells of the serially connected ESDs. In the illustrated embodiment, two units of ESDs are serially connected, where the second electrode layer 120 of the first (inner) ESD unit is electrically connected to the first electrode layer 112 of the second (outer) ESD unit through the intermediate current collector 128. However, additional units of ESD units may be connected in series.

In operation, when a voltage is applied between the first current collector 108 and the second current collector 124 of the thin film-based ESD 2200D, ions may be exchanged between protrusions of the first electrode layer 112 and the protrusions of the second electrode layer 120 of each ESD unit or cell through the corresponding separator 116, in a similar manner as described above with respect to FIG. 17, where the output voltages of the individual ESD units are combined as the output voltage of the resulting ESD 2200D.

It will be appreciated that, in FIG. 22, the protrusions of the electrodes and current collectors of inner and outer ESD units can have any suitable shape, e.g., any of the shapes described above with respect to FIGS. 10C-10E, which may be particularly configured to achieve desired ion exchange enhancement effects.

It will be appreciated that an ESD having electrodes arranged as in FIG. 22 can have, in addition to the increased utility advantages such as enhanced ionic exchange between electrodes of opposite types, aesthetic advantage, e.g., for wearable devices.

It will be appreciated that, as described herein, while some ESDs may be described as having a particular number of ESD cells or units that are electrically connected in series, embodiments are not so limited and any number of ESD units can be electrically connected in series, thereby forming an ESD having any suitably high output voltage that is a sum of output voltages of the ESD cells or units therein. For example, each ESD unit may have an output voltage of 0.5V to 1.0V, 1.0V to 1.5V, 1.5V to 2.0 V, 2.0V to 2.5V, 2.5V to 3.0V, 3.0V to 3.5V, 3.5V to 4.0V, 4.5V to 5.0V, or a voltage in range defined by any of these values, for instance 1.4-2.7V.

It will further be appreciated that, as described herein, while some ESDs having serially connected ESD cells or units may have particular shapes of current collectors and/or electrodes and their arrangements that have been illustrated, other shapes and arrangements are possible, e.g., any polygonal shapes and linear and nonlinear arrangements to further increase the overlapping area between electrode layers of opposite polarities to increase current.

Wearable Thin Film-Based Energy Storage Devices Integrated with Core Devices

Many wearable personal electronics can benefit from an energy storage device (ESD) that is integrated with a core device. To be integrated with a core device as part of a wearable device, the ESD should ideally be flexible, light weight, customizable, wearable, skin-conforming, and/or monolithically integratable with the core device. Such ESD can be suitable, among other things, as wearable healthcare devices for applications in fitness, medical diagnosis, prosthetics, and robotics, to name a few. Various embodiments of thin film-based or printed ESDs described herein can advantageously be integrated with a core device as part of various wearable devices.

Figure 23:
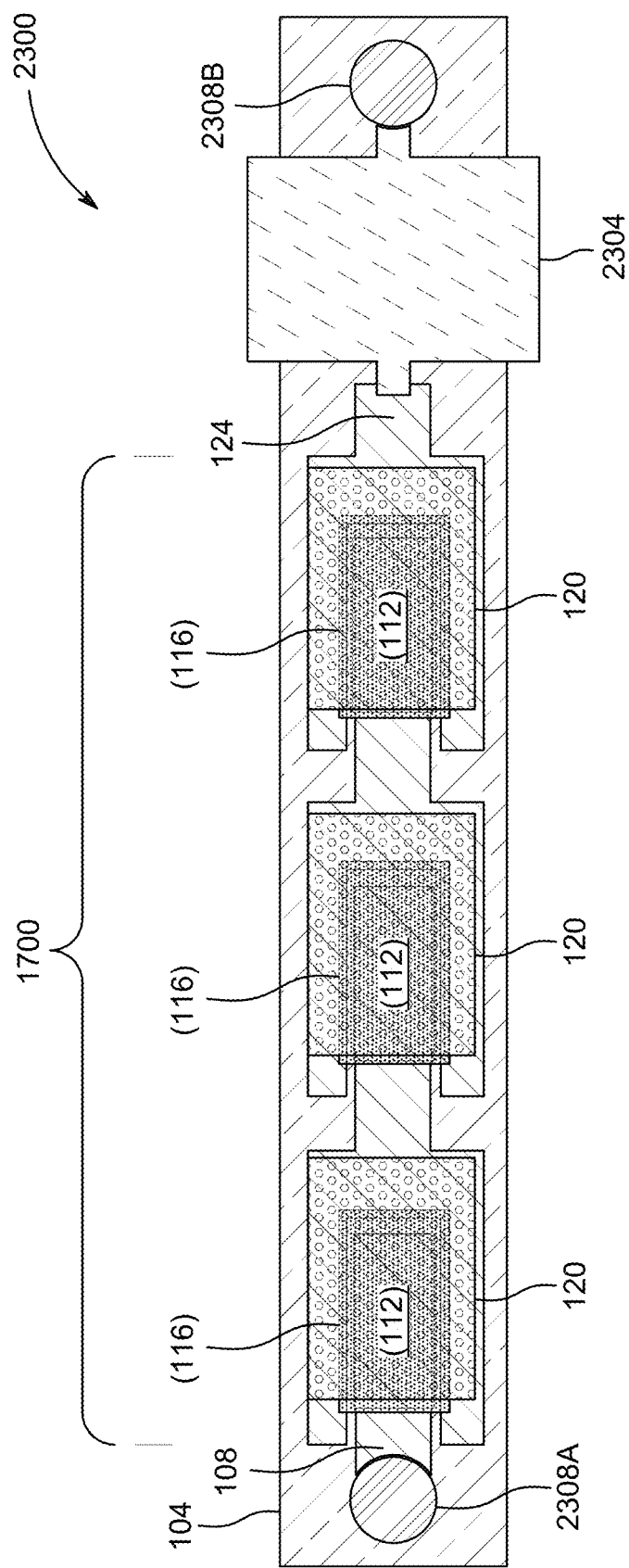
FIG. 23 illustrates a plan view of a wearable thin film-based electronic device that is integrated with a thin film-based energy storage device, where the energy storage device has a plurality of units or cells that are connected in electrical series.

FIG. 23 illustrates a plan view of a wearable device 2300 including a core device 2304 that is integrated with an energy storage device (ESD) 1700, where the ESD 1700 has a plurality of units or cells that are connected in electrical series. The wearable device 2300 can be configured as, e.g., a bracelet that can be worn around an extremity. The ESD 1700 is configured similarly as the ESD 1700 described above with respect to FIG. 17, the detailed description of which is omitted herein for brevity. The core device 2304 can be any suitable personal device, such as a healthcare or personal device, which is electrically connected to, e.g., the second electrode 124. To name a few examples, the core device 2304 that can be integrated with an ESD 1700 according to various embodiments described herein include, among other things, a light emitting device such as a light emitting diode, an active or passive radio frequency identification device (RFIDs), a Bluetooth® device, a sensor, an infrared (IR) device such as an IR receiver, interface electronics, a Zigbee®-based device, a near-field communication (NFC)-based device, a smart band, a health monitor, and a tracking device.

In some implementations, the wearable device 2300 may be pre-activated. That is, the core device 2304 and the ESD 1700 may be electrically connected as part of an activated circuit. In some other implementations, the wearable device 2300 may be configured to activated by a user prior to use. For example, in the illustrated embodiment, a pair of attachable electrodes, e.g., clip-on electrodes, may be provided such that the core device 2304 may be activated upon being electrically connected as part of a closed circuit with the ESD 1700. The latter type of configurations can advantageously conserve the stored energy in the ESD 1700 until the wearable device 2300 is ready to be used. There may be one or more ESD units electrically connected in series in the ESD 1700 to meet the specific output voltage requirement of the core device 2304.

Field-Configurable Thin Film-Based Energy Storage Devices

In some applications, it may be desirable for an energy storage device (ESD) to be "field-configurable." As described herein, field-configurability refers to a configuration in which a user can customize the voltage and/or capacity of the ESD prior to use. As described above, a desired operating voltage of an ESD may be attained by connecting two or more ESD units or cells in series, where each of the ESD units or cells adds its voltage potential to the total terminal voltage. On the other hand, a desired capacity may be attained by connecting two or more ESD units or cells in parallel, where each of the ESD units or cells adds its capacity to the total capacity measured in amperehour (Ah).

Figure 24:
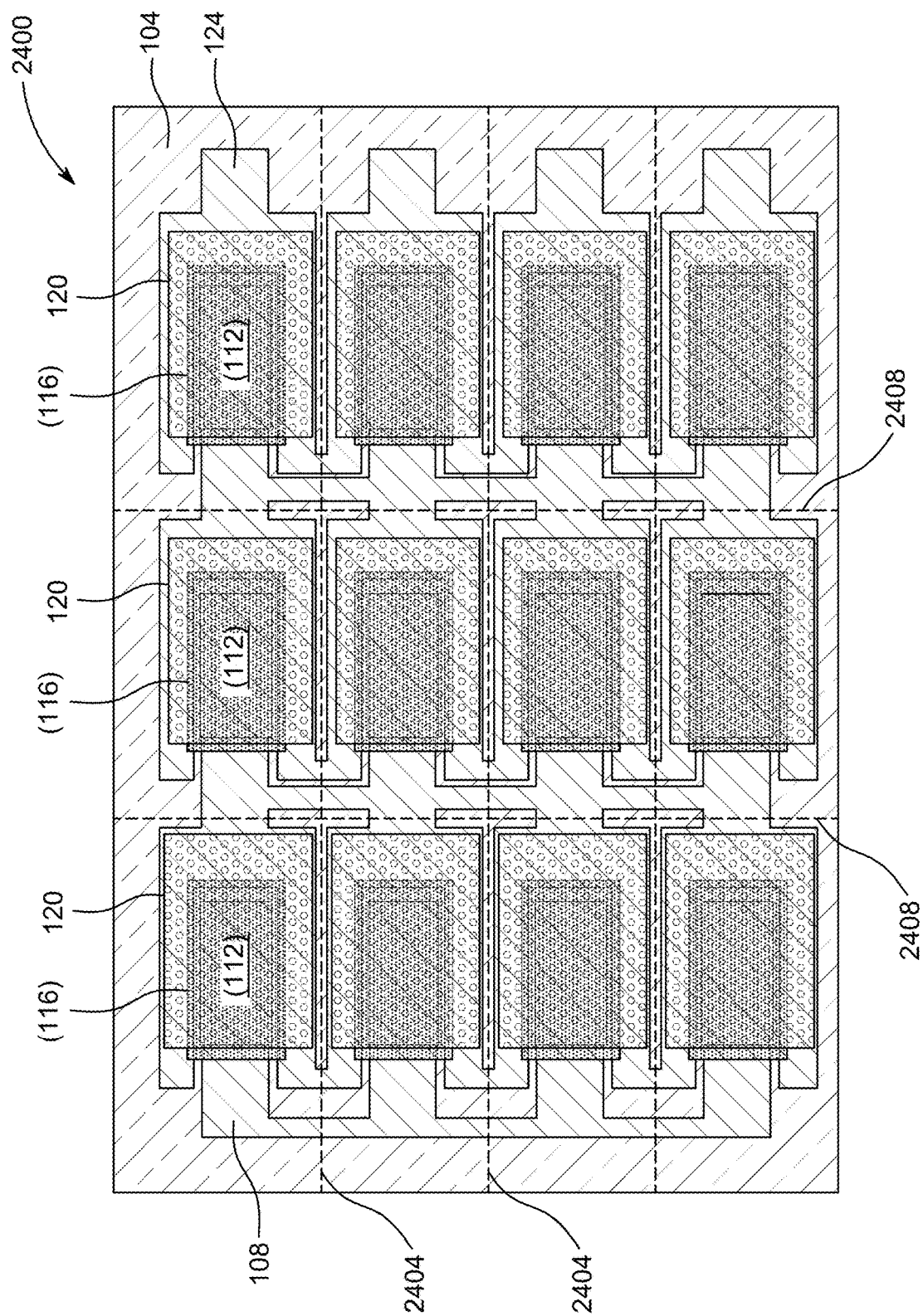
FIG. 24 illustrates a plan view of a field-configurable thin film-based energy storage device having an array of units or cells that are formed on a substrate having perforations such that a desired number of units or cells can be connected in electrical series or parallel for customizable voltage and capacity.

FIG. 24 illustrates a plan view of a field-configurable thin film-based energy storage device (ESD) 2400 having an array of ESD units or cells that are formed on a substrate having perforations such that a desired number of units or cells can be connected in electrical series or parallel for customizable voltage and/or capacity. The ESD 2400 comprises a substrate 104 in the form of a sheet of insulating material. The substrate 104 comprises a plurality of horizontal rows of perforations 2404 and a plurality of vertical columns of perforations 2408. The lines of perforations divide the substrate 104 into an array of unit substrates formed by the plurality of rows of horizontal perforations 2404 and the plurality of columns by vertical perforations 2408. The perforations are configured such that a user can tear along any desired path to define a contiguous substrate having a desired number of unit substrates each having an ESD unit or cell formed thereon.

Still referring to FIG. 24, an ESD cell or unit similar to the ESD 400 described above with respect to FIG. 4 is formed in each of the unit substrates, such that the ESD 2400 comprises an array of ESD cells or units comprising one or more rows of ESD cells or units and one or more columns of ESD cells or units. Each row of the ESD 2400 comprises a plurality of ESD units comprising a first current collector 108, a second current collector 124 and one or more intermediate current collectors 128 that are configured as described above with respect to the ESD 1900 in FIG. 19, the detailed description of which is omitted herein for brevity. In addition, the first current collectors 108 of the ESD units in each of the columns are connected to each other, the intermediate collectors 128 of the ESD units in each of the columns are connected to each other, and the second current collectors 124 of the ESD units in each of the columns are connected to each other. As configured, the ESD cell or units in a given row are electrically connected in series, and the ESD cells or units in a given column are electrically connected in parallel.

In use, any desired pattern of ESD cells or units can be formed by tearing along the perforations that outline the desired pattern, such that the ESD units are electrically connected in a combination of electrical series and/or parallel to provide a customized capacity and output voltage. When the pattern of ESD units are formed by tearing along the perforations, the overlying current collectors may separate by brittle fracture.

While in the illustrated embodiment, the horizontal perforations 2404 and vertical perforations 2408 facilitate the separation of the ESD units, embodiments are not so limited. In other embodiments the separation of the ESD units may be facilitated by grooves, notches, thinned regions, impressions, etc. In yet other embodiments, the ESD units may be separated simply by hand or by using cutting devices such as scissors or knives.

Thin Film-Based Energy Storage Devices Integrated with Thin Film-Based Core Devices Various thin film-based energy storage devices (ESDs) described herein may be integrated with various thin filmbased core devices powered by the ESD, thereby forming an integrated thin film-based electronic device comprising a thin film-based core device and a thin film-based ESD. Efficient integration may be achieved in part because similar materials may be used to print different components of the ESD and the thin film-based core device powered by the thin film-based ESD. At least some layers of the thin film-based ESD can be printed on, e.g., directly on, the thin film-based core device powered by the thin film-based ESD, which may in turn be partly or entirely formed of printed components or layers. In some implementations, substantially the entire integrated thin film-based electronic device including the thin film-based ESD and the thin film-based core device can be fabricated by printing.

An integrated thin film-based electronic device including a thin film-based ESD and an integrated thin film-based core device powered by the ESD can have various advantages. For example, the operational current and/or voltage of the ESD can be customized as described above to meet the operational power and energy needs of the integrated thin film-based core device. In addition, the integrated thin film-based electronic device can enable reduction in the overall thickness and/or footprint of the combination of the thin film-based ESD and the thin film-based core device. In addition, the integrated thin film-based electronic device can enable reduction in the overall number of manufacturing process steps.

In various embodiments described below, the thin film-based ESD can be integrated with the thin film-based core device powered by the ESD by forming at least one layer of the ESD on, e.g., directly on, the thin film-based core device powered by the ESD. Alternatively, at least one layer of the thin film-based core device powered by the ESD can be formed on, e.g., directly on, the thin film-based ESD. For example, at least one layer of the ESD may be printed on, e.g., directly printed on, the thin film-based core device powered by the ESD. Alternatively, at least one layer of the thin film-based core device powered by the ESD may be printed on, e.g., directly printed on, the thin film-based ESD. By having at least one layer of one of the thin film-based ESD or the thin film-based core device formed or printed on the other of the thin film-based ESD or the thin film-based core device, the two devices can be disposed at relative positions that may provide various advantages. For example, by directly printing at least one layer of one of the thin film-based ESD or the thin film-based core device on the other of the thin film-based ESD or the thin film-based core device, the amount of electrical wiring connecting the two devices can be reduced. By reducing the amount of electrical wiring and the series resistance between the thin film-based ESD and the thin film-based core device powered by the ESD, the amount of excess voltage and/or energy that may be attributed to the series resistance of the electrical wiring can in turn be reduced or eliminated.

Figure 25:
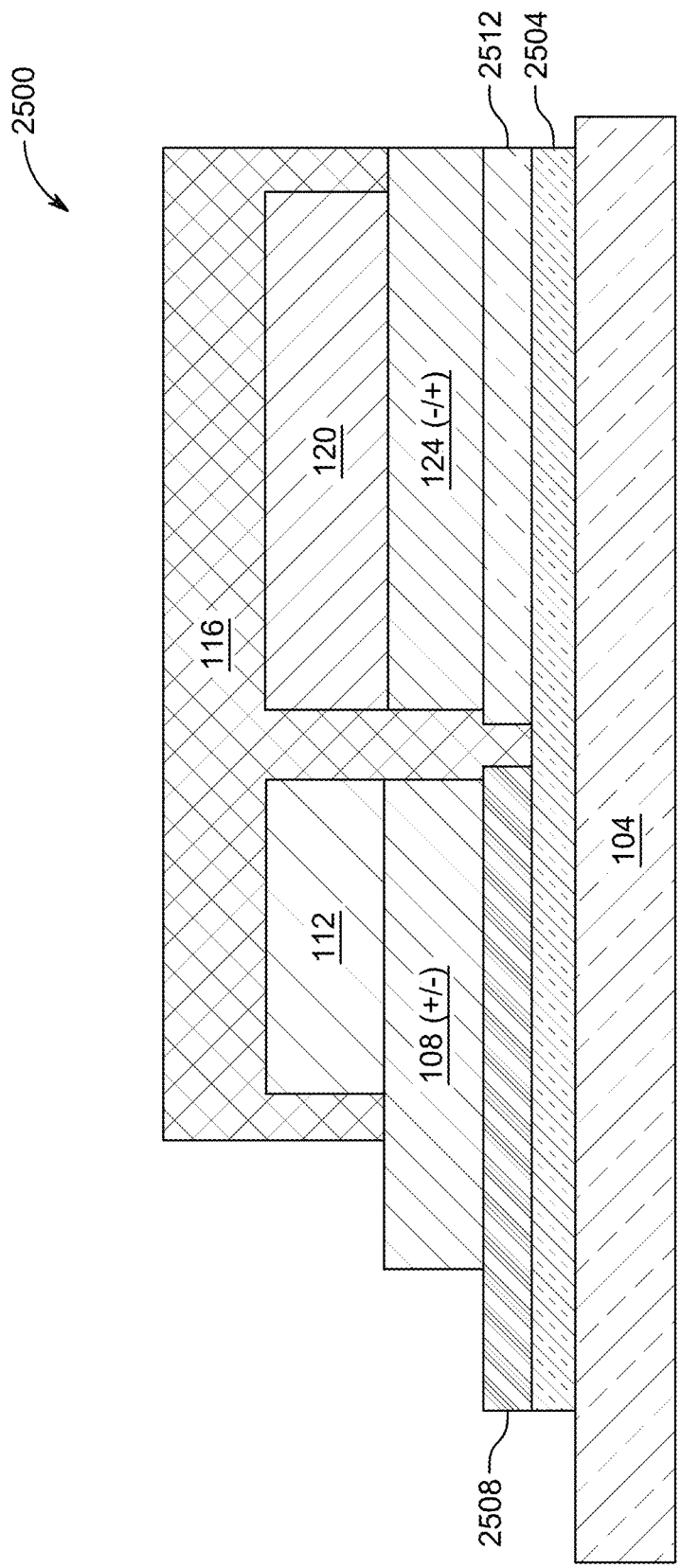
FIG. 25 illustrates a side view of an integrated thin film-based electronic device having integrated therein a thin film-based energy storage device having laterally adjacent current collectors and electrode layers, and a thin film-based core device having laterally arranged electrical terminals and powered by the thin film-based energy storage device.

FIG. 25 illustrates a side view of an integrated thin film-based electronic device 2500 according to some embodiments, having integrated therein a thin film-based energy storage device (ESD) having laterally adjacent current collectors and electrode layers, and a thin film-based core device having laterally arranged electrical terminals and powered by the thin film-based ESD.

The integrated thin film-based electronic device 2500 includes a thin film-based core device 2504 formed on a substrate 104. The thin film-based core device 2504 has formed thereon first and second terminals 2508, 2512 that are configured to receive power and energy from the thin film-based ESD. The first and second terminals 2508, 2512 are formed laterally adjacent to each other and over or on the thin film-based core device 2504. One or more components or layers of the thin film-based core device 2504 including the first and second terminals 2508, 2512 can be printed using a suitable printing process described herein.

The thin film-based core device 2504 can be any suitable device suitable for integration with a thin film-based ESD, such as a healthcare or personal device. To name a few examples, the thin film-based core device 2504 can include, among other things, a light emitting device such as a light emitting diode, an acoustic device, a monitor device, a motor device, a movement device, a display device, an antenna, an active or passive radio frequency identification device (RFIDs), a Bluetooth® device, a sensor, an infrared (IR) device such as an IR receiver, interface electronics, a Zigbee®-based device, a A-wave device, a near-field communication (NFC)-based device, a smart band, a health monitor, a fitness tracking device, a smart watch, a position-tracking device such as a GPS-tracking device, a low power wireless personal area network (LoWPAN) device, and a low power wide area network (LPWAN) device a to name a few examples.

The first terminal 2508 can be, e.g., one of a positive or a negative power terminal, and the second terminal 2512 can be, e.g., the other of the positive or the negative power terminal. The first and second terminals 2508, 2512 are configured to receive power therethrough to provide the power and energy to the thin film-based core device 2504.

Still referring to FIG. 25, the integrated thin film-based electronic device 2500 additionally includes an integrated thin film-based ESD formed over the thin film-based core device 2504. The thin-film based ESD is positioned such that at least a portion thereof laterally overlaps the underlying thin film-based core device 2504. The thin film-based ESD is similar to the thin film-based ESD 200 illustrated with respect to FIGS. 2A and 2B. The integrated thin film-based ESD includes a first current collector 108, a second current collector 124, a first electrode layer 112, a second electrode layer 120 and a separator 116, and the detailed description of corresponding features is omitted herein for brevity.

In the integrated thin film-based electronic device 2500, the first and second current collectors 108, 124 are electrically connected to the first and second terminals 2508, 2512, respectively. In the illustrated embodiment, advantageously, because the thin film-based ESD is formed over to overlap the underlying thin film-based core device 2504, the first and second current collectors 108, 124 can be formed on or directly on, e.g., directly printed on, the first and second terminals 2508, 2512, respectively. It will be appreciated that, when the first and the second terminals 2508, 2512 are formed directly on the first and second current collectors 108, 124 respectively as illustrated, one or more intervening conductive elements such as wires can be omitted, thereby reducing excess voltage or energy dissipated by the intervening conductive elements. However, embodiments are not so limited and in some other embodiments, there may be intervening conductive elements, e.g., printed conductive structures, between the first current collector 108 and the first terminal 2508, and/or between the second current collector 120 and the second terminal 2512. Because the thin film-based ESD is positioned relatively in close proximity to the thin film-based core device 2504, the amount of electrical series resistance resulting therefrom is reduced or minimized.

Figure 26:
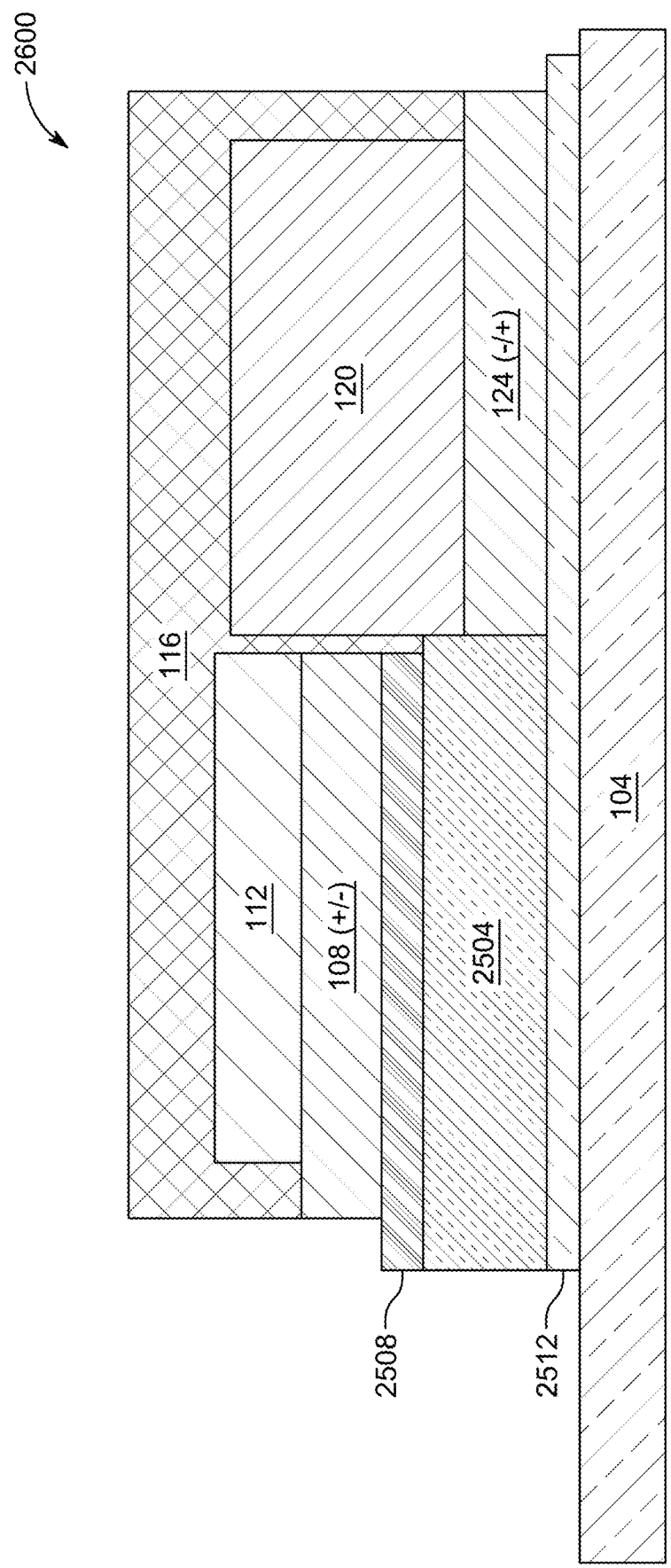
FIG. 26 illustrates a side view of an integrated thin film-based electronic device having integrated therein a thin film-based energy storage device having laterally adjacent current collectors and electrode layers, and a thin film-based core device having vertically arranged electrical terminals and powered by the thin film-based energy storage device.

FIG. 26 illustrates a side view of a thin film-based energy storage device 2600 according to some embodiments, having integrated therein a thin film-based energy storage device (ESD) having laterally adjacent current collectors and electrode layers, and a thin film-based core device having vertically arranged electrical terminals and powered by the thin film-based ESD. Similar to the device illustrated with respect to FIG. 25, the integrated thin film-based electronic device 2600 includes a thin film-based core device 2504 formed on a substrate 104 and an integrated thin film-based ESD. The features of integrated thin film-based electronic device 2600 that correspond to or are analogous to those of the integrated thin film-based electronic device 2500 (FIG. 25) are omitted herein for brevity.

The thin film-based core device 2504 has formed thereon first and second terminals 2508, 2512 and is configured to receive power and energy from the thin film-based ESD. However, unlike the thin film-based core device illustrated with respect to FIG. 25, the first and second terminals 2508, 2512 of the thin film-based core device 2504 are disposed on opposing surfaces of the thin film-based core device 2504 in the vertical direction. The first terminal 2508 is formed on the top surface of the thin film-based core device 2504 and does not extend outside thereof, while the second terminal 2512 is formed on the bottom surface of the thin film-based core device 2504 and extends beyond the bottom surface thereof.

Still referring to FIG. 26, the integrated thin film-based electronic device 2600 additionally includes an integrated thin film-based ESD formed over the thin film-based core device 2504. Similar to that described above with respect to FIG. 25, the thin film-based ESD is positioned such that at least a portion thereof laterally overlaps the underlying thin film-based core device 2504. The integrated thin film-based ESD includes a first current collector 108, a second current collector 124, a first electrode layer 112, a second electrode layer 120 and a separator 116. The thin film-based core device 2504 is disposed between the first current collector 108 and the substrate 104, such that, while the first current collector 108 and the first electrode layer 112 overlap the thin film-based core device 2504, the second current collector 124 and the second electrode layer 120 are formed on the portion of the second terminal 2512 that extends beyond the bottom surface of the thin film-based core device 2504, and do not overlap the thin film-based core device 2504.

Figure 27:
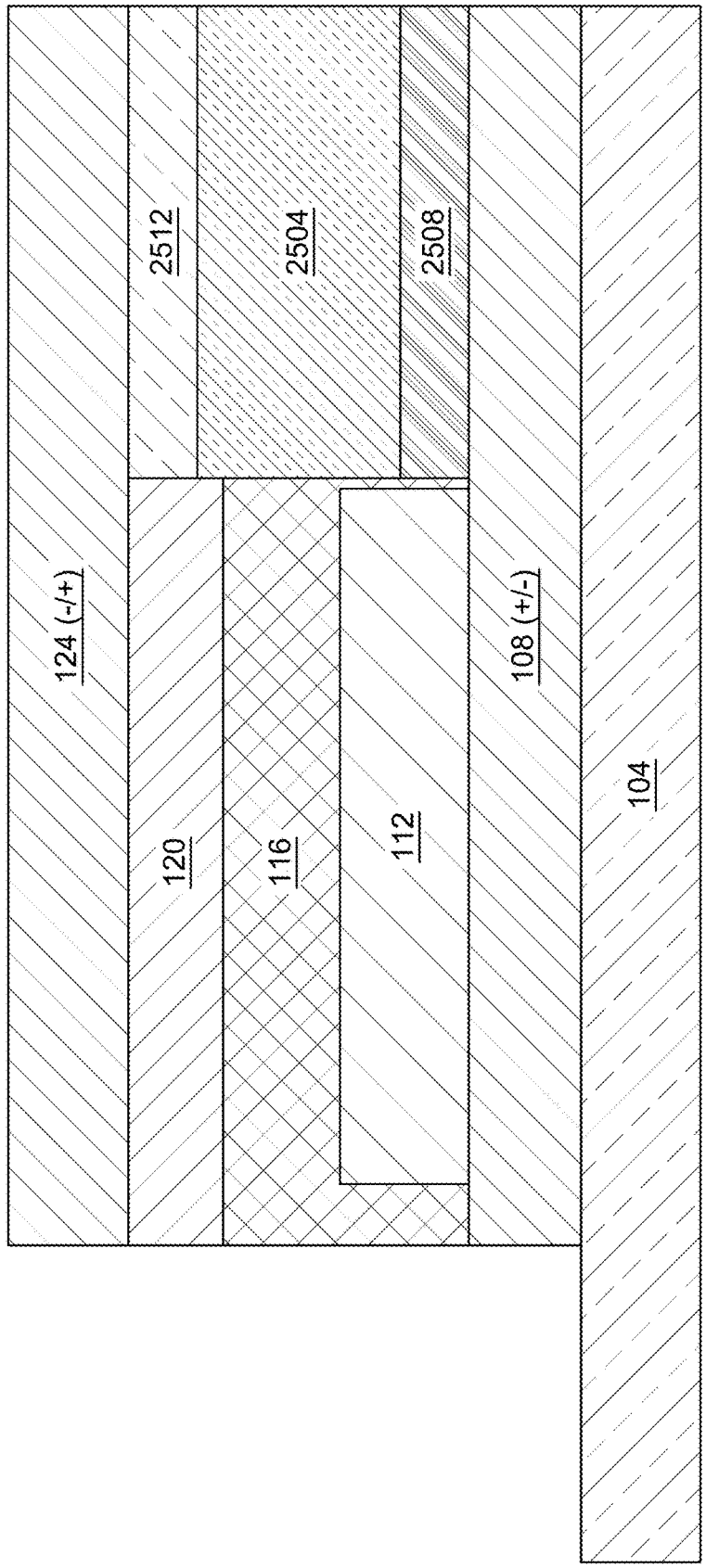
FIG. 27 illustrates a side view of an integrated thin film-based electronic device having integrated therein a thin film-based energy storage device having vertically stacked current collectors and electrode layers, and a thin film-based core device having vertically arranged electrical terminals and powered by the thin film-based energy storage device.

FIG. 27 illustrates a side view of a thin film-based energy storage device 2700 according to some embodiments, having integrated therein a thin film-based ESD having vertically stacked current collectors and electrode layers, and a thin film-based core device having vertically arranged electrical terminals and powered by the thin film-based ESD.

Similar to the device illustrated with respect to FIGS. 25 and 26, the integrated thin film-based electronic device 2700 includes a thin film-based core device 2504 formed on a substrate 104 and an integrated thin film-based ESD. The features of integrated thin film-based electronic device 2700 that are similar or analogous to those of the integrated thin film-based electronic devices 2500, 2600 (FIGS. 25, 26) are omitted herein for brevity.

The thin film-based core device 2504 has formed thereon first and second terminals 2508, 2512 and is configured to receive power and energy from the thin film-based ESD. Similar to the thin film-based core device illustrated with respect to FIG. 26, the first and second terminals 2508, 2512 of the thin film-based core device 2504 are disposed on opposing surfaces of thin film-based core device 2504 in the vertical direction. The first terminal 2508 is formed on the bottom surface of the thin film-based core device 2504, and the second terminal 2512 is formed on the top surface of the thin film-based core device 2504.

Still referring to FIG. 27, similar to the devices described above with respect to FIGS. 25 and 26, the thin film-based ESD is positioned such that at least a portion thereof laterally overlaps the thin film-based core device 2504. However, unlike the integrated thin film-based ESDs having laterally adjacent current collectors and electrodes described above with respect to FIGS. 25 and 26, the thin film-based ESD of the integrated thin film-based electronic device 2700 has vertically stacked current collectors and electrode layers, in a similar manner as described above with respect to FIG. 1. The ESD includes a substrate 104 on which a stack of layers is formed. The stack of layers includes a first current collector 108 of a first type formed over or on the substrate 104, a first electrode layer 112 of a first type formed over or on the first current collector 108, a separator 116 formed over or on the first electrode 112, a second electrode layer 120 of a second type formed over or on the separator 116 and a second current collector 124 of a second type formed over or on the second electrode layer 120. The first current collector 108 laterally extends outside and beyond the first electrode layer 112, and the first terminal 2508 of the thin film-based core device 2504 is formed to overlap, on or in contact therewith. Similarly, the second current collector 124 laterally extends outside and beyond the second electrode layer 120, and the second terminal 2512 of the thin film-based core device 2504 is formed to overlap, on or in contact therewith. Thus configured, the stack including the first electrode layer 112, the separator 116 and the second electrode layer 120 is formed adjacent to the stack including the first terminal 2508, the thin film-based core device 2504 and the second terminal 2512, where both stacks are vertically interposed between the first and second current collectors 108, 124.

Figure 28:
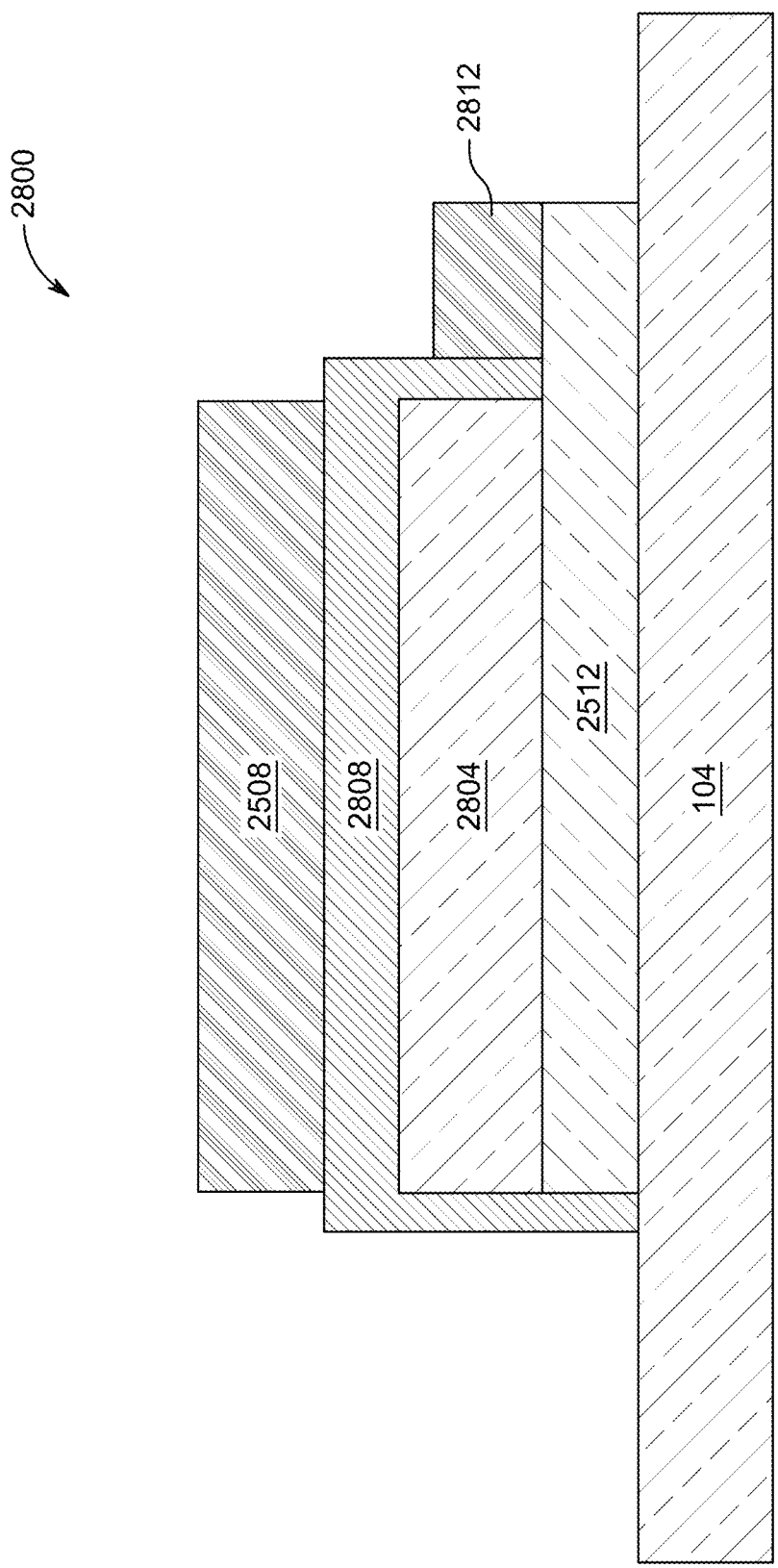
FIG. 28 illustrates a thin film-based light-emitting device having vertically arranged electrical terminals and configured to be integrated with and powered by various thin film-based energy storage devices described herein.
Figure 29:
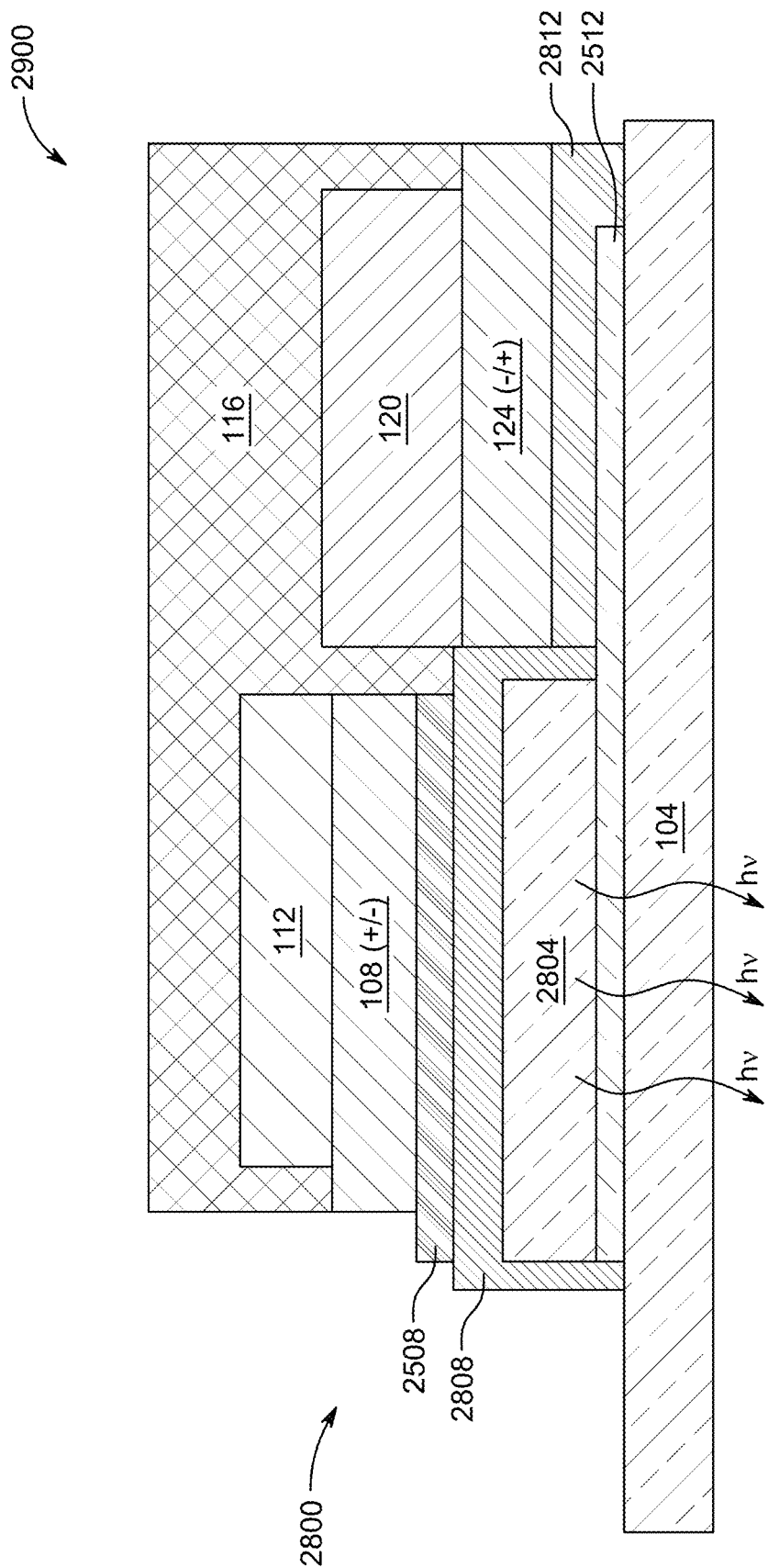
FIG. 29 illustrates a side view of an integrated thin film-based electronic device having integrated therein a thin film-based energy storage device having laterally adjacent current collectors and electrode layers, and the thin film-based light-emitting device illustrated with respect to FIG. 28 having vertically arranged electrical terminals and powered by the thin film-based energy storage device.

FIG. 28 illustrates a thin film-based light-emitting device 2800 having vertically arranged electrical terminals and configured to be powered by various thin film-based energy storage devices described herein. FIG. 29 illustrates a side view of an integrated thin film-based electronic device 2900 having integrated therein a thin film-based ESD having laterally adjacent current collectors and electrode layers, and the thin film-based light-emitting device illustrated with respect to FIG. 28 having vertically arranged electrical terminals and powered by the thin film-based ESD. Similar to the device illustrated with respect to FIG. 26, the integrated thin film-based electronic device 2900 includes a thin film-based electronic device that is a thin film-based light emitting device 2800, and an integrated thin film-based ESD. The features of integrated thin film-based electronic device 2900 that are similar or analogous to those of the integrated thin film-based electronic device 2600 (FIG. 26) are omitted herein for brevity.

Referring to FIG. 28, the thin film-based light-emitting device 2800 may be formed over or on the substrate 104, which can be a transparent glass or polymeric substrate, e.g., a PET substrate. The light-emitting device 2800 comprises a light-emitting layer 2804, which can include one or more light emitting elements, such as light emitting diodes (LEDs). The light-emitting device 2800 has formed thereon or thereover first and second terminals 2508, 2512 that are configured for receiving power and energy from the thin film-based ESD. The first and second terminals 2508, 2512 may be disposed on opposing surfaces of the light-emitting layer 2804 in the vertical direction. The first terminal 2508 is formed on the top surface of the light-emitting layer 2804 and does not extend outside thereof, while the second terminal 2512 is formed on the bottom surface of the light-emitting layer 2804 and extends beyond the bottom surface thereof.

In some embodiments, the light-emitting device 2800 is configured to emit light (hv) through the transparent substrate 104. In these embodiments, the second terminal 2512 comprises a transparent conductor. The transparent conductor can include, e.g., indium tin oxide (ITO) or a thin film comprising silver, e.g., a silver nanowire-based coating. The first terminal 2508 may be formed of any printable conductive material described herein, e.g., conductive silver. In the illustrated embodiment, an additional conductive layer 2812 may be formed on the second terminal 2512 to provide mechanical stability, additional electrical conductivity or both.

In some embodiments, the light emitting device 2800 may be encapsulated, e.g., hermetically sealed, in an insulator layer or a passivating layer 2808 such as an oxide, a nitride or a polymer layer configured to provide protection to the light-emitting layer 2804 from harmful effects of the environment such as moisture or air. In these embodiments, while not shown, an electrical connection may be formed through the insulator layer 2808 between the first terminal 2508 and the light-emitting layer 2804.

Referring to FIG. 29, the integrated thin film-based electronic device 2900 additionally includes at least a portion of an integrated thin film-based ESD formed over the thin film-based light emitting device 2800. Similar to the device described above with respect to FIG. 26, the thin film-based ESD is positioned such that at least a portion thereof laterally overlaps the thin film-based light emitting device 2800. The integrated thin film-based ESD includes a first current collector 108, a second current collector 124, a first electrode layer 112, a second electrode layer 120 and a separator 116. The thin film-based light emitting device 2800 is disposed between the first current collector 108 and the substrate 104, such that the first current collector 108 and the first electrode layer 112 overlap the thin film-based light-emitting device 2800, and the second current collector 124 and the second electrode layer 120 are formed on the portion of the second terminal 2512 that extends beyond the bottom surface of the thin film-based light-emitting device 2504 or on the additional conductive layer 2812 when present.

Figure 30:
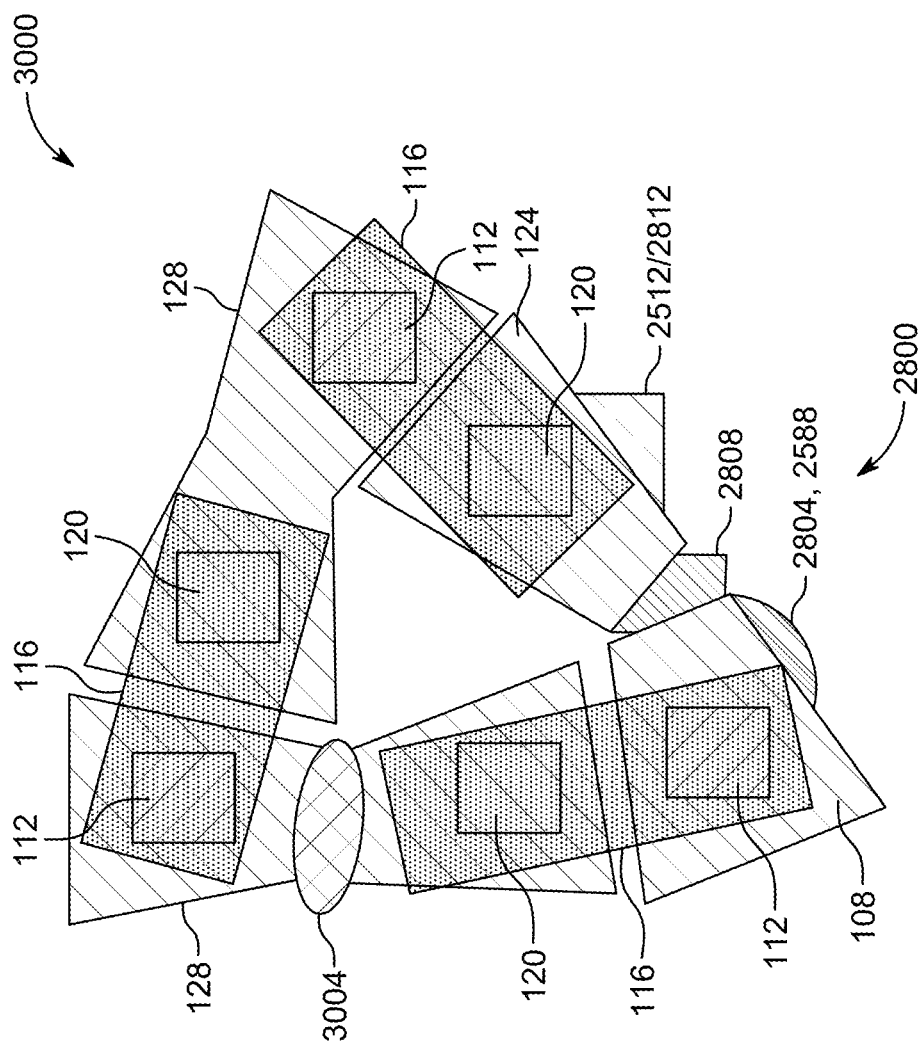
FIG. 30 illustrates a top down view of an integrated thin film-based electronic device having integrated therein a thin film-based energy storage device including a plurality of units or cells that are connected in electrical series, and a thin film-based light-emitting device illustrated with respect to FIG. 28 having vertically arranged electrical terminals and powered by the thin film-based energy storage device.

FIG. 30 illustrates a top down view of an integrated thin film-based electronic device 3000 having integrated therein a thin film-based ESD including a plurality of units or cells that are connected in electrical series, and a thin film-based core device such as a light-emitting device 2800 illustrated with respect to FIG. 28 having vertically arranged electrical terminals and powered by the thin film-based ESD. The thin film-based light emitting device 2800 is configured and integrated in a similar manner as described above with respect to the integrated thin film-based electronic device 2900 described above with respect to FIG. 29, and a detailed description of corresponding or similar features is omitted herein for brevity. Unlike the thin-film based electronic device 2900 (FIG. 29), however, the integrated thin film-based ESD includes a plurality of units or cells. The plurality of units or cells are serially connected in a manner similar to that described above with respect to FIGS. 16 and 17, where each of the ESD units or cells comprises laterally adjacent current collectors and electrodes in a similar manner as described above with FIGS. 2A/2B. A detailed description of corresponding features similar to those of FIGS. 2A/2B and 16 and 17 are omitted herein for brevity. Thus configured, the integrated thin film-based ESD comprises pairs of first and second electrodes 112, 120 physically connected by a separator 116, where each pair represents a unit or cell of the thin film-based ESD. Each of the intermediate current collectors 128 serves to electrically connect in series the first and second electrodes 112, 120 of adjacent ESD units or cells. In the illustrated integrated thin-film based ESD, three serially connected units or cells of ESDs are formed, where the second electrode layer 120 of the first (lowermost) ESD unit is electrically connected to the first electrode layer 112 of the second (upper left) ESD unit by the first (left) intermediate current collector 128, and the second electrode layer 120 of the second (upper left) ESD unit is electrically connected to the first electrode layer 112 of the third (upper right) ESD unit by the second (right) intermediate current collector 128.

Still referring to FIG. 30, the thin film-based light emitting device 2800 is integrated in a similar manner as described above with respect to FIG. 29, in which the first terminal 2508 is electrically connected to and disposed underneath the first current collector 108 of the first (lowermost) ESD unit. The second terminal 2512, which may be transparent, and optionally the additional conductive layer 2812 when present, are electrically connected and disposed underneath the second current collector 124 of the third (upper right) ESD unit. The light emitting layer 2804 is electrically connected to and formed underneath the first terminal 2508. In a similar manner as described above with respect to FIG. 29, the second terminal 2512 may be formed on a bottom surface of the light emitting layer 2804 and laterally extend to electrically connect to the second current collector 124 of the third (upper right) ESD unit, e.g., through the additional conductive layer 2812 when present. While not illustrated, at least the thin film-based light emitting device 2800 may be formed over or on a transparent substrate, such that light may be transmitted therethrough, as described above with respect to FIG. 29.

Still referring to FIG. 30, in some embodiments, the integrated thin film-based electronic device 3000 further comprises a switch 3004, which may be configured to electrically activate the circuit of the integrated thin film-based electronic device 3000 upon being engaged or activated. The switch 3004 may be engaged in any suitable manner, e.g., upon being mechanically pressed. In some embodiments, the switch 3004 may be a one-time switch. For example, the switch 3004 may be configured as a button including a conductive fluid or a deformable material that electrically connects or shorts portions of one of the intermediate current collectors 128 that may be initially electrically separated. In the illustrated embodiment, the first (left) intermediate current collector 128 may initially be electrically separated into (upper and lower) portions, which may be electrically shorted upon activation of the switch 3004, e.g., by mechanically pressing the button. However, embodiments are not so limited, and the switch 3004 may be activated by any other suitable mechanisms, e.g., resistance change or photo-activation.

Figure 31:
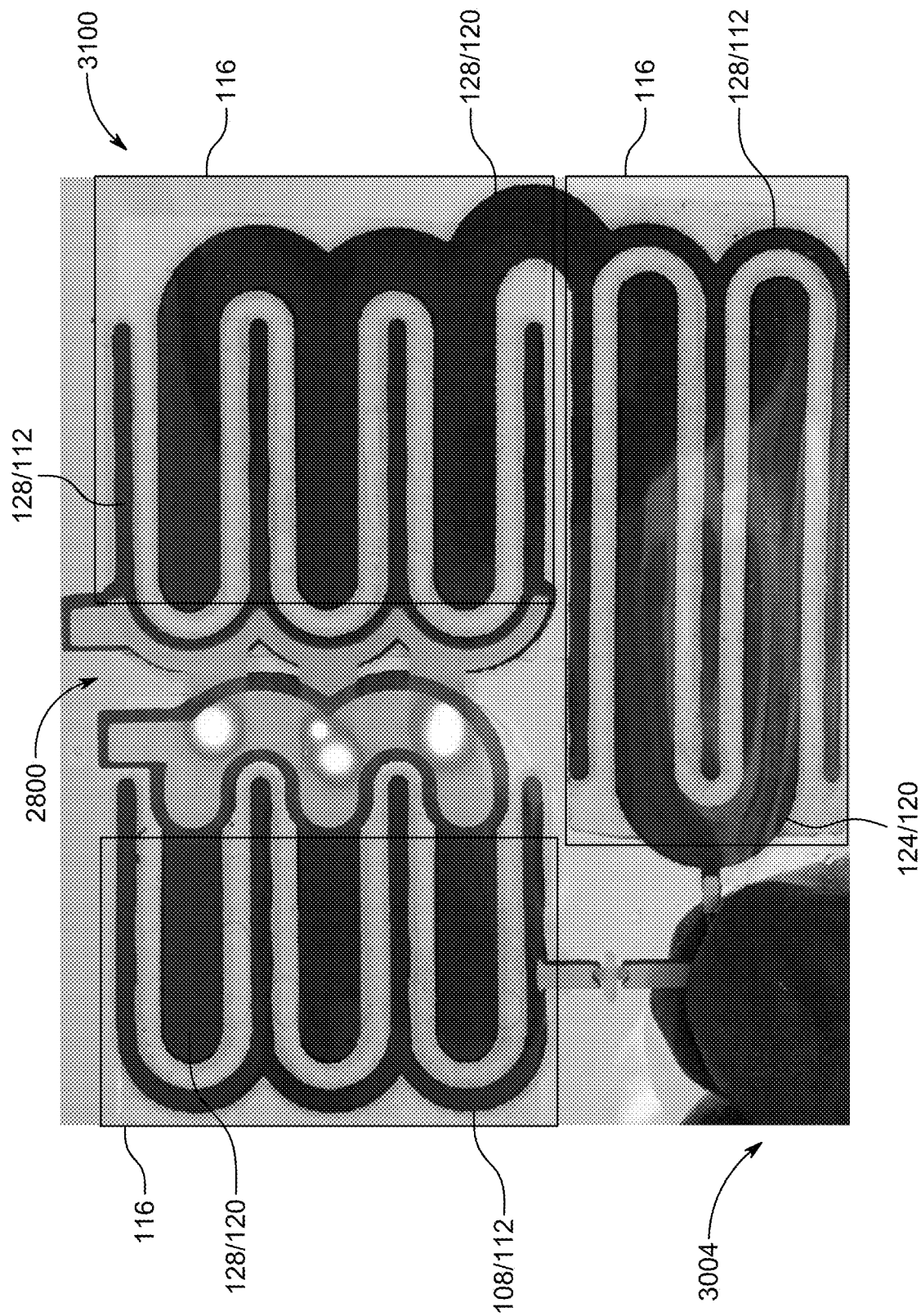
FIG. 31 illustrates a top down optical image of an integrated thin film-based electronic device having integrated therein a thin film-based energy storage device including a plurality of units or cells that are connected in electrical series, where each of the electrodes of each unit or cell have a plurality of regularly spaced elongated protrusions or fingers, and a thin film-based light-emitting device illustrated with respect to FIG. 28 having vertically arranged electrical terminals and powered by the thin film-based energy storage device.

FIG. 31 illustrates a top down optical micrograph of an actually fabricated integrated thin film-based electronic device 3100 having integrated therein a thin film-based energy storage device including a plurality of units or cells that are connected in electrical series. Each of the electrodes of each unit or cell have a plurality of regularly spaced elongated protrusions or fingers. The integrated thin film-based electronic device 3100 additionally has integrated therein a thin film-based light-emitting device similar to that described above with respect to FIG. 28, having vertically arranged electrical terminals and powered by the thin film-based ESD. The integrated thin film-based electronic device 3100 is configured and integrated in a similar manner as described above with respect to the integrated thin film-based electronic device 3000 (FIG. 30), and a detailed description of corresponding or similar features is omitted herein for brevity. Similar to the thin-film based electronic device 3000 (FIG. 3000), the thin-film based electronic device 3100 comprises an integrated thin film-based ESD including a plurality of units or cells that are serially connected. However, in the integrated thin film-based electronic device 3100, in a similar manner as described above with respect to FIG. 10E, each unit cell comprises first and second electrode layers 112, 120 that have a strap portion and a plurality of regularly spaced protrusions, fingers, tines or spikes, where the elongated protrusions, fingers, tines or spikes of the first and second electrode layers 112, 120 are interlaced or interleaved such that they alternate in a lateral direction, thereby having increased overlapping edge lengths of the first and second electrodes layers 112, 120. Thus configured, the integrated thin film-based ESD comprises pairs of first and second electrode layers 112, 120 connected by a separator 116, where each pair represents a unit of ESD. Each of the intermediate electrodes 128 serves to electrically connect in series the first and second electrodes 112, 120 of adjacent ESD units or cells. In the illustrated integrated thin-film based ESD, three serially connected units or cells of ESDs are formed, where the second electrode layer 120 of the first (upper left) ESD unit is electrically connected to the first electrode layer 112 of the second (upper right) ESD unit, and the second electrode layer 120 of the second (upper right) ESD unit is electrically connected to the first electrode layer 112 of the third (bottom right) ESD unit.

Still referring to FIG. 31, the thin film-based light emitting device 2800 is integrated in a similar manner as described above with respect to FIG. 30, and a detailed description of corresponding features is omitted herein for brevity. The first terminal is electrically connected to and disposed underneath the first intermediate current collector 128 of the first (upper right) ESD unit and the second terminal, which may be transparent, and optionally the additional conductive layer when present, are electrically connected and disposed underneath the second intermediate current collector 128 of the second (upper right) ESD unit. A least the thin film-based light emitting device 2800 may be formed over or on a transparent substrate, such that light may be transmitted therethrough. In the illustrated embodiment, the first current collector 108 of the first (upper left) ESD unit has been electrically shorted to the second current collector 124 of the third (bottom right) ESD unit upon activation of the switch 3004.

It will be appreciated that, while in each of the integrated thin film-based electronic devices described above with respect to FIGS. 25-31, first and second current collectors of a thin film-based ESD are respectively electrically connected to first and second terminals of the a thin film-based core device, where the first current collector and the first terminal are separate layers and the second current collector and the second terminal are discrete layers, embodiments are not so limited. In some other embodiments, the first current collector of the thin film-based ESD and the first terminal of the thin film-based core device can be formed as an integrated single thin film layer. Similarly, the second current collector of the thin film-based ESD and the second terminal of the thin film-based core device can be formed as an integrated single thin film layer. That is, the direct formation of the thin film-based ESD and the thin film-based core device on one another can allow for one or the other of the first current collector and the first terminal to be omitted, and/or one or the other of the second current collector and the second terminal to be omitted.

Rechargeable Thin Film-Based Energy Storage Devices Integrated with Energy Harvesting Devices Various thin film-based energy storage devices (ESDs) described herein may be integrated with thin film-based energy harvesting devices, thereby forming an integrated rechargeable thin film-based ESDs. Similar to various thin film-based core devices integrated with the thin film-based ESDs described above, similar materials and methods may be used to print components of the thin film-based ESD as well as the thin film-based energy harvesting devices configured to charge or recharge the thin film-based ESDs. At least some layers of the thin film-based energy harvesting device can be formed on or printed on, e.g., directly formed or printed on, the thin film-based ESD or vice versa. In some implementations, substantially the entire integrated electronic device including the thin film-based ESD and the thin film-based energy harvesting device can be fabricated by printing.

In various embodiments described below, the thin film-based ESD can be integrated with the thin film-based energy harvesting device configured to charge/recharge the thin film-based ESD by forming or printing at least one layer of the ESD, e.g., forming or printing directly on, the thin film-based energy harvesting device. Alternatively, at least one layer of the thin film-based energy harvesting device can be formed or printed on, e.g., directly formed or printed on, the thin film-based ESD. By having at least one layer of one of the thin film-based ESD or the thin film-based energy harvesting device formed or printed on the other of the thin film-based ESD or the thin film-based energy harvesting device, the two devices can be disposed at relative positions that may provide various advantages. For example, by directly printing at least one layer of one of the thin film-based ESD or the thin film-based energy harvesting device on the other of the thin film-based ESD or the thin film-based energy harvesting device, the amount of electrical wiring connecting the two devices can be reduced. By reducing the amount of electrical wiring and the series resistance between the thin film-based ESD and the thin film-based energy harvesting device, the amount of excess voltage and/or energy that may be dissipated by the series resistance of the electrical wiring can in turn be reduced or eliminated.

As described herein, energy harvesting can involve converting a non-electrical form of energy into an electrical form of energy, such as charge or voltage. A thin film-based energy harvesting device can be any suitable device configured to harvest energy from the environment, e.g., a photovoltaic device, a thermoelectric device, a piezoelectric device, a wireless charging device, a tribological harvesting device, an RF-based energy harvesting device, a pyroelectric energy harvesting device, a capacitive energy harvesting device, a microbial energy harvesting device and magnetorestrictive energy harvesting device, to name a few. The thin film-based energy harvesting device can be configured to partially or fully supply the power to charge or recharge the thin film-based ESD, such that the thin-film based ESD can in turn supply energy and power to a core device connected thereto or integrated therein for an extended period of time without connecting a separate power supply.

Figure 32:
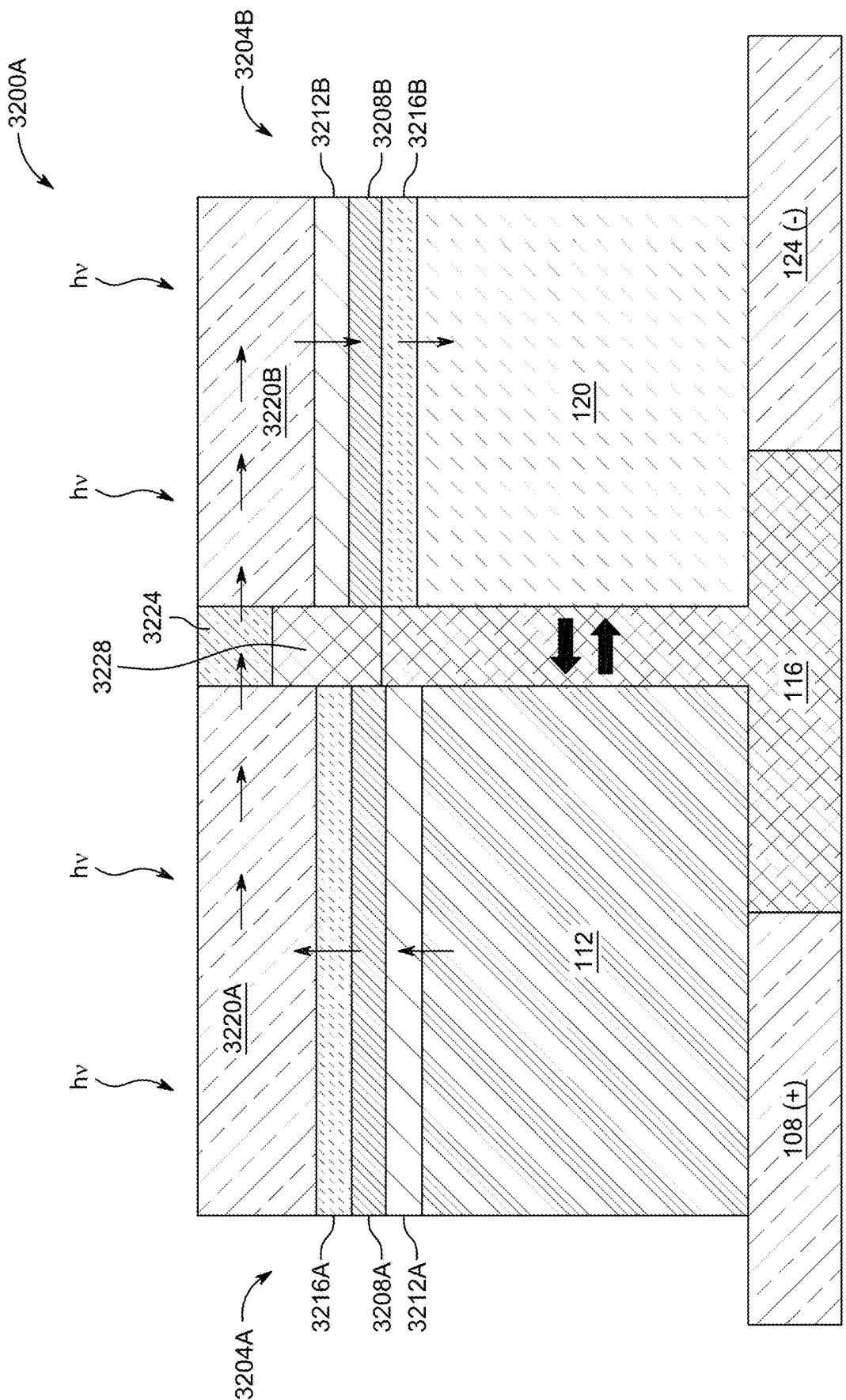
FIG. 32 illustrates a side view of an integrated thin film-based electronic device having integrated therein a thin film-based energy storage device having laterally adjacent current collectors and electrode layers, and a thin film-based energy harvesting device configured to charge/recharge the thin film-based energy storage device, in a charging mode.
Figure 33:
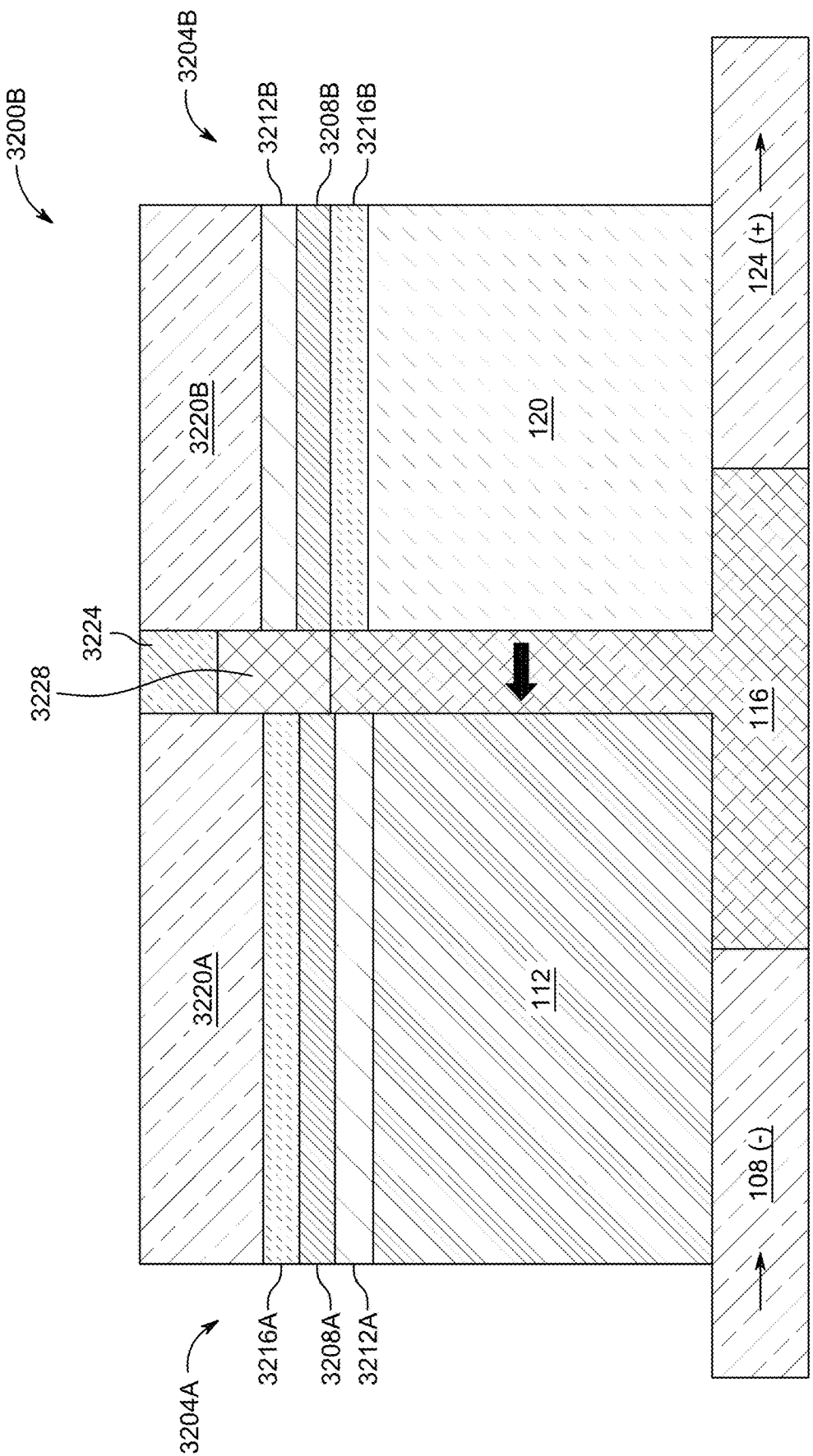
FIG. 33 illustrates a side view of an integrated thin film-based electronic device having integrated therein a thin film-based energy storage device having laterally adjacent current collectors and electrode layers, and a thin film-based energy harvesting device configured to charge/recharge the thin film-based energy storage device, in a discharging mode.

FIGS. 32 and 33 illustrate side views of an integrated thin film-based electronic device 3200A/3200B having integrated therein a thin film-based energy storage device (ESD) having laterally adjacent current collectors and electrode layers, and a thin film-based energy harvesting device configured to charge/recharge the thin film-based ESD. FIG. 32 illustrates the integrated thin film-based electronic device 3200A in which the integrated ESD is in a charging mode, while FIG. 33 illustrates the integrated thin film-based electronic device 3200B in which the integrated ESD is in a discharging mode.

The integrated thin film-based electronic device 3200A/3200B includes an integrated thin film-based ESD formed over or on a substrate (not shown for clarity). The thin film-based ESD includes a first current collector 108 and a second current collector 124 that are laterally adjacently disposed, and a first electrode layer 112 and second electrode layer 120 that are laterally adjacently disposed. In a similar manner as described above with respect to, e.g., the ESD illustrated in FIGS. 2A/2B, the first electrode layer 112 and the second electrode layer 120 are formed on or over the first current collector 108 and the second current collector 124, respectively. A separator 116 is disposed in a gap separating the first and second current collectors 108, 124, and in a gap separating the first and second electrode layers 112, 120. A detailed description of similar corresponding features that have been described above is omitted herein for brevity. Unlike the ESD described above with respect to FIGS. 2A/2B, however, while the separator 116 is formed in the gap formed between the first and second electrode layers 112, 120, it is not formed over the first and second electrode layers 112, 120.

The first and second electrode layers 112, 120 can include any suitable pair of active materials described above, e.g., Ag/ZnO pair or Mn/ZnO pair.

Still referring to FIGS. 32 and 33, the integrated thin film-based electronic device 3200A/3200B has formed over or on the thin film-based ESD one or more thin film-based energy harvesting devices. The one or more thin-film based energy harvesting devices are positioned such that at least a portion thereof laterally overlaps the underlying thin film-based ESD. In the illustrated example configuration, a first thin film-based energy harvesting device 3204A is formed over or on the first electrode layer 112 and vertically disposed between the first electrode layer 112 and a first conductive layer 3220A. The first conductive layer 3220A may be transparent when the underlying thin film-based energy harvesting device incudes a photovoltaic device. A second thin film-based energy harvesting device 3204B is formed over or on the second electrode layer 120 and vertically disposed between the second electrode layer 120 and a second conductive layer 3220B. The second conductive layer 3220B may be transparent when the underlying thin film-based energy harvesting device includes a photovoltaic device.

In the illustrated example, each of the first and second thin film-based energy harvesting devices 3204A, 3204B is a photovoltaic device, e.g., a solar cell. The first thin film-based energy harvesting device 3204A includes a first photovoltaic layer 3208A, which may include a first active or absorber material or a first heterojunction or a PN junction formed by a p-type semiconductor material and an n-type semiconductor material, and which may be formed between a first electron transport layer 3216A and a first hole transport layer 3212A. Similarly, the second thin film-based energy harvesting device 3204B includes a second photovoltaic layer 3208B, which may include a second active or absorber material or a second heterojunction or a PN junction formed by a p-type semiconductor material and an n-type semiconductor material, and which may be formed between a second electron transport layer 3216B and a second hole transport layer 3212B. The first and second thin film-based energy harvesting devices 3204A and 3204B may be physically separated by the separator 116 or an insulating layer 3228, while being electrically connected in series. The serial connection may be formed by, e.g., a diode 3224 electrically connecting the first and second conductive layers 3220A and 3220B. The series diode 3224 may be configured to be under a forward bias when the first and second thin film-based energy harvesting devices 3204A, 3204B are in a charging mode, and under a reverse bias when the first and second thin film-based energy harvesting devise 3204A, 3204B are in a discharging mode.

Referring to FIG. 32, in operation in the charging mode, photons (hv) absorbed by each of the first and second photovoltaic layers 3208A, 3208B can generate excitons therein, which are separated into electrons and holes, or electron and hole pairs directly. The electrons travel though the first and second electron transport layers 3216A, 3216B, and the holes travel through the first and second hold transport layers 3212A, 3212B. The electrons from the first electron transport layer 3216A are collected by the first conductive layer 3220A, and the electrons from the second electron transport layer are collected by the second electrode layer 120. Conversely, the holes from the first hole transport layer 3212A are collected by the first electrode layer 112, and the holes from the second hole transport layer are collected by the second conductive layer 3220B. The overall direction of electron flow from the first electrode layer 112, through the first photovoltaic layer 3208A, the first conductive layer 322A, the diode 3224, which may be forward-biased, the second conductive layer 3220B and the second photovoltaic layer 3220B, to the second electrode layer 120 is indicated by small arrows. The corresponding ionic transport between the first and second electrode layers 112, 120, through the separator 116 is indicated by large arrows.

Referring to FIG. 33, in operation in discharge mode, the thin film-based energy harvesting device may be inactive, and the charge is dissipated by a load device or a core device, e.g., any of the thin film-based core devices described above that is connected to the first and second current collectors 108, 124 of the thin film-based ESD and powered by the thin film-based ESD. The direction of electron flow is indicated by small arrows and the ionic flow is indicated by large arrows. The diode 3224 may be advantageously reversely biased to effectively block dark current, thereby improving the efficiency of the thin film-based ESD.

It will be appreciated that the first and second energy harvesting devices 3204A, 3204B may be any suitable thin film-based photovoltaic device. At least one layer the energy harvesting devices 3204A, 3204B may be printed. For example, printable photovoltaic layers 3208A, 3208B include an organic polymer, an inorganic chalcogenide, or a perovskite material.

Examples of the photovoltaic layers 3208A, 3208B include an organic polymer such as, e.g., poly[2-methoxy-5-(20-ethylhexyloxy)-p-phenylene vinylene] (MEH+PPV), poly(3-hexylthiophene-2,5-diyl) (P3HT), poly(N-alkyl-2,7-carbazole) (PCDTBT), poly[(4,4-bis(2-ethylhexyl)-cyclopenta-[2,1-b;3,4-b']dithiophene)-2,6-diylalt-2,1,3-benzothiadiazole-4,7-diyl] (PCPDTBT), poly[(4,4'-bis(2-ethylhexyl) dithieno[3,2-b:20,30-d]silole)-2,6-diyl-alt-(2,1,3-benzothiadiazole)-4,7-diyl] (PSBTBT), poly[(2,5-bis(2-hexyldecyloxy)phenylene)-alt-(5,6-difuoro-4,7-di(thiophen-2-yl) benzo[c]-[1,2,5]thiadiazole)] (PPDT2FBT), poly[(5,6-difluoro-2,1,3-benzothiadiazol-4,7-diyl)-alt-(3,3000-di(2-octyldodecyl)-2,20;50,20';50',20''-quaterthiophen-5,50''-diyl)] (PffBT4T-20D), or a combination thereof, to name a few.

Examples of the photovoltaic layers 3208A, 3208B include an inorganic chalcogenide such as, e.g., copper indium gallium selenides (CIGS), coper zinc tin sulfide (CZTS), copper zinc tin selenide (CZTSe) or an alloy or a combination thereof, to name a few.

Examples of the photovoltaic layers 3208A, 3208B include a perovskite material. The perovskite material can include one or both of an organic material and an inorganic material. Some perovskite materials include an organic-inorganic hybrid material having the perovskite crystal structure. The perovskite crystal structure can be described as $ABX_3$, where A is an organic (or inorganic) cation (e.g., methylammonium ($MA^+$), formamidinium ($FA^+$), $Cs^+$, etc.), B is a metal cation (e.g., $Pb^{2+}$, $Sn^{2+}$, etc.), and X is an anion (e.g., $I^-$, $Br^-$, $Cl^-$, $SCN^-$, etc.). The perovskite material may include, e.g., $MAPbI_3$ (α phase, tetragonal structure), $MAPbI_3$ (β phase, tetragonal structure), $MAPbI_3$ (γ phase, orthorhombic structure), $MAPbCl_3$ (α phase, cubic structure), $MAPbCl_3$ (β phase, tetragonal structure), $MAPbCl_3$ (γ phase, orthorhombic structure), MAPbBr$_3$ (α phase, cubic structure), MAPbBr$_3$ (β phase, tetragonal structure), MAPbBr$_3$ (γ phase, tetragonal structure), MAPbBr$_3$ (δ phase, orthorhombic structure), MASnI$_3$ (α phase, tetragonal structure), MASnI$_3$ (β phase, tetragonal structure), FAPbI$_3$ (α phase, trigonal phase), FAPbI$_3$ (β phase, trigonal structure), FASnI$_3$ (α phase, orthorhombic structure), FASnI$_3$ (β phase, orthorhombic structure) or a combination thereof, to name a few.

The first and second electron transport layers 3216A, 3216B are configured to have good electron transport property, and when the light is collected through them, the first and second electron transport layers 3216A, 3216B are transparent to the solar radiation. Examples of materials that can be used include ZnO, TiO$_x$, Cs$_2$CO$_3$, Nb$_2$O$_5$, and other suitable metal oxides or polymeric materials, to name a few.

The first and second hole transport layers 3212A, 3212B are configured to have good hole transport property, and when the light is collected through them, first and second hole transport layers 3212A, 3212B are transparent to the solar radiation. Examples of materials that can be used include polymers, e.g., PEDOT:PSS, or metal oxides, e.g., MoO$_3$, V$_2$O$_5$, WO$_3$ and NiO, to name a few.

Still referring to FIGS. 32 and 33, advantageously, because the first and second thin film-based energy harvesting devices 3204A, 3204B are formed over, on or directly on to overlap the underlying thin film-based ESD, the resulting integrated thin film-based electronic device 3200A/3200B can be vertically and horizontally compact. Furthermore, when the first and second thin film-based energy harvesting devices 3204A, 3204B are formed directly on the first and second current electrode layers 112, 120, respectively, one or more intervening conductive elements such as wires can be omitted to reduce the associated series resistance, thereby reducing excess voltage or energy dissipated by the intervening conductive elements. However, embodiments are not so limited and in other embodiments, there may be intervening conductive elements, e.g., printed conductive structures, between the first and second thin film-based energy harvesting devices 3204A, 3204B and the first and second electrode layers 112, 120, respectively.

The first and second conductive layers 3220A, 3220B may be transparent when the underlying first and second thin film-based energy harvesting devices 3204A, 3204B include a photovoltaic device. For example, the first and second conductive layers 3220A, 3220B may comprise graphene.

In the illustrated embodiment, each of the first and second photovoltaic layers 3208A, 3208B can have a thickness in a range of about 1-5 µm; each of the first and second electron transport layers 3216A, 3216B can have a thickness in a range of about 1-2 µm; each of the first and second hole transport layers 3212A, 3212B can have a thickness in a range of about 1-10 µm; each of the first and second conductive layers 3220A, 3220B can have a thickness in a range of about 10-100 µm; the separator 116 can have a thickness in a range of about 10-400 µm or 10-200 µm; and each of the first and second electrode layers 112, 120 can have a thickness of 0.1-2 µm, 0.1-1 µm or 0.5 to 1 µm.

Figure 34:
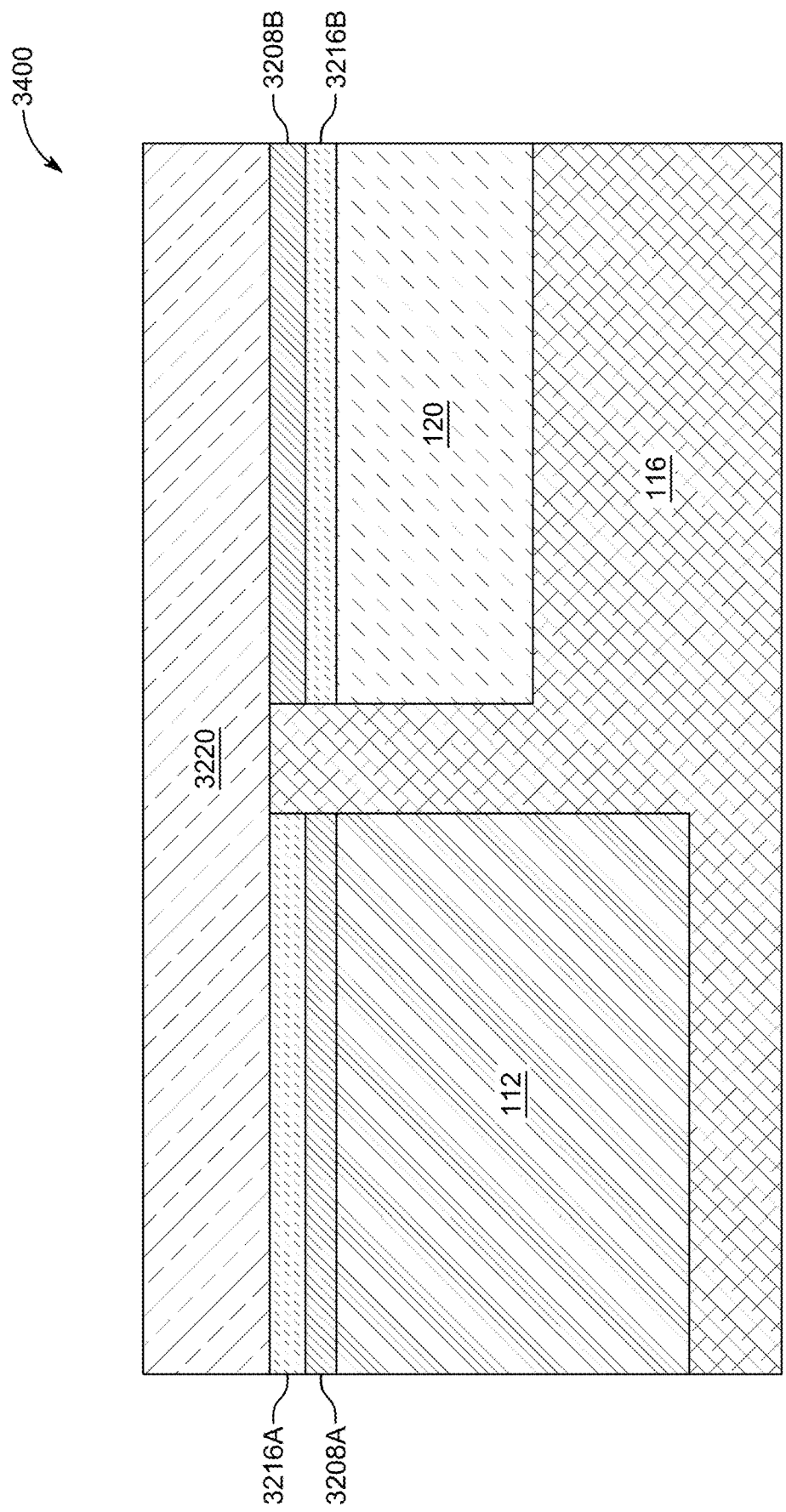
FIG. 34 illustrates a side view of an integrated thin film-based electronic device having integrated therein a thin film-based energy storage device having laterally adjacent current collectors and electrode layers, and a thin film-based energy harvesting device configured to charge/recharge the thin film-based energy storage device.

FIG. 34 illustrates a side view of an integrated thin film-based electronic device 3400 having integrated therein a thin film-based energy storage device (ESD) having laterally adjacent current collectors and electrode layers, and a thin film-based energy harvesting device configured to charge/recharge the thin film-based ESD. The thin film-based electronic device 3400 is similar to the thin film-based electronic device 3200A/3200B described above with respect to FIGS. 32, 33, except, the thin film-based electronic device 3400 includes some alternative arrangements of various features. For example, in the illustrated embodiment, a hole transport layer is omitted from each of the first and second energy harvesting devices. Thus, the first and second energy harvesting devices include first and second photovoltaic layers 3208A, 3208B, respectively, and first and second electron transport layers 3216A, 3216B, respectively, but do not include hole transport layers.

In addition, in the illustrated embodiment, the thicknesses of the first and second electrode layers 112 and 120 are different to accommodate for stoichiometric ratios of the respective electrode active materials, in a similar manner as described above.

In addition, in some embodiments, one or both of the first and second photovoltaic layers 3208A, 3208B comprise an absorbing or active material that are formed in a nanoporous insulating material such as diatom frustules, zeolites, cellulose fibers, fiberglass, or porous alumina, to name a few examples.

Unactivated Thin Film-Based Energy Storage Devices Having Extended Shelf Life

A shelf life of an energy storage device is a term used to describe a period of time, measured from the time at which the energy storage device is manufactured, during which a stored energy storage device remains effective, useful, or suitable for consumption. The shelf life is measured or calculated from the time the energy storage device is manufactured, and one of the processes that can shorten the shelf life is the self-discharge. The self-discharge can originate, among other things, from chemical reactions that occur under open circuit conditions when the ESD is not being used. The chemical reactions that contribute to the self-discharge not only include the electrochemical reaction of the thin film-based ESD involving the flow of ions that occur under open circuit conditions, but they also include "side reactions" that are not part of the electrochemical reaction. External factors such as temperature and humidity during storage can also in turn affect the self-discharge. For example, higher temperatures can accelerate the side reactions. When the thin film-based ESD is not hermetically sealed or improperly sealed, the moisture and oxygen from the environment can promote side reactions in the thin film-based ESD. The inventors have recognized that, by configuring the thin film-based ESDs such that the chemical effects that give rise to the self-discharge prior to use can be suppressed and/or delayed, the shelf life of the energy storage devices can be significantly improved. One way to increase the shelf life is to configure the thin film-based energy storage device such that an activation process, which may initiate the electrochemical chemical reactions or the flow of ions that initiate the self-discharge, is delayed until a user is ready to use the thin film-based ESD. The activation may be delayed, e.g., by providing a thin film-based ESD having a dry separator without having an electrolyte, and the thin film-based ESD can be activated at a later time, e.g., prior to use, by adding the electrolyte. The inventors have recognized that, by using various configurations of thin film-based energy storage devices and the methods of delayed activation described herein, the shelf life can be increased by at least a year or more.

Figure 35:
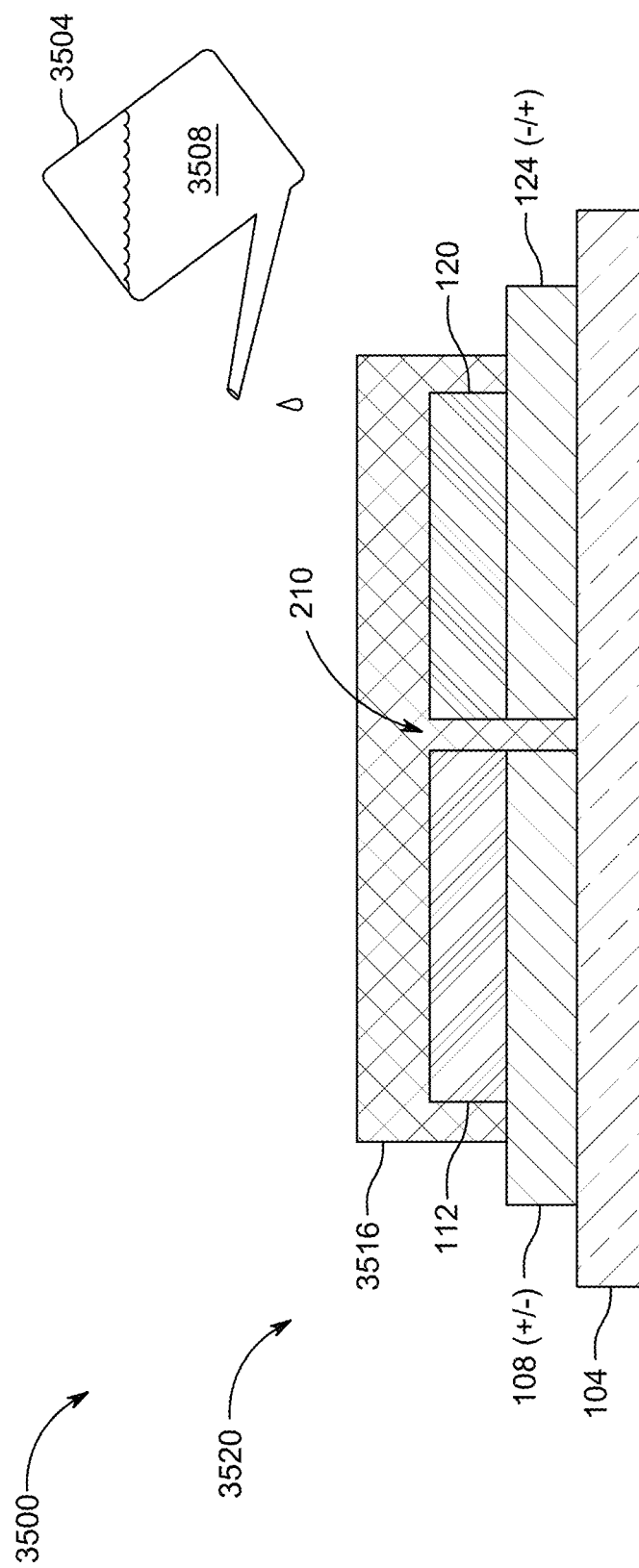
FIG. 35 illustrates a manufacturing kit of a thin film-based energy storage device, which includes a thin film-based energy storage device having laterally adjacent current collectors and electrode layers and a dry separator, and a separately provided electrolyte configured to wet the dry separator prior to use.

FIG. 35 illustrates a manufacturing kit 3500 of a thin film-based energy storage device adapted to increase the shelf life. The manufacturing kit 3500 includes a thin film-based energy storage device having laterally adjacent current collectors and electrode layers and a dry separator, and a separately provided electrolyte configured to wet the dry separator prior to use. The manufacturing kit 3500 includes an unactivated thin film-based energy storage device (ESD) 3520 and an electrolyte 3508 in a vessel/applicator 3504.

The unactivated thin film-based energy storage device 3520 comprises a substrate 104 having formed thereon a first current collector 108 and a second current collector 124 that are disposed laterally adjacent to each other. The unactivated thin film-based ESD 3520 additionally includes a first electrode layer 112 and a second electrode layer 120 formed on a first current collector 108 and a second current collector 124, respectively. The unactivated thin film-based ESD 3520 additionally includes a dry or electrolyteless separator 3516 formed over the first and second electrode layers 112, 120. Except for the dry separator 3516, other features of the unactivated thin film-based ESD 3520 may be similar to those described above with respect to FIGS. 2A/2B, and a detailed description of corresponding or similar features is omitted herein for brevity.

Still referring to FIG. 35, the dry separator 3516 is configured to receive and absorb the electrolyte 3508 throughout the separator 3516 to activate the thin film-based energy storage device 3520. In some embodiments, the dry separator 3516 comprises or is formed of a porous material that is particularly suited for effectively and rapidly absorbing and spreading the electrolyte throughout the dry separator 3516. Examples of the porous material that can be used include one or more of porous and absorbent materials described above, including diatom frustules, zeolites, cellulose fibers, fiberglass, alumina, silica gel, molecular sieve carbon, natural-clay based solids, polymeric absorbents or a combination thereof, among other porous and/or absorbent materials. The one or more porous and absorbent materials may be held together and/or adhere to the first and second electrode layers 112, 120 using one or more polymer binders described above. Thus formed dry or electrolyteless separator 3516 is adapted to rapidly and evenly spread the electrolyte 3508 when applied thereto. Special additives, such as one or more surfactants described above, can also be added to the dry separator 3516 to improve the wetting characteristics of the dry separator 3516 by the electrolyte 3508.

In some embodiments, the dry separator 3516 may be omitted. For example, in some embodiments, the electrolyte 3508 may simply be spread directly over the surfaces of the first and second electrode layers 112, 120, thereby creating a sufficient ionic bridge for the ion transport between the first and second electrode layers 112, 120.

While in the illustrated embodiment in FIG. 35, the dry separator 3516 is formed vertically over the first and second electrode layers 112, 120 and laterally therebetween in the gap 210, embodiments are not so limited. In some embodiments, the dry separator 116 may be formed or deposited, e.g., using a thin film deposition technique, in the gap 210 while being omitted from the top surfaces of the first and second electrode layers 112, 120. Such arrangement may be especially suitable for roll-to-roll fabrication techniques.

Still referring to FIG. 35, the electrolyte 3508 is configured to be applied to the dry separator 3516 to activate the unactivated thin film-based ESD 3520. The electrolyte 3508 comprises any suitable liquid electrolyte described above that is adapted to effectively wet the dry separator 3512. In some embodiments, the electrolyte 3508 is configured to have low volatility, which can be advantageous and particularly compatible with relatively long storage times. For example, by including an ionic liquid in the electrolyte 3508, the volatility of the electrolyte 3508 can be significantly reduced, which can in turn significantly increase the shelf life. In some embodiments, one or more additives described above may be included in the electrolyte 3508 to improve the spreading or absorbing characteristics of the electrolyte 3508. For example, one or more low viscosity additives described above may be added to improve the spreading speed of the electrolyte 3508. In some cases, a surfactant may be added to enhance the rapid spreading. It will be appreciated that the disclosed additives can be substantially electrochemically stable.

It will be appreciated that the structural arrangements of various thin film-based ESDs having laterally adjacent first and second electrodes disclosed herein are particularly suitable for implementing the manufacturing kit 3500. For example, the electrolyte 3508 can be applied and spread more easily when the electrodes are disposed adjacent to each other, and/or when substantially all of the major surfaces of the electrodes are exposed to easily receive the electrolyte 3508. Examples of such arrangements those described above with respect to FIGS. 2A/2B, 3A/3B, 9, 10A-10E, 11A, 11B, 12A-12D, 13, 16, 17, 20, 21 and 22. However, embodiments are no so limited, and the concept of activating an unactivated thin film-based ESD can be implemented in other electrode arrangements in which substantially all of the major surfaces of the electrodes may not be directly exposed, so long as the dry separator when present has an exposed portion through which the electrolyte 3508 can be applied. For example, the electrode arrangements descried above with respect to FIGS. 1, 4, 5, 5, 6, 7, 8, 14A-14D, 15, 18, 19, 23 and 24 can be fabricated to have the dry separator that is at least partially exposed to receive and absorb the electrolyte, and can thus be implemented in the manufacturing kit described herein. Furthermore, the integrated thin film-based electronic devices described above with respect to FIGS. 25-31 can be fabricated to have the dry separator that is at least partially exposed to receive and absorb the electrolyte, such that the integrated thin film-based electronic device can be activated on demand. Similarly, the integrated thin film-based electronic devices described above with respect to FIGS. 25-34 can be fabricated to have the dry separator of the thin film-based ESD that is at least partially exposed to receive and absorb the electrolyte, such that the integrated thin film-based electronic device as a whole can be activated on demand.

Thus, in various embodiments, because the addition of the electrolyte 3508 to the dry separator 3516 is delayed until use, a negligible amount of self-discharge occurs prior to activation of the unactivated thin film-based ESD 3520.

It will be appreciated that the delayed activation can be implemented with any suitable energy storage device chemistry and materials, e.g., Zn/MnO2-based energy storage devices as disclosed in U.S. Pat. No. 9,520,598B2, and Zn/AgO-based energy storage devices as disclosed in U.S. Pat. No. 9,786,926B2, the contents of which are incorporated by reference herein in their entireties.

Still referring to FIG. 35, the electrolyte 3508 may be stored in a storage vessel or applicator 3508 that is particularly suited for ease of storage and application to the unactivated thin film-based ESD 3520. The vessel 3508 may be configured to store a suitable amount of the electrolyte 3508 that is consistent with the molar mass of the electrodes 112, 120. Example implementations of the storage vessel 3508, the electrolyte 3504 and the method of activating the unactivated thin film-based ESD 3520 using the same include, without limitation:

(1) The vessel 3504 comprising a plastic pouch with a long and thin tube. The electrolyte 3508 may be held and prevented from being released by a capillary force until a sufficient pressure is applied to the main body of the vessel 3508.

(2) The vessel 3504 comprising a sealed plastic vessel having a small area that may be weakened. The electrolyte 3508 may be released upon application of a pressure to the main body of the plastic vessel, thereby breaking open the weakened area of the plastic vessel. The weakened portion may arranged to direct the flow of the electrolyte 3508 to a desired area of unactivated thin film-based ESD 3520.

(3) The vessel 3504 comprising a plastic vessel that is configured to be locally broken with a sharp sliding wire by puncturing the plastic vessel. The electrolyte 3508 may be released through the punctured region of the plastic vessel upon application of a pressure to the plastic vessel.

(4) The vessel 3504 comprising a hard plastic/glass tubing connected thereto. The tubing can be initially sealed but can be mechanically broken by pressure, thereby releasing the electrolyte 3508 through the tubing.

(5) The vessel 3504 comprising a plastic vessel containing a mixture of the electrolyte 3508 and microparticles (e.g., microspheres). The electrolyte 3508 can be mechanically spread by moving, e.g., rolling, the microparticles.

(6) The vessel 3504 comprising a plastic bag, which holds the electrolyte 3508 in the form of a foam. The foam can prevent an accidental spill of the electrolyte 3508. The plastic bag and the foam are configured such that pressing the plastic bag containing the foam releases the foam.

(7) The vessel 3504 comprising a bag with two clipped sides in the middle. Upon being bent, the electrolyte 3504 can be released.

(8) The vessel 3504 comprising bag having air in one side thereof. A mechanical pressure applied on the vessel 3504 forces the electrolyte 3508 out due to air pressure. In some implementations, the bag has two compartments, where a first compartment is filled with air, while the second compartment is filled with the electrolyte 3508 electrolyte. A mechanical pressure applied to the air in the first compartment in turn results in a mechanical pressure being applied to the electrolyte 3508 of the second compartment, which is forced out of the second compartment.

(9) The vessel 3504 comprising a blow tube connected thereto. One end of the blow tube can be cut. Blowing into the blow tube can spread the electrolyte 3508 that is released from the vessel 3504 through a separate opening.

(10) The vessel 3504 comprising a pull-out bar. The pull-out bar is absorbent and contains the electrolyte 3508, which may be in the form of a liquid or foam. Removing (e.g., pulling) the bar moves electrolyte over the top surface of the thin film-based ESD, e.g., the top surface of the dry separator 3516 spreads the electrolyte. The pull-out bars can be magnetic and can be moved with the aid of a magnet.

(11) The vessel 3504 comprising a sponge. The sponge impregnated with the electrolyte 3508 can be disposed over the dry separator 3516. A thin film may be disposed between the sponge and the separator 3516. Upon removal of the thin film, the electrolyte 3508 can migrate from the sponge to the dry separator 3516.

(12) The vessel 3504 comprising a sponge. The sponge impregnated with the electrolyte 3508 can be disposed over the dry separator 3516. A dense mesh may be disposed between the sponge and the separator 3516. Upon pressing the sponge, the electrolyte 3508 is delivered to the dry separator 3516 through the mesh. The electrolyte 3508 may be in the form of a gel in some implementations.

(13) The vessel 3504 comprising a pouch with an opening. The electrolyte 3508 is in the form of a gel and disposed inside the vessel 3504. The gelled electrolyte 3508 can be converted to liquid, e.g., by application of heat or mechanically, that can be spread over the dry separator 3516.

(14) The vessel 3504 can comprise gel or polymer capsules in which the electrolyte 3508 can be encapsulated. The capsules can be initially formed over the dry separator 3516, e.g., in a layer. Prior to use, the capsules can be broken, e.g., by application or heat and/or pressure, thereby releasing the electrolyte 3508 encapsulated in the capsules. While the capsules can have any suitable size, it will be appreciated that when the capsules smaller than 50 microns, they can be particularly adapted for being formed on the dry separator 3516 by printing.

It will be appreciated that the above implementations of the vessel 3504, the electrolyte 3508 and the methods of activating the unactivated thin film-based ESD 3520 using the same are provided as examples, and any other suitable implementations may be used. Furthermore, it will be appreciated that one or more vessels 3504 and a combination of different vessels 3504 can be used in some implementations, e.g., in circumstances where the surface area on which the electrolyte 3508 is to be applied is relatively large.

In some implementations, the vessel 3504 may be positioned in the middle of the unactivated thin film-based energy storage device 3520. Several perforations/holes/tubes may be formed in the vessel 3504 to facilitate the spread of the electrolyte 3508 evenly over the surface of the dry separator 3516.

Still referring to FIG. 35, in some embodiments, the manufacturing kit 3500 of a thin film-based energy storage device is configured to produce one-time use thin film devices. However, embodiments are not so limited and the manufacturing kit 3500 can be configured to produce multiple-use thin film electronic devices.

The manufacturing kit 3500 can provide several possible advantages to the thin film-based energy storage device 3520 as well as any thin film-based electronic device connected thereto or integrated therewith, including without limitation:

(1) An intrinsic activation mechanism. Upon application of the electrolyte 3508, the unactivated thin film-based ESD is "switch on."

(2) A long shelf life. Degradation mechanisms such as self-discharge is reduced by delaying activation.

(3) Integration with a core device. The core device powered by the thin film-based ESD can be formed and integrated on the same substrate.

(4) Internal resistance control. The internal resistance of the thin film-based ESD can be controlled by the design of the thin film-based ESD itself, without additional external resistors, e.g., resistors connected in parallel.

(5) High manufacturability. The thin film-based ESD is easy to fabricate by, e.g., printing using roll-to-roll thin film manufacturing techniques. The electrode coverage areas can be adjusted for different stoichiometries of different electrochemical reactions, instead of having to vary the relative thicknesses of the electrodes in "one electrode on top of the other" designs.

(6) Easy packaging. Thin film-based ESDs having adjacently disposed electrodes are relatively easier to package and integrate with other printed devices.

(7) Ease of stoichiometric adjustment of electrode active materials. As described above the stochiometric proportions between electrodes can be relatively easily adjusted. Not every some embodiments may include some, all, or none of the listed advantages, and other advantages are also possible.

ADDITIONAL EMBODIMENTS

1. A method of fabricating an energy storage device, the method comprising:
    printing laterally adjacent and electrically separated current collector layers including a first current collector layer and a second current collector layer over a substrate;
    printing an electrode layer of a first type over the first current collector layer;
    printing an electrode layer of a second type over the second current collector layer; and
    printing a separator over one or both of the electrode layers of the first and second types, wherein printing the separator includes printing over exposed surfaces of one or both of the electrode layers of the first and second types,
    wherein the electrode layer of the first type comprises a first electrode active material and the electrode layer of the second type comprises a second electrode active material, and wherein a molar ratio between the first electrode active material and the second electrode active material is between 0.25 and 4.0.
2. The method of Embodiment 1, wherein printing the current collector layers comprises simultaneously printing the first current collector layer and the second current collector layer.
3. The method of Embodiments 1 or 2, wherein printing the separator comprises simultaneously printing over the exposed surfaces of both of the electrode layers of the first and second types.
4. The method of any one of Embodiments 1-3, comprising adjusting a printed area of the electrode layer of the first type and a printed area of the electrode layer of the second type according to the molar ratio.
5. The method of any one of Embodiments 1-4, wherein printing the separator comprises printing over the exposed surfaces of the electrode layer of the first type prior to printing the electrode layer of the second type, and wherein printing the electrode layer of the second type comprises printing over the separator and over the second current collector layer.
6. The method of any one of Embodiments 1-5, wherein four printing steps comprise printing the first and second current collector layers, printing the electrode layers of the first and second types and printing the separator.
7. The method of any one of Embodiments 1-6, wherein the substrate or the separator comprises perforations.
8. The method of Embodiment 7, wherein the separator comprises the perforations, wherein the method comprises printing the separator simultaneously over the electrode layers of the first and second types, and wherein the method further comprises one or both of:

printing a further first electrode layer over the separator and over the first electrode, wherein the further first electrode layer fills the perforations in contact therewith, the first electrode layer and the further first electrode layer on opposite sides of the separator and electrically connected to each other; and
    printing a further second electrode layer over the separator and over the second electrode, wherein the further second electrode layer fills the perforations in contact therewith, the second electrode layer and the further second electrode layer on opposite sides of the separator and electrically connected to each other.
9. The method of Embodiment 7, wherein the substrate comprises the perforations, the method further comprising:
    simultaneously printing a further first current collector layer and a further second current collector layer over an opposite side of the substrate,
        wherein the further first current collector layer fills the perforations in contact therewith, the first current collector layer and the further first current collector layer on opposite sides of the substrate and electrically connected to each other, and
        wherein the further second current collector layer fills the perforations in contact therewith, the second electrode layer and the further second electrode layer on opposite sides of the separator and electrically connected to each other;
    printing a second electrode layer of the first type over the further first current collector layer at the opposite side of the substrate;
    printing a second electrode layer of the second type over the further second current collector layer at the opposite side of the substrate; and
    printing a further separator over one or both of the second electrode layer of the first type and the second electrode layer of the second type.
10. The method of any one of Embodiments 1-9, wherein the first current collector layer comprises a plurality of first finger structures and the second current collector layer comprises a plurality of second finger structures, wherein the first finger structures and the second finger structures are interlaced to alternate in a lateral direction.
11. The method of Embodiment 10, wherein printing the separator comprises simultaneously printing over the exposed surfaces of both of the electrode layers of the first and second types.
12. The method of Embodiment 10, wherein printing the separator comprises printing over the exposed surfaces of the electrode layer of the first type prior to printing the electrode layer of the second type, and wherein printing the electrode layer of the second type comprises printing over the separator and over the second current collector layer.
13. The method of any one of Embodiments 1-12, further comprising configuring the first current collector layer as a first current collector having a first polarity and the second current collector layer serves as a second current collector having a second polarity.
14. The method of any one of Embodiments 1-13, further comprising:
    printing a third current collector layer laterally between the first and second current collector layers;
    printing a second electrode layer of the first type over the third current collector layer;

printing a second electrode layer of the second type over the third current collector layer; and printing a second separator over one or both of the second electrode layers of the first and second types, wherein printing the separator includes printing over exposed surfaces of one or both of the second electrode layers of the first and second types.

15. The method of Embodiment 14, wherein printing the third current collector layer comprises simultaneously printing with the first and second current collector layers.

16. The method of Embodiment 14, wherein printing the second electrode layer of the first type comprises simultaneously printing with the electrode layer of the first type.

17. The method of Embodiment 14, wherein printing the second electrode layer of the second type comprises simultaneously printing with the electrode layer of the second type.

18. The method of Embodiment 14, wherein printing the separator comprises simultaneously printing with the second separator.

19. The method of Embodiment 18, wherein printing the separator and the second separator comprises simultaneously printing over the exposed surfaces of both of the electrode layers of the first and second types and both of the second electrode layers of the first and second types.

20. The method of Embodiment 18, wherein printing the separator and the second separator comprise simultaneously covering exposed surfaces of the electrode layer of the first type and the second electrode layer of the first type prior to printing the electrode layer of the second type and the second electrode layer of the second type, and wherein printing the electrode layer of the second type and the second electrode layer of the second type comprises simultaneously printing over the separator, the second separator, the second current collector layer, and the third current collector layer.

21. A method of fabricating an energy storage device, the method comprising:
  printing a plurality of laterally adjacent and electrically separated current collector layers over a substrate;
  printing electrode layers of a first type over at least a first subset of the plurality of current collector layers;
  printing electrode layers of a second type over at least a second subset of the plurality of current collector layers; and
  printing a plurality of separator layers to form a plurality of electrically connected cells of the energy storage device, wherein each of the cells comprises one separator of the plurality of separator layers contacting one of the electrode layers of the first type and one of the electrode layers of the second type.

22. The method of Embodiment 21, wherein printing the current collector layers comprises simultaneously printing the current collector layers.

23. The method of Embodiments 21 or 22, wherein printing the electrode layers of the first type comprises simultaneously printing the electrode layers of the first type.

24. The method of any one of Embodiments 21-23, wherein printing the electrode layers of the second type comprises simultaneously printing the electrode layers of the second type.

25. The method of any one of Embodiments 21-24, wherein printing the separator layers comprises simultaneously printing the separator layers.

26. The method of any one of Embodiments 21-25, wherein printing the plurality of separator layers comprises simultaneously covering exposed surfaces of the electrode layers of the first type and the electrode layers of the second type.

27. The method of any one of Embodiments 21-26, wherein printing the plurality of separator layers comprises simultaneously covering exposed surfaces of the electrode layers of the first type prior to printing the electrode layers of the second type, and wherein printing the electrode layers of the second type comprises printing over the plurality of separators and over corresponding ones of the second subset of the plurality of current collector layers.

28. The method of any one of Embodiments 21-27, wherein printing the plurality of current collector layers comprises printing two outer current collector layers configured to serve as positive and negative current collectors and printing one or more inner current collector layers laterally between the outer collector layers, wherein each of the one or more inner current collector layers is shared between two adjacent cells of the plurality of cells.

29. The method of any one of Embodiments 21-28, wherein each of the one or more inner current collector layers has thereover one of the electrode layer of the first type and one of the electrode layers of the second type, such that adjacent ones of the plurality of cells are electrically connected in series.

30. The method of any one of Embodiments 21-29, wherein printing the plurality of current collector layers comprises printing linearly along a line.

31. The method of any one of Embodiments 21-30, wherein printing the plurality of current collector layers comprises printing concentric circular layers.

32. The method of any one of Embodiments 21-31, wherein the plurality of electrically connected cells are configured to be detached from each other upon receiving a mechanical force.

33. The method of Embodiment 32, wherein the plurality of electrically connected cells are configured to be detached at boundaries between adjacent cells of the plurality of cells, wherein the boundaries comprise weakened structures adapted for separation upon receiving the mechanical force.

34. The method of any one of Embodiments 21-33, wherein the energy storage device is flexible.

35. The method of any one of Embodiments 21-34, wherein the plurality of electrically connected cells are configured as a wearable bracelet.

36. The method of Embodiment 35, comprising connecting the plurality of electrically connected cells to a load device configured to be powered by the plurality of electrically connected cells.

37. A manufacturing kit for an energy storage device, comprising:
  an unactivated energy storage device comprising:
    a substrate,
    a plurality of laterally adjacent and electrically separated current collector layers over the substrate, the plurality of current collector layers including a first current collector layer and a second current collector layer, an electrode layer of a first type over the first current collector layer, an electrode layer of a second type over the second current collector layer, and a dry separator over one or both of the electrode layers of the first and second types, wherein the separator comprises an exposed portion through which the dry separator is configured to receive an electrolyte; and an electrolyte configured to be applied to the unactivated energy storage device to activate the energy storage device.

38. The manufacturing kit of Embodiment 37, wherein the dry separator comprises pores configured to absorb the electrolyte upon being applied.

39. The manufacturing kit of Embodiments 37 or 38, wherein the electrolyte comprises an ionic liquid.

40. The manufacturing kit of any one of Embodiments 37-39, wherein the dry separator is over both of the electrode layers of the first and second types.

41. The manufacturing kit of any one of Embodiments 37-40, wherein the dry separator is over the electrode layer and the electrode layer of the second type is over the separator and extends over the second current collector layer.

42. A method of fabricating an electrical system, the method comprising:

printing an energy storage device over a battery-powered core device over a substrate, the battery-powered core device configured to receive power through a first power terminal and a second terminal, the energy storage device configured to provide the power to the battery-powered core device, wherein printing the energy storage device comprises:

printing a plurality of current collector layers including a first current collector layer and a second current collector layer, wherein at least one of the first or second current collector layers is printed over the first and second power terminals, printing an electrode layer of a first type over the first current collector layer, printing an electrode layer of a second type over the second current collector layer, and printing a separator over exposed surfaces of one or both of the electrode layers of the first and second types.

43. The method of Embodiment 42, wherein printing the plurality of current collector layers includes printing the first current collector layer over the first power terminal and printing the second current collector layer over the second power terminal.

44. The method of Embodiments 42 or 43, wherein printing the separator comprises printing over the exposed surfaces of both of the electrode layers of the first and second types.

45. The method of any one of Embodiments 42-44, wherein printing the separator comprises printing over the exposed surfaces of the electrode layer of the first type prior to printing the electrode layer of the second type, and wherein printing the electrode layer of the second type comprises printing over the separator and over the second current collector layer.

46. The method of any one of Embodiments 42-45, further comprising forming the core device over the substrate.

47. An energy storage device comprising:

a first current collector layer and a second current collector layer adjacently disposed in a lateral direction over an electrically insulating substrate;

a first electrode layer of a first type over the first current collector layer;

a separator over the first electrode layer; and a second electrode layer of a second type different from the first type comprising over the separator, wherein the second electrode layer comprises a base portion extending from the second current collector layer in a vertical direction and a lateral extension portion laterally extending from the base portion in the lateral direction to overlap the first electrode layer, wherein one or more of the first current collector layer, the first electrode layer, the separator, the second electrode layer and the second current collector layer is a printed layer.

48. The energy storage device of Embodiment 47, wherein the electrically insulating substrate comprises a polymeric substrate.

49. The energy storage device of Embodiments 47 or 48, wherein the electrically insulating substrate comprises a flexible substrate.

50. The energy storage device of any one of Embodiments 47-49, wherein the separator comprises:

a vertical portion interposed in the lateral direction between the base portion of the second electrode layer and a side surface of the first electrode layer; and a horizontal portion interposed in the vertical direction between the lateral extension portion of the second electrode layer and a top surface of the first electrode layer.

51. The energy storage device of any one of Embodiments 47-50, wherein the base portion of the second electrode layer has a width that is thicker than a thickness of the lateral extension portion of the second electrode layer.

52. The energy storage device of Embodiment 51, wherein the width of the base portion of the second electrode layer is greater than the thickness of the lateral extension portion of the second electrode layer by a factor between two to ten.

53. The energy storage device of any one of Embodiments 47-52, wherein the first electrode layer comprises a first electrode active material and the second electrode layer comprises a second electrode active material, wherein a molar ratio between the first electrode active material and the second electrode active material is between 0.25 and 4.0.

54. The energy storage device of any one of Embodiments 47-53, wherein printed ones of the one or more of the first current collector layer, the first electrode layer, the separator, the second electrode layer and the second current collector layer comprise a dried ink composition.

55. An energy storage device comprising:

a first current collector layer and a second current collector layer adjacently disposed in a lateral direction over an electrically insulating substrate;

a first electrode layer of a first type over the first current collector layer;

a second electrode layer of a second type over the second current collector layer; and a separator over the first electrode layer and the second electrode layer, wherein one or more of the first current collector layer, the first electrode layer, the separator, the second electrode layer and the second current collector layer are printed layers,
wherein the first electrode layer comprises a first electrode active material and the second electrode layer comprises a second electrode active material, and wherein a molar ratio between the first electrode active material and the second electrode active material is between 0.25 and 4.0.

56. The energy storage device of Embodiment 55, wherein the first electrode layer comprises a first electrode active material and the second electrode layer comprises a second electrode active material, wherein a ratio between a lateral coverage area of the first electrode layer and a lateral coverage area of the second electrode is proportional to the molar ratio.

57. The energy storage device of Embodiments 55 or 56, wherein the first electrode layer is on a first side of the separator, and wherein the energy storage device further comprises a further first electrode layer on a second side of the separator opposite the first side of the separator.

58. The energy storage device of Embodiment 57, wherein the first electrode layer and the further first electrode layer are electrically connected to each other.

59. The energy storage device of Embodiment 58, wherein the first electrode layer and the further first electrode layer are electrically connected to each other through a plurality of perforations through a portion of the separator between the first electrode layer and the further first electrode layer.

60. The energy storage device of Embodiment 59, wherein one or both of the first electrode layer and the further first electrode layer fills the plurality of perforations.

61. The energy storage device of any one of Embodiments 55-60, wherein the second electrode layer is on a first side of the separator, and wherein the energy storage device further comprises a further second electrode layer on a second side of the separator opposite the first side of the separator.

62. The energy storage device of Embodiment 61, wherein the second electrode layer and the further second electrode layer are electrically connected to each other.

63. The energy storage device of Embodiment 62, wherein the second electrode layer and the further second electrode layer are electrically connected to each other through a plurality of perforations through a portion of the separator between the second electrode layer and the further second electrode layer.

64. The energy storage device of Embodiment 63, wherein one or both of the second electrode layer and the further second electrode layer fills the plurality of perforations.

65. The energy storage device of any one of Embodiments 55-64, wherein the first current collector layer is on a first side of the electrically insulating substrate, and wherein the energy storage device further comprises a further first current collector layer on a second side of the electrically insulating substrate opposite the first side of the electrically insulating substrate.

66. The energy storage device of Embodiment 65, wherein the first current collector layer and the further first current collector layer are electrically connected to each other.

67. The energy storage device of Embodiment 66, wherein the first current collector layer and the further first current collector layer are electrically connected to each other through a plurality of perforations through a portion of the electrically insulating substrate between the first current collector layer and the further first current collector layer.

68. The energy storage device of Embodiment 67, wherein one or both of the first current collector layer and the further first current collector layer fills the perforations.

69. The energy storage device of any one of Embodiments 55-68, wherein the second current collector layer is on a first side of the electrically insulating substrate, and wherein the energy storage device further comprises a further second current collector layer on a second side of the electrically insulating substrate opposite the first side of the electrically insulating substrate.

70. The energy storage device of Embodiment 69, wherein the second current collector layer and the further second current collector layer are electrically connected to each other.

71. The energy storage device of Embodiment 70, wherein the second current collector layer and the further second current collector layer are electrically connected to each other through a plurality of perforations through a portion of the electrically insulating substrate between the second current collector layer and the further second current collector layer.

72. The energy storage device of Embodiment 71, wherein one or both of the first current collector layer and the further first current collector layer fills the perforations.

73. The energy storage device of any one of Embodiments 55-72, wherein the first current collector layer and the second current collector are on a first side of the electrically insulating substrate, and wherein the energy storage device further comprises a further first current collector layer and a further second current collector layer on a second side of the electrically insulating substrate opposite the first side of the electrically insulating substrate.

74. The energy storage device of Embodiment 73, further comprising:
 a further first electrode layer of the first type over the further first current collector layer;
 a further second electrode layer of the second type over the further second current collector layer; and
 a further separator over the further first electrode layer and the further second electrode layer.

75. The energy storage device of Embodiment 74, wherein the separator and the further separator are physically connected through a plurality of perforations through the electrically insulating substrate.

76. An energy storage device comprising:
 a first current collector layer over an electrically insulating substrate;
 a first electrode layer of a first type over the first current collector layer;
 a separator over the first electrode layer and covering a top surface and a side surface thereof;
 a second electrode layer of a second type over the separator; and
 a second current collector layer comprising a base portion extending from the electrically insulating substrate in a vertical direction and a lateral extension portion laterally extending from the base portion in the lateral direction to overlap the second electrode layer,
wherein one or more of the first current collector layer, the first electrode layer, the separator, the second electrode layer and the second current collector layer are printed layers,
wherein the first electrode layer comprises a first electrode active material and the second electrode layer comprises a second electrode active material, and wherein a molar ratio between the first electrode active material and the second electrode active material is between 0.25 and 4.0.

77. The energy storage device of Embodiment 76, wherein the second electrode layer is on a first side of the second current collector, and wherein the energy storage device further comprises a further second electrode layer on a second side of the second current collector opposite the first side of the second current collector.

78. The energy storage device of Embodiment 77, wherein the second electrode layer and the further second electrode layer are electrically connected to each other.

79. The energy storage device of Embodiment 78, wherein the second electrode layer and the further second electrode layer are electrically connected to each other through a plurality of perforations through the lateral extension portion of the second current collector between the second electrode layer and the further second electrode layer.

80. The energy storage device of Embodiment 79 wherein one or both of the second electrode layer and the further second electrode layer fills the plurality of perforations.

81. The energy storage device of any one of Embodiments 76-80, further comprising:
a second separator over the further second electrode layer;
a further first electrode layer over the second separator; and
a further first current collector layer over the first electrode layer.

82. The energy storage device of Embodiment 81, wherein the first current collector layer and the further first current collector layer are electrically connected to each other.

83. An energy storage device comprising:
an electrically insulating substrate;
a first current collector over the electrically insulating substrate, wherein the first current collector comprises a plurality of first current collector finger structures;
a second current collector over the electrically insulating substrate, wherein the second current collector comprises a plurality of second current collector finger structures, wherein the first current collector finger structures and the second current collector finger structures are interleaved to alternate in a lateral direction;
a first electrode layer of a first type over the first current collector layer;
a second electrode layer of a second type over the second current collector layer; and
a separator layer separating the first electrode layer and the second electrode layer.

84. The energy storage device of Embodiment 83, wherein the first electrode layer comprises a first electrode active material and the second electrode layer comprises a second electrode active material, wherein a molar ratio between the first electrode active material and the second electrode active material is between 0.25 and 4.0.

85. The energy storage device of Embodiments 83 or 84, wherein the first electrode layer comprises a first electrode active material and the second electrode layer comprises a second electrode active material, wherein a ratio between a lateral area of the first electrode layer and a lateral area of the second electrode is proportional to the molar ratio.

86. The energy storage device of any one of Embodiments 83-85, wherein the first electrode layer comprises a plurality of first electrode finger structures and the second electrode layer comprises a plurality of second electrode finger structures, and wherein the first electrode finger structures and the second electrode finger structures are interleaved to alternate in the lateral direction.

87. The energy storage device of Embodiment 86, wherein the separator layer is over the first electrode layer and the second electrode layer.

88. The energy storage device of Embodiment 87, wherein the separator layer is interposed between adjacent pairs of the first electrode finger structures and the second electrode finger structures that alternate in the lateral direction.

89. The energy storage device of Embodiment 88, wherein the separator layer is interposed between adjacent pairs of the first current collector finger structures and the second current collector finger structures that alternate in the lateral direction.

90. The energy storage device of any one of Embodiments 83-89, wherein the first electrode layer comprises a plurality of first electrode finger structures, wherein the separator layer is over each of the first electrode finger structures, and wherein the second electrode layer is over the separator layer.

91. The energy storage device of Embodiment 90, wherein the separator separates the first electrode finger structures from the second electrode layer in the lateral direction and in the a vertical direction.

92. The energy storage device of Embodiment 91, wherein the separator layer is interposed between adjacent pairs of the first current collector finger structures and the second current collector finger structures that alternate in the lateral direction.

93. The energy storage device of any one of Embodiments 83-92, wherein each of the first current collector finger structures and the second current collector finger structures has a ratio of a length to a width between about 2 and 100.

94. An energy storage device comprising:
a plurality of laterally adjacent and electrically separated current collectors over an electrically insulating substrate,
wherein the energy storage device comprises a plurality of electrically connected energy storage cells, and
wherein each of the energy storage cells comprises a first electrode layer of a first type on one of the current collectors, a second electrode layer of a second type on an adjacent one of the current collectors, and a separator contacting and electrically separating the first electrode layer and the second electrode layer.

95. The energy storage device of Embodiment 94, wherein adjacent ones of the energy storage cells share a common current collector layer having thereon the first electrode layer of a first one of the adjacent ones of the energy storage cells and the second electrode layer of the second one of the adjacent ones of the energy storage cells.
96. The energy storage device of Embodiments 94 or 95, wherein the plurality of current collectors comprises a first current collector configured to serve as a current collector of a first polarity, a second current collector configured to serve as a current collector of a second polarity, and one or more intermediate current collectors configured to electrically connect the adjacent ones of the energy storage cells.
97. The energy storage device of any one of Embodiments 94-96, wherein each of the intermediate current collectors has thereon one of the first electrode layers and one of the second electrode layers that are not electrically separated by one of the separator layers.
98. The energy storage device of any one of Embodiments 94-97, wherein each of the energy storage cells comprises one of the first electrode layers having a first electrode active material and one of the second electrode layers having a second electrode active material, wherein a molar ratio between the first electrode active material and the second electrode active material is between 0.25 and 4.0.
99. The energy storage device of Embodiment 98, wherein each of the energy storage cells has a ratio between a lateral area of the first electrode layer and a lateral area of the second electrode that is proportional to the molar ratio.
100. The energy storage device of any one of Embodiments 94-99, wherein in each of the energy storage cells, the separator contacts top surfaces of the first electrode layer and the second electrode layer.
101. The energy storage device of any one of Embodiments 94-100, wherein in each of the energy storage cells, the separator is over the first electrode layer and the second electrode layer is over the separator.
102. The energy storage device of Embodiment 101, wherein the second electrode layer of a first one of the energy storage cells comprises a base portion extending from the adjacent one of the current collectors in a vertical direction and a lateral extension portion laterally extending from the base portion in the lateral direction to overlap the first electrode layer on the one of the current collectors.
103. The energy storage device of any one of Embodiments 94-102, wherein the plurality of current collectors are along a line.
104. The energy storage device of any one of Embodiments 94-103, wherein the plurality of current collector comprise concentric layers.
105. The energy storage device of any one of Embodiments 94-104, wherein the energy storage device is flexible and configured to be worn by a user.
106. The energy storage device of any one of Embodiments 94-105, wherein the plurality of electrically connected energy storage cells is configured to be worn by a user as a wearable bracelet.
107. The energy storage device of any one of Embodiments 94-106, wherein the plurality of electrically connected energy storage cells is configured to be electrically connected to a core device powered by the energy storage device.
108. The energy storage device of Embodiment 107, wherein the core device comprises a device selected from the group consisting of a light emitting device, an active or passive radio frequency identification device, a Bluetooth® device, a sensor, an infrared (IR) device, interface electronics, a Zigbee®-based device, a near-field communication (NFC)-based device, a health indicator monitor and a location tracking device.
109. The energy storage device of any one of Embodiments 94-108, wherein the electrically connected energy storage cells are configured to be detached from each other upon receiving a mechanical force to form a regular pattern of electrically connected energy storage cells.
110. The energy storage device of Embodiment 109, wherein the plurality of electrically connected energy storage cells are configured to be detached at boundaries between adjacent ones of the plurality of electrically connected energy storage cells, wherein the boundaries comprise weakened structures in the electrically insulating substrate that are adapted for separation upon receiving the mechanical force.
111. The energy storage device of Embodiment 110, wherein the plurality of electrically connected energy storage cells are arranged as one or more rows of electrically connected energy storage cells and one or more columns of electrically connected energy storage cells.
112. The energy storage device of Embodiment 111, wherein each of the one or more rows of electrically connected energy storage cells are electrically connected in series, and wherein each of the one or more columns of electrically connected energy storage cells are electrically connected in parallel.
113. A method of activating an energy storage device, comprising:
    providing an unactivated energy storage device comprising:
        a substrate,
        a plurality of laterally adjacent and electrically separated current collector layers over the substrate, the plurality of current collector layers including a first current collector layer and a second current collector layer,
        an electrode layer of a first type over the first current collector layer,
        an electrode layer of a second type over the second current collector layer, and
        a dry separator over one or both of the electrode layers of the first and second types, wherein the separator comprises an exposed portion through which the dry separator is configured to receive an electrolyte; and
    activating the energy storage device by applying an electrolyte to the dry separator.
114. The method of Embodiment 113, wherein activating comprises absorbing the electrolyte into the dry separator comprising pores.
115. The method of Embodiments 113 or 114, wherein the electrolyte comprises an ionic liquid.
116. The method of any one of Embodiments 113-115, wherein the dry separator is over both of the electrode layers of the first and second types.
117. The method of any one of Embodiments 113-116, wherein the dry separator is over the electrode layer and the electrode layer of the second type is over the separator and extends over the second current collector layer.

118. A thin film-based electronic device, comprising:
a thin film-based core device and a thin film-based energy storage device (ESD) electrically connected to each other, wherein the thin film-based core device and the thin film-based energy storage device are integrated on a common substrate and overlap each other in a direction normal to the common substrate.

119. The thin film-based electronic device of Embodiment 118, wherein the thin film-based ESD comprises a first current collector layer and a second current collector layer that are adjacently disposed relative to each other, a first electrode layer of a first type over the first current collector layer, a second electrode layer of a second type over the second current collector layer, and a separator over one or both of the first and second electrode layers.

120. The thin film-based electronic device of Embodiment 119, wherein the thin film-based core device is vertically interposed between the common substrate and one or more of the first current collector layer, the second current collector layer, the first electrode layer, the second electrode layer or the separator.

121. The thin film-based electronic device of Embodiment 120, wherein separator is over the first electrode layer and the second electrode layer.

122. The thin film-based electronic device of Embodiment 121, wherein the thin film-based core device is vertically interposed between the common substrate and both of the first and second current collector layers.

123. The thin film-based electronic device of Embodiments 121 or 122, wherein the thin film-based core device is vertically interposed between the common substrate and both of the first and second electrode layers.

124. The thin film-based electronic device of any one of Embodiments 121-123, wherein the thin film-based core device is configured to receive power through a first terminal and a second terminal thereon, and wherein the first electrode layer is over the first terminal and the second electrode layer is over the second terminal.

125. The thin film-based electronic device of any one of Embodiments 121-123, wherein the thin film-based core device is configured to receive power through a first terminal and a second terminal on the same side of the thin film-based core device.

126. The thin film-based electronic device of any one of Embodiments 121-125, wherein the thin film-based core device is vertically interposed between the common substrate and each of the first current collector layer, the second current collector layer, the first electrode layer, the second electrode layer and the separator.

127. The thin film-based electronic device of Embodiment 121, wherein the thin film-based core device is vertically interposed between the common substrate and one but not the other of the first and second current collector layers.

128. The thin film-based electronic device of Embodiments 121 or 127, wherein the thin film-based core device is vertically disposed between the common substrate and one but not the other of the first and second electrode layers.

129. The thin film-based electronic device of Embodiments 127 or 128, wherein the thin film-based core device is configured to receive power through a first terminal and a second terminal thereon, and wherein the first electrode layer is over the first terminal and the second electrode layer is over the second terminal.

130. The thin film-based electronic device of Embodiments 127 or 128, wherein the thin film-based core device is configured to receive power through a first terminal and a second terminal on opposing sides the thin film-based core device.

131. The thin film-based electronic device of any one of Embodiments 127-130, wherein the thin film-based core device is vertically interposed between the common substrate and each of the first current collector layer, the first electrode layer and the separator.

132. The thin film-based electronic device of Embodiment 118, wherein the thin film-based ESD comprises:
a first current collector layer over the common substrate;
a first electrode layer of a first type over the first current collector layer;
a separator over the first electrode layer;
a second electrode layer of a second type over the separator; and
a second current collector layer over the second electrode layer.

133. The thin film-based electronic device of Embodiment 132, wherein the thin film-based core device is vertically interposed between the first current collector layer and the second current collector layer.

134. The thin film-based electronic device of Embodiments 132 or 133, wherein the thin film-based core device is configured to receive power through a first terminal and a second terminal thereon, and wherein the first terminal is over the first current collector layer and the second current collector layer is over the second terminal.

135. The thin film-based electronic device of Embodiments 132 or 133, wherein the thin film-based core device is configured to receive power through a first terminal and a second terminal on opposing sides the thin film-based core device.

136. The thin film-based electronic device of any one of Embodiments 118-135, wherein the common substrate comprises an electrically insulating substrate.

137. The thin film-based electronic device of any one of Embodiments 118-136, wherein the common substrate comprises a flexible substrate.

138. The thin film-based electronic device of any one of Embodiments 118-137, wherein the first electrode layer comprises a first electrode active material and the second electrode layer comprises a second electrode active material, and wherein a molar ratio between the first electrode active material and the second electrode active material is between 0.25 and 4.0.

139. The thin film-based electronic device of any one of Embodiments 118-138, wherein the thin film-based core device comprises one or more of a light emitting device, an acoustic device, a monitor device, a motor device, a movement device, a display device, an antenna, an active or passive radio frequency identification (RFID) device, a Bluetooth® device, a sensor, an infrared (IR) device, interface electronics, a Zigbee®-based device, an A-wave device, a near-field communication (NFC)-based device, a smart band, a health monitor, a fitness tracking device, a smart watch, a position tracking device, a low power wireless personal area network (LoWPAN) device or a low power wide area network (LPWAN) device.

140. The thin film-based electronic device of any one of Embodiments 118-139, wherein the thin film-based core device comprises a light emitting device.

141. The thin film-based electronic device of Embodiment 140, wherein the common substrate is a transparent substrate configured to transmit therethrough light emitted by the light emitting device.

142. The thin film-based electronic device of any one of Embodiments 118-141, further comprising an activation switch configured to activate a circuit comprising the thin film-based core device and the thin film-based ESD.

143. A thin film-based electronic device, comprising:
a thin film-based energy storage device (ESD); and
a thin film-based energy harvesting device and electrically connected to the thin film-based ESD and configured to charge the thin film-based ESD,
wherein the thin film-based energy harvesting device and the thin film-based energy storage device are integrated on a common substrate.

144. The thin film-based electronic device of Embodiment 143, wherein the thin film-based ESD comprises a first current collector layer and a second current collector layer that are disposed laterally adjacent to each other, a first electrode layer of a first type vertically over the first current collector layer, a second electrode layer of a second type vertically over the second current collector layer, and a separator separating the first and second current collector layers and separating the first and second electrode layers.

145. The thin film-based electronic device of Embodiment 144, wherein the separator is laterally interposed between the first and second electrode layers.

146. The thin film-based electronic device of Embodiments 144 or 145, wherein the separator is laterally interposed between the first and second current collector layers.

147. The thin film-based electronic device of Embodiment 146, wherein the thin film-based energy harvesting device is disposed vertically over one or both of the first electrode and the second electrode layers.

148. The thin film-based electronic device of any one of Embodiments 143 to 147, wherein the thin film-based energy harvesting device comprises one or more of a photovoltaic device, a thermoelectric device, a piezoelectric device, a wireless charging device, a tribological harvesting device, an RF-based energy harvesting device, a pyroelectric energy harvesting device, a capacitive energy harvesting device, a microbial energy harvesting device or magnetorestrictive energy harvesting device.

149. The thin film-based electronic device of any one of Embodiments 143 to 148, wherein the thin film-based energy harvesting device comprises a printed photovoltaic layer.

150. The thin film-based electronic device of Embodiment 149, wherein the printed photovoltaic layer comprises an organic-inorganic hybrid material having a perovskite crystal structure.

151. The thin film-based electronic device of Embodiment 149, wherein the printed photovoltaic layer comprises an organic-inorganic hybrid material having a chemical formula $ABX_3$, where A is an organic or inorganic cation, B is a metal cation and X is an anion.

152. The thin film-based electronic device of Embodiment 151, wherein A is one of methylammonium, formamidinium or $Cs^+$, B is one of $Pb^{2+}$ or $Sn^{2+}$, and X is one of $I^-$, $Br-$, $Cl^-$ or $SCN^-$.

153. The thin film-based electronic device of any one of Embodiments 149-152, wherein the thin film-based energy harvesting device further comprises an electron transport layer.

154. The thin film-based electronic device of any one of Embodiments 149-153, wherein the thin film-based energy harvesting device further comprises a hole transport layer.

155. The thin film-based electronic device of any one of any one of Embodiments 144 to 154, wherein the thin-film based energy harvesting device is on one of the first current collector layer or the second current collector layer.

156. The thin film-based electronic device of Embodiment 155, wherein the thin film-based electronic device further comprises a second thin film-based energy harvesting device on the other of the first current collector or the second current collector layer.

157. The thin film-based electronic device of Embodiment 156, wherein the thin film-based energy harvesting device and the second thin film-based energy harvesting device are electrically serially connected.

158. The thin film-based electronic device of Embodiment 156, wherein the thin film-based energy harvesting device and the second thin film-based energy harvesting device are electrically serially connected through a diode therebetween.

159. The thin film-based electronic device of Embodiment 158, wherein the diode is configured to be forward-biased when the thin film-based ESD is charging and reverse-biased when the thin film-based ESD is discharging.

160. The thin film-based electronic device of Embodiment 156, further comprising a conductive layer over one or both of the thin film-based energy harvesting device and the second thin film-based energy harvesting device.

161. A wearable thin film-based electronic device comprising:
a plurality of laterally adjacent and electrically separated current collectors over an electrically insulating substrate; and
a plurality of electrically connected energy storage cells,
wherein each of the energy storage cells comprises a first electrode layer of a first type on one of the current collectors, a second electrode layer of a second type on an adjacent one of the current collectors, and a separator contacting and electrically separating the first electrode layer and the second electrode layer, and
wherein the plurality of electrically connected energy storage cells is configured to be worn by a user.

162. The wearable thin film-based electronic device of Embodiment 161, wherein adjacent ones of the energy storage cells share a common current collector layer having thereon the first electrode layer of a first one of the adjacent ones of the energy storage cells and the second electrode layer of the second one of the adjacent ones of the energy storage cells.

163. The wearable thin film-based electronic device of Embodiments 161 or 162, wherein the plurality of current collectors comprises a first current collector configured to serve as a current collector of a first polarity, a second current collector configured to serve as a current collector of a second polarity, and one or more intermediate current collectors configured to electrically connect the adjacent ones of the energy storage cells.

164. The wearable thin film-based electronic device of any one of Embodiments 161-163, wherein each of the intermediate current collectors has thereon one of the first electrode layers and one of the second electrode layers that are not electrically separated by one of the separator layers.

165. The wearable thin film-based electronic device of any one of Embodiments 161-164, wherein each of the energy storage cells comprises one of the first electrode layers having a first electrode active material and one of the second electrode layers having a second electrode active material, wherein a molar ratio between the first electrode active material and the second electrode active material is between 0.25 and 4.0.

166. The wearable thin film-based electronic device of Embodiment 165, wherein each of the energy storage cells has a ratio between a lateral area of the first electrode layer and a lateral area of the second electrode that is proportional to the molar ratio.

167. The wearable thin film-based electronic device of any one of Embodiments 161-166, wherein in each of the energy storage cells, the separator contacts top surfaces of the first electrode layer and the second electrode layer.

168. The wearable thin film-based electronic device of any one of Embodiments 161-166, wherein in each of the energy storage cells, the separator is over the first electrode layer and the second electrode layer is over the separator.

169. The wearable thin film-based electronic device of Embodiment 168, wherein the second electrode layer of a first one of the energy storage cells comprises a base portion extending from the adjacent one of the current collectors in a vertical direction and a lateral extension portion laterally extending from the base portion in the lateral direction to overlap the first electrode layer on the one of the current collectors.

170. The wearable thin film-based electronic device of any one of Embodiments 161-169, wherein the plurality of current collectors are along a line.

171. The wearable thin film-based electronic device of any one of Embodiments 161-170, wherein the plurality of current collector comprise concentric layers.

172. The wearable thin film-based electronic device of any one of Embodiments 161-171, wherein the energy storage device is flexible.

173. The wearable thin film-based energy storage device of any one of Embodiments 161-172, wherein the wearable thin film-based electronic device is configured to be worn by a user as a wearable bracelet.

174. The wearable thin film-based energy storage device of any one of Embodiments 161-173, further comprising a core device powered by the plurality of electrically connected energy storage cells.

175. The wearable thin film-based energy storage device Embodiment 174, wherein the core device comprises a device selected from the group consisting of a light emitting device, an active or passive radio frequency identification device, a Bluetooth® device, a sensor, an infrared (IR) device, interface electronics, a Zigbee®-based device, a near-field communication (NFC)-based device, a health indicator monitor and a location tracking device.

176. A configurable energy storage device. comprising:
a plurality of laterally adjacent and electrically separated current collectors over an electrically insulating substrate,
wherein the energy storage device comprises a plurality of electrically connected energy storage cells, and
wherein the electrically connected energy storage cells are configured to be detached from each other upon receiving a mechanical force to form a pattern of electrically connected energy storage cells.

177. The configurable energy storage device of Embodiment 176, wherein each of the energy storage cells comprises a first electrode layer of a first type on one of the current collectors, a second electrode layer of a second type on an adjacent one of the current collectors, and a separator contacting and electrically separating the first electrode layer and the second electrode layer.

178. The configurable energy storage device of Embodiments 176 or 177, wherein the plurality of electrically connected energy storage cells are configured to be detached at boundaries between adjacent ones of the plurality of electrically connected energy storage cells, wherein the boundaries comprise weakened structures in the electrically insulating substrate that are adapted for separation upon receiving the mechanical force.

179. The configurable energy storage device of any one of Embodiment 176 to 178, wherein the plurality of electrically connected energy storage cells are arranged as one or more rows of electrically connected energy storage cells and one or more columns of electrically connected energy storage cells.

180. The configurable energy storage device of any one of Embodiment 179, wherein each of the one or more rows of electrically connected energy storage cells are electrically connected in series, and wherein each of the one or more columns of electrically connected energy storage cells are electrically connected in parallel.

181. An energy storage device comprising:
a plurality of radially arranged and electrically separated current collectors over an electrically insulating substrate,
wherein the energy storage device comprises a plurality of radially arranged and electrically connected energy storage cells, and
wherein each of the energy storage cells comprises a first electrode layer of a first type on one of the current collectors, a second electrode layer of a second type on an adjacent one of the current collectors, and a separator contacting and electrically separating the first electrode layer and the second electrode layer.

182. The energy storage device of Embodiment 181, wherein adjacent ones of the energy storage cells share a common current collector layer having thereon the first electrode layer of a first one of the adjacent ones of the energy storage cells and the second electrode layer of the second one of the adjacent ones of the energy storage cells.

183. The energy storage device of Embodiments 181 or 182, wherein the plurality of current collectors comprises a first current collector configured to serve as a current collector of a first polarity, a second current collector configured to serve as a current collector of a second polarity, and one or more intermediate current collectors configured to electrically connect the adjacent ones of the energy storage cells.

184. The energy storage device of any one of Embodiments 181-183, wherein each of the intermediate current collectors has thereon one of the first electrode layers and one of the second electrode layers that are not electrically separated by one of the separator layers.

185. The energy storage device of any one of Embodiments 181-184, wherein each of the energy storage cells comprises one of the first electrode layers having a first electrode active material and one of the second electrode layers having a second electrode active material, wherein a molar ratio between the first electrode active material and the second electrode active material is between 0.25 and 4.0.

186. An energy storage device comprising:
an electrically insulating substrate;
a first current collector over the electrically insulating substrate, wherein the first current collector comprises a plurality of first current collector finger structures;
a second current collector over the electrically insulating substrate, wherein the second current collector comprises a plurality of second current collector finger structures, wherein the first current collector finger structures and the second current collector finger structures are interleaved to alternate in a lateral direction,
wherein the first and second current collectors are radially arranged such that one of the first and second current collectors radially surrounds the other of the first and second current collectors;
a first electrode layer of a first type over the first current collector layer;
a second electrode layer of a second type over the second current collector layer; and
a separator layer separating the first electrode layer and the second electrode layer.

187. The energy storage device of Embodiment 186, wherein the first electrode layer comprises a first electrode active material and the second electrode layer comprises a second electrode active material, wherein a molar ratio between the first electrode active material and the second electrode active material is between 0.25 and 4.0.

188. The energy storage device of Embodiments 186 or 187, wherein the first electrode layer comprises a first electrode active material and the second electrode layer comprises a second electrode active material, wherein a ratio between a lateral area of the first electrode layer and a lateral area of the second electrode is proportional to the molar ratio.

189. The energy storage device of any one of Embodiments 186-188, wherein the first electrode layer comprises a plurality of first electrode finger structures and the second electrode layer comprises a plurality of second electrode finger structures, and wherein the first electrode finger structures and the second electrode finger structures are interleaved to alternate in the lateral direction.

190. The energy storage device of Embodiment 189, wherein the separator layer is over the first electrode layer and the second electrode layer.

191. The energy storage device of Embodiment 190, wherein the separator layer is interposed between adjacent pairs of the first electrode finger structures and the second electrode finger structures that alternate in the lateral direction.

192. The energy storage device of Embodiment 191, wherein the separator layer is interposed between adjacent pairs of the first current collector finger structures and the second current collector finger structures that alternate in the lateral direction.

193. The energy storage device of any one of Embodiments 186-192, wherein the first electrode layer comprises a plurality of first electrode finger structures, wherein the separator layer is over each of the first electrode finger structures, and wherein the second electrode layer is over the separator layer.

194. The energy storage device of Embodiment 193, wherein the separator separates the first electrode finger structures from the second electrode layer in the lateral direction and in the a vertical direction.

195. The energy storage device of Embodiment 194, wherein the separator layer is interposed between adjacent pairs of the first current collector finger structures and the second current collector finger structures that alternate in the lateral direction.

196. The energy storage device of any one of Embodiments 186-195, wherein each of the first current collector finger structures and the second current collector finger structures has a ratio of a length to a width between about 2 and 100.

197. The method of any one of Embodiments 1-20, the method of any one of Embodiments 21-36, the manufacturing kit of any one of Embodiments 37-41, the method of fabricating an electrical system of any one of Embodiments 42-46, the energy storage device of any one of Embodiments 47-54, the energy storage device of any one of Embodiments 55-75, the energy storage device of any one of Embodiments 76-82, the energy storage device of any one of Embodiments 83-93, the energy storage device of any one of Embodiments 94-112, the method of any one of Embodiments 113-117, the thin-film-based electronic device of any one of Embodiments 118-142, the thin film-based electronic device of any one of Embodiments 143-160, the wearable thin film-based electronic device of any one of Embodiments 161-175, the configurable energy storage device of any one of Embodiments 176-180, the energy storage device of any one of Embodiments 181-185, or the energy storage device of any one of Embodiments 186-196, wherein the energy storage device further comprises a non-aqueous electrolyte.

198. The method or device of Embodiment 197, wherein the non-aqueous electrolyte comprises an organic electrolyte based on acetonitrile, propylene carbonate, ethylene carbonate, diethyl carbonate, dimethyl carbonate, ethyl acetate, 1,1,1,3,3,3-hexafluoropropan-2-ol, adiponitrile, 1,3-propylene sulfite, butylene carbonate, Y-butyrolactone, Y-valerolactone, propionitrile, glutaronitrile, adiponitrile, methoxyacetonitrile, 3-methoxypropionitrile, N,N-dimethylformamide, N,N-dimethylacetamide, N-methylpyrrolidinone, N-methyloxazolidinone, N,N"-dimethylimidazolininone, nitromethane, nitroethane, sulfonate, 3-methylsulfonate, dimethylsulfoxide, trimethyl phosphate, or a combination thereof.

199. The method or device of Embodiments 197 or 198, wherein the non-aqueous electrolyte comprises an ionic liquid.

200. The method or device of Embodiment 199, wherein a cation of the ionic liquid comprises one or more of butyltrimethylammonium, 1-ethyl-3-methylimidazolium, 1-butyl-3-methylimidazolium, 1-methyl-3-propylimidazolium, 1-hexyl-3-methylimidazolium, choline, ethylammonium, tributylmethylphosphonium, tributyl(tetradecyl)phosphonium, trihexyl(tetradecyl)phosphonium, 1-ethyl-2,3-methylimidazolium, 1-butyl-1-methylpiperidinium, diethylmethylsulfonium, 1-methyl-3-propylimidazolium, 1-ethyl-3-methylimidazolium, 1-methyl-1-propylpiperidinium, 1-butyl-2-methylpyridinium, 1-butyl-4-methylpyridinium, 1-butyl-1-methylpyrrolidinium, diethylmethylsulfonium, or a combination thereof.

201. The method or device of Embodiments 199 or 200, wherein an anion of the ionic liquid comprises one or more of tris(pentafluoroethyl)trifluorophosphate, trifluoromethanesulfonate, hexafluorophosphate, tetrafluoroborate, ethyl sulfate, dimethyl phosphate, trifluoromethanesulfonate, methansulfonate, triflate, tricyanomethanide, dibutylphosphate, bis(trifluoromethylsulfonyl)imide, bis-2,4,4-(trimethylpentyl) phosphinate, iodides, chlorides, bromides, nitrates, or a combination thereof.

202. The method or device of any one of Embodiments 197-201, wherein the non-aqueous electrolyte comprises an acid selected from the group consisting of $H_2SO_4$, HCl, $HNO_3$, $HClO_4$ and a combination thereof.

203. The method or device of any one of Embodiments 197-202, wherein the non-aqueous electrolyte comprises a base selected from the group consisting of KOH, NaOH, LiOH, $NH_4OH$ and a combination thereof.

204. The method or device of any one of Embodiments 197-203, wherein the non-aqueous electrolyte comprises an inorganic-based salt selected from the group consisting of LiCl, $Li_2SO_4$, $LiClO_4$, NaCl, $Na_2SO_4$, $NaNO_3$, KCl, $K_2SO_4$, KNOB, $Ca(NO_3)_2$, $MgSO_4$, $ZnCl_2$, $Zn(BF_4)_2$, $ZnNO_3$ and a combination thereof.

205. The method or device of any one of Embodiments 197-204, wherein the non-aqueous electrolyte comprises a low viscosity additive selected from the group consisting of water, an alcohol, a lactone, an ether, a ketone, an ester, a polyols, a glycerol, a polymeric polyol or glycol, tetramethyl urea, n-methylpyrrolidone, acetonitrile, tetrahydrofuran (THF), dimethyl formamide (DMF), N-methyl formamide (NMF), dimethyl sulfoxide (DMSO), thionyl chloride, sulfuryl chloride and a combination thereof.

206. The method or device of any one of Embodiments 197-205, wherein the non-aqueous electrolyte comprises a surfactant selected from the group consisting of cetyl alcohol, stearyl alcohol, cetostearyl alcohol, oleyl alcohol, polyoxyethylene glycol alkyl ether, octaethylene glycol monododecyl ether, glucoside alkyl ether, decyl glucoside, polyoxyethylene glycol octylphenol ether, Triton® X-100, nonoxynol-9, glyceryl laurate, polysorbate, a poloxamer or a combination thereof.

207. The method or device of any one of Embodiment 197-206, wherein the non-aqueous electrolyte comprises a polymer binder selected from the group consisting of polyvinyl pyrrolidone (PVP), polyvinyl alcohol (PVA), polyvinylidene fluoride, polyvynylidene fluoride-trifluoroethylene, polytetrafluoroethylene, polydimethylsiloxane, polyethelene, polypropylene, polyethylene oxide, polypropylene oxide, polyethylene glycolhexafluoropropylene, polyethylene terefphtalatpolyacrylonitryle, polyvinyl butyral, polyvinylcaprolactam, polyvinyl chloride, polyimide, polyamide, polyacrylamide, an acrylate polymer, a methacrylate polymer, acrylonitrile butadiene styrene, allylmethacrylate, polystyrene, polybutadiene, polybutylene terephthalate, polycarbonate, polychloroprene, polyethersulfone, nylon, styrene-acrylonitrile resin, polyethylene glycol, hectorite clay, garamite clay, an organo-modified clay, a saccharide, a polysaccharide, a cellulose, a modified cellulose and a combination thereof.

208. The method of any one of Embodiments 1-20, the method of any one of Embodiments 21-36, the manufacturing kit of any one of Embodiments 37-41, the method of fabricating an electrical system of any one of Embodiments 42-46, the energy storage device of any one of Embodiments 47-54, the energy storage device of any one of Embodiments 55-75, the energy storage device of any one of Embodiments 76-82, the energy storage device of any one of Embodiments 83-93, the energy storage device of any one of Embodiments 94-112, the method of any one of Embodiments 113-117, the thin-film-based electronic device of any one of Embodiments 118-142, the thin film-based electronic device of any one of Embodiments 143-160, the wearable thin film-based electronic device of any one of Embodiments 161-175, the configurable energy storage device of any one of Embodiments 176-180, the energy storage device of any one of Embodiments 181-185, or the energy storage device of any one of Embodiments 186-196, wherein the separator comprises a filler material comprising one or more of diatom frustules, a zeolite, cellulose fibers, fiberglass, alumina, silica gel, molecular sieve carbon, a natural-clay based solid, a polymeric absorbent or a combination thereof.

209. The method of any one of Embodiments 1-20, the method of any one of Embodiments 21-36, the manufacturing kit of any one of Embodiments 37-41, the method of fabricating an electrical system of any one of Embodiments 42-46, the energy storage device of any one of Embodiments 47-54, the energy storage device of any one of Embodiments 55-75, the energy storage device of any one of Embodiments 76-82, the energy storage device of any one of Embodiments 83-93, the energy storage device of any one of Embodiments 94-112, the method of any one of Embodiments 113-117, the thin-film-based electronic device of any one of Embodiments 118-142, the thin film-based electronic device of any one of Embodiments 143-160, the wearable thin film-based electronic device of any one of Embodiments 161-175, the configurable energy storage device of any one of Embodiments 176-180, the energy storage device of any one of Embodiments 181-185, or the energy storage device of any one of Embodiments 186-196, wherein one of the first electrode layer or the second electrode layer comprises a cathode electrode active material comprising a silver-containing compound or a manganese-containing compound.

210. The method of any one of Embodiments 1-20, the method of any one of Embodiments 21-36, the manufacturing kit of any one of Embodiments 37-41, the method of fabricating an electrical system of any one of Embodiments 42-46, the energy storage device of any one of Embodiments 47-54, the energy storage device of any one of Embodiments 55-75, the energy storage device of any one of Embodiments 76-82, the energy storage device of any one of Embodiments 83-93, the energy storage device of any one of Embodiments 94-112, the method of any one of Embodiments 113-117, the thin-film-based electronic device of any one of Embodiments 118-142, the thin film-based electronic device of any one of Embodiments 143-160, the wearable thin film-based electronic device of any one of Embodiments 161-175, the configurable energy storage device of any one of Embodiments 176-180, the energy storage device of any one of Embodiments 181-185, or the energy storage device of any one of Embodiments 186-196, wherein one of the first electrode layer or the second electrode layer comprises a cathode electrode active material comprises a silver(I) oxide ($Ag_2O$), silver(I,III) oxide (AgO), a mixture comprising silver (I) oxide ($Ag_2O$) and manganese (IV) oxide ($MnO_2$), a manganese (II, III) oxide ($Mn_3O_4$), a manganese (II) oxide (MnO), a manganese (III) oxide ($Mn_2O_3$), a manganese oxyhydroxide (MnOOH), a mixture comprising silver(I) oxide ($Ag_2O$) and nickel oxyhydroxide (NiOOH), silver nickel oxide ($AgNiO_2$) or a combination thereof.

211. The method of any one of Embodiments 1-20, the method of any one of Embodiments 21-36, the manufacturing kit of any one of Embodiments 37-41, the method of fabricating an electrical system of any one of Embodiments 42-46, the energy storage device of any one of Embodiments 47-54, the energy storage device of any one of Embodiments 55-75, the energy storage device of any one of Embodiments 76-82, the energy storage device of any one of Embodiments 83-93, the energy storage device of any one of Embodiments 94-112, the method of any one of Embodiments 113-117, the thin-film-based electronic device of any one of Embodiments 118-142, the thin film-based electronic device of any one of Embodiments 143-160, the wearable thin film-based electronic device of any one of Embodiments 161-175, the configurable energy storage device of any one of Embodiments 176-180, the energy storage device of any one of Embodiments 181-185, or the energy storage device of any one of Embodiments 186-196, wherein one of the first electrode layer or the second electrode layer comprises an anode electrode active material selected from the group consisting of zinc, cadmium, iron, nickel, aluminum, metal hydrate, hydrogen or a combinations thereof.

212. The method of any one of Embodiments 1-20, the method of any one of Embodiments 21-36, the manufacturing kit of any one of Embodiments 37-41, the method of fabricating an electrical system of any one of Embodiments 42-46, the energy storage device of any one of Embodiments 47-54, the energy storage device of any one of Embodiments 55-75, the energy storage device of any one of Embodiments 76-82, the energy storage device of any one of Embodiments 83-93, the energy storage device of any one of Embodiments 94-112, the method of any one of Embodiments 113-117, the thin-film-based electronic device of any one of Embodiments 118-142, the thin film-based electronic device of any one of Embodiments 143-160, the wearable thin film-based electronic device of any one of Embodiments 161-175, the configurable energy storage device of any one of Embodiments 176-180, the energy storage device of any one of Embodiments 181-185, or the energy storage device of any one of Embodiments 186-196, wherein the energy storage device comprises a zinc/carbon primary battery, a zinc/alkaline/manganese primary battery, a magnesium/manganese dioxide primary battery, a zinc/mercuric oxide primary battery, a cadmium/mercuric oxide primary battery, a zinc/silver oxide primary battery, a zinc/air primary battery, a lithium/soluble cathode primary battery or a lithium/solid cathode primary battery.

213. The method of any one of Embodiments 1-20, the method of any one of Embodiments 21-36, the manufacturing kit of any one of Embodiments 37-41, the method of fabricating an electrical system of any one of Embodiments 42-46, the energy storage device of any one of Embodiments 47-54, the energy storage device of any one of Embodiments 55-75, the energy storage device of any one of Embodiments 76-82, the energy storage device of any one of Embodiments 83-93, the energy storage device of any one of Embodiments 94-112, the method of any one of Embodiments 113-117, the thin-film-based electronic device of any one of Embodiments 118-142, the thin film-based electronic device of any one of Embodiments 143-160, the wearable thin film-based electronic device of any one of Embodiments 161-175, the configurable energy storage device of any one of Embodiments 176-180, the energy storage device of any one of Embodiments 181-185, or the energy storage device of any one of Embodiments 186-196, wherein the energy storage device comprises a nickel/iron secondary battery, a silver/iron secondary battery, an iron/air secondary battery, a nickel/cadmium secondary battery, a nickel/metal hydride secondary battery, a nickel/zinc secondary battery, a zinc/silver oxide secondary battery, a lithium-ion secondary battery, a lithium/metal secondary battery, a $Zn/MnO_2$ secondary battery, a zinc/air secondary battery, an aluminum/air secondary battery, a magnesium/air secondary battery or a lithium/air/lithium/polymer secondary battery.

214. The method of any one of Embodiments 1-20, the method of any one of Embodiments 21-36, the manufacturing kit of any one of Embodiments 37-41, the method of fabricating an electrical system of any one of Embodiments 42-46, the energy storage device of any one of Embodiments 47-54, the energy storage device of any one of Embodiments 55-75, the energy storage device of any one of Embodiments 76-82, the energy storage device of any one of Embodiments 83-93, the energy storage device of any one of Embodiments 94-112, the method of any one of Embodiments 113-117, the thin-film-based electronic device of any one of Embodiments 118-142, the thin film-based electronic device of any one of Embodiments 143-160, the wearable thin film-based electronic device of any one of Embodiments 161-175, the configurable energy storage device of any one of Embodiments 176-180, the energy storage device of any one of Embodiments 181-185, or the energy storage device of any one of Embodiments 186-196, wherein the energy storage device comprises a supercapacitor.

215. The method of any one of Embodiments 1-20, the method of any one of Embodiments 21-36, the manufacturing kit of any one of Embodiments 37-41, the method of fabricating an electrical system of any one of Embodiments 42-46, the energy storage device of any one of Embodiments 47-54, the energy storage device of any one of Embodiments 55-75, the energy storage device of any one of Embodiments 76-82, the energy storage device of any one of Embodiments 83-93, the energy storage device of any one of Embodiments 94-112, the method of any one of Embodiments 113-

117, the thin-film-based electronic device of any one of Embodiments 118-142, the thin film-based electronic device of any one of Embodiments 143-160, the wearable thin film-based electronic device of any one of Embodiments 161-175, the configurable energy storage device of any one of Embodiments 176-180, the energy storage device of any one of Embodiments 181-185, or the energy storage device of any one of Embodiments 186-196, wherein the energy storage device comprises a supercapacitor, wherein each of the first and second electrode layers comprises an electric double-layer capacitor.

216. The method of any one of Embodiments 1-20, the method of any one of Embodiments 21-36, the manufacturing kit of any one of Embodiments 37-41, the method of fabricating an electrical system of any one of Embodiments 42-46, the energy storage device of any one of Embodiments 47-54, the energy storage device of any one of Embodiments 55-75, the energy storage device of any one of Embodiments 76-82, the energy storage device of any one of Embodiments 83-93, the energy storage device of any one of Embodiments 94-112, the method of any one of Embodiments 113-117, the thin-film-based electronic device of any one of Embodiments 118-142, the thin film-based electronic device of any one of Embodiments 143-160, the wearable thin film-based electronic device of any one of Embodiments 161-175, the configurable energy storage device of any one of Embodiments 176-180, the energy storage device of any one of Embodiments 181-185, or the energy storage device of any one of Embodiments 186-196, wherein the energy storage device comprises a supercapacitor, wherein each of the first and second electrode layers comprises a pseudo capacitor.

217. The method of any one of Embodiments 1-20, the method of any one of Embodiments 21-36, the manufacturing kit of any one of Embodiments 37-41, the method of fabricating an electrical system of any one of Embodiments 42-46, the energy storage device of any one of Embodiments 47-54, the energy storage device of any one of Embodiments 55-75, the energy storage device of any one of Embodiments 76-82, the energy storage device of any one of Embodiments 83-93, the energy storage device of any one of Embodiments 94-112, the method of any one of Embodiments 113-117, the thin-film-based electronic device of any one of Embodiments 118-142, the thin film-based electronic device of any one of Embodiments 143-160, the wearable thin film-based electronic device of any one of Embodiments 161-175, the configurable energy storage device of any one of Embodiments 176-180, the energy storage device of any one of Embodiments 181-185, or the energy storage device of any one of Embodiments 186-196, wherein the energy storage device comprises a hybrid supercapacitor, wherein the first electrode layer configured as an electric double-layer capacitor and a second electrode layer configured as an electric double-layer capacitor.

218. The method of any one of Embodiments 1-20, the method of any one of Embodiments 21-36, the manufacturing kit of any one of Embodiments 37-41, the method of fabricating an electrical system of any one of Embodiments 42-46, the energy storage device of any one of Embodiments 47-54, the energy storage device of any one of Embodiments 55-75, the energy storage device of any one of Embodiments 76-82, the energy storage device of any one of Embodiments 83-93, the energy storage device of any one of Embodiments 94-112, the method of any one of Embodiments 113-117, the thin-film-based electronic device of any one of Embodiments 118-142, the thin film-based electronic device of any one of Embodiments 143-160, the wearable thin film-based electronic device of any one of Embodiments 161-175, the configurable energy storage device of any one of Embodiments 176-180, the energy storage device of any one of Embodiments 181-185, or the energy storage device of any one of Embodiments 186-196, wherein the energy storage device comprises a supercapacitor having symmetric electrodes, wherein each of the first and second electrode layers comprises a zinc oxide ($Zn_xO_y$) or a manganese oxide ($Mn_xO_y$).

219. The method of any one of Embodiments 1-20, the method of any one of Embodiments 21-36, the manufacturing kit of any one of Embodiments 37-41, the method of fabricating an electrical system of any one of Embodiments 42-46, the energy storage device of any one of Embodiments 47-54, the energy storage device of any one of Embodiments 55-75, the energy storage device of any one of Embodiments 76-82, the energy storage device of any one of Embodiments 83-93, the energy storage device of any one of Embodiments 94-112, the method of any one of Embodiments 113-117, the thin-film-based electronic device of any one of Embodiments 118-142, the thin film-based electronic device of any one of Embodiments 143-160, the wearable thin film-based electronic device of any one of Embodiments 161-175, the configurable energy storage device of any one of Embodiments 176-180, the energy storage device of any one of Embodiments 181-185, or the energy storage device of any one of Embodiments 186-196, wherein the energy storage device comprises a supercapacitor having symmetric electrodes, wherein each of the first and second electrode layers comprises carbon nanotubes.

220. The method of any one of Embodiments 1-20, the method of any one of Embodiments 21-36, the manufacturing kit of any one of Embodiments 37-41, the method of fabricating an electrical system of any one of Embodiments 42-46, the energy storage device of any one of Embodiments 47-54, the energy storage device of any one of Embodiments 55-75, the energy storage device of any one of Embodiments 76-82, the energy storage device of any one of Embodiments 83-93, the energy storage device of any one of Embodiments 94-112, the method of any one of Embodiments 113-117, the thin-film-based electronic device of any one of Embodiments 118-142, the thin film-based electronic device of any one of Embodiments 143-160, the wearable thin film-based electronic device of any one of Embodiments 161-175, the configurable energy storage device of any one of Embodiments 176-180, the energy storage device of any one of Embodiments 181-185, or the energy storage device of any one of Embodiments 186-196, wherein the energy storage device comprises a supercapacitor having asymmetric electrodes, wherein one of the first and second electrode layers comprises a zinc oxide ($Zn_xO_y$) or a manganese oxide ($Mn_xO_y$) and the other of the first and second electrode layers comprises carbon nanotubes.

Unless the context clearly requires otherwise, throughout the description and the claims, the words "comprise," "comprising," "include," "including" and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number, respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or whether these features, elements and/or states are included or are to be performed in any particular embodiment.

While certain embodiments have been described, these embodiments have been presented by way of example only, and are not intended to limit the scope of the disclosure. Indeed, the novel apparatus, methods, and systems described herein may be embodied in a variety of other forms; furthermore, various omissions, substitutions and changes in the form of the methods and systems described herein may be made without departing from the spirit of the disclosure. For example, while blocks are presented in a given arrangement, alternative embodiments may perform similar functionalities with different components and/or circuit topologies, and some blocks may be deleted, moved, added, subdivided, combined, and/or modified. Each of these blocks may be implemented in a variety of different ways. Any suitable combination of the elements and acts of the various embodiments described above can be combined to provide further embodiments. The various features and processes described above may be implemented independently of one another, or may be combined in various ways. All possible combinations and subcombinations of features of this disclosure are intended to fall within the scope of this disclosure.

In addition, unless otherwise specified, none of the steps of the methods of the present disclosure are confined to any particular order of performance. Modifications of the disclosed examples incorporating the spirit and substance of the disclosure may occur to persons skilled in the art and such modifications are within the scope of the present disclosure. Furthermore, all references cited herein are incorporated by reference in their entirety.

While the methods and devices described herein may be susceptible to various modifications and alternative forms, specific examples thereof have been shown in the drawings and are herein described in detail. It should be understood, however, that the invention is not to be limited to the particular forms or methods disclosed, but, to the contrary, the invention is to cover all modifications, equivalents, and alternatives falling within the spirit and scope of the various examples described and the appended claims. Further, the disclosure herein of any particular feature, aspect, method, property, characteristic, quality, attribute, element, or the like in connection with an example can be used in all other examples set forth herein. Any methods disclosed herein need not be performed in the order recited. Depending on the example, one or more acts, events, or functions of any of the algorithms, methods, or processes described herein can be performed in a different sequence, can be added, merged, or left out altogether (e.g., not all described acts or events are necessary for the practice of the method). In some examples, acts or events can be performed concurrently. Further, no element, feature, block, or step, or group of elements, features, blocks, or steps, are necessary or indispensable to each example. Additionally, all possible combinations, sub-combinations, and rearrangements of systems, methods, features, elements, modules, blocks, and so forth are within the scope of this disclosure. The use of sequential, or time-ordered language, such as "then," "next," "after," "subsequently," and the like, unless specifically stated otherwise, or otherwise understood within the context as used, is generally intended to facilitate the flow of the text and is not intended to limit the sequence of operations performed. Thus, some examples may be performed using the sequence of operations described herein, while other examples may be performed following a different sequence of operations.

The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±5%, ±10%, ±15%, etc.). For example, "about 1 V" includes "1 V." Numbers not preceded by a term such as "about" or "approximately" may be understood to based on the circumstances to be as accurate as reasonably possible under the circumstances, for example ±5%, ±10%, ±15%, etc. For example, "1 V" includes "0.9-1.1 V." Phrases preceded by a term such as "substantially" include the recited phrase and should be interpreted based on the circumstances (e.g., as much as reasonably possible under the circumstances). For example, "substantially perpendicular" includes "perpendicular." Unless stated otherwise, all measurements are at standard conditions including temperature and pressure. The phrase "at least one of" is intended to require at least one item from the subsequent listing, not one type of each item from each item in the subsequent listing. For example, "at least one of A, B, and C" can include A, B, C, A and B, A and C, B and C, or A, B, and C.

What is claimed is:

1. An energy storage device comprising:
   an electrically insulating substrate;
   a first current collector layer over the electrically insulating substrate, wherein the first current collector layer comprises a plurality of first current collector finger structures;
   a second current collector layer over the electrically insulating substrate, wherein the second current collector layer comprises a plurality of second current collector finger structures, wherein the first current collector finger structures and the second current collector finger structures are interleaved to alternate in a lateral direction;
   a first electrode layer of a first type over the first current collector layer;

a second electrode layer of a second type over the second current collector layer; and a separator layer separating the first electrode layer and the second electrode layer.

2. The energy storage device of claim 1, wherein the energy storage device is printed on the same side of the electrically insulating substrate as a core device configured to be electrically powered by the energy storage device.

3. The energy storage device of claim 1, wherein the first electrode layer comprises a first electrode active material and the second electrode layer comprises a second electrode active material, wherein a molar ratio between the first electrode active material and the second electrode active material is between 0.25 and 4.0.

4. The energy storage device of claim 3, wherein the first electrode layer comprises a first electrode active material and the second electrode layer comprises a second electrode active material, wherein a ratio between a lateral area of the first electrode layer and a lateral area of the second electrode is proportional to the molar ratio.

5. The energy storage device of claim 1, wherein the first electrode layer comprises a plurality of first electrode finger structures and the second electrode layer comprises a plurality of second electrode finger structures, and wherein the first electrode finger structures and the second electrode finger structures are interleaved to alternate in the lateral direction.

6. The energy storage device of claim 5, wherein the separator layer is over the first electrode layer and the second electrode layer.

7. The energy storage device of claim 5, wherein the separator layer is interposed between adjacent pairs of the first electrode finger structures and the second electrode finger structures that alternate in the lateral direction.

8. The energy storage device of claim 1, wherein the first electrode layer comprises a plurality of first electrode finger structures, wherein the separator layer is over each of the first electrode finger structures, and wherein the second electrode layer is over the separator layer.

9. The energy storage device of claim 8, wherein the separator separates the first electrode finger structures from the second electrode layer in the lateral direction and in the a vertical direction.

10. The energy storage device of claim 8, wherein the separator layer is interposed between adjacent pairs of the first current collector finger structures and the second current collector finger structures that alternate in the lateral direction.

11. The energy storage device of claim 1, wherein each of the first current collector finger structures and the second current collector finger structures has a ratio of a length to a width between about 2 and 100.

12. An energy storage device comprising:
an electrically insulating substrate;
a first current collector over the electrically insulating substrate, wherein the first current collector comprises a plurality of first current collector finger structures;

a second current collector over the electrically insulating substrate, wherein the second current collector comprises a plurality of second current collector finger structures, wherein the first current collector finger structures and the second current collector finger structures are interleaved to alternate in a lateral direction, wherein the first and second current collectors are radially arranged such that one of the first and second current collectors radially surrounds the other of the first and second current collectors;

a first electrode layer of a first type over the first current collector layer;

a second electrode layer of a second type over the second current collector layer; and a separator layer separating the first electrode layer and the second electrode layer.

13. The energy storage device of claim 12, wherein the first electrode layer comprises a first electrode active material and the second electrode layer comprises a second electrode active material, wherein a molar ratio between the first electrode active material and the second electrode active material is between 0.25 and 4.0.

14. The energy storage device of claim 13, wherein the first electrode layer comprises a first electrode active material and the second electrode layer comprises a second electrode active material, wherein a ratio between a lateral area of the first electrode layer and a lateral area of the second electrode is proportional to the molar ratio.

15. The energy storage device of claim 12, wherein the first electrode layer comprises a plurality of first electrode finger structures and the second electrode layer comprises a plurality of second electrode finger structures, and wherein the first electrode finger structures and the second electrode finger structures are interleaved to alternate in the lateral direction.

16. The energy storage device of claim 15, wherein the separator layer is over the first electrode layer and the second electrode layer.

17. The energy storage device of claim 16, wherein the separator layer is interposed between adjacent pairs of the first electrode finger structures and the second electrode finger structures that alternate in the lateral direction.

18. The energy storage device of claim 17, wherein the separator layer is interposed between adjacent pairs of the first current collector finger structures and the second current collector finger structures that alternate in the lateral direction.

19. The energy storage device of claim 12, wherein the first electrode layer comprises a plurality of first electrode finger structures, wherein the separator layer is over each of the first electrode finger structures, and wherein the second electrode layer is over the separator layer.

20. The energy storage device of claim 14, wherein the separator layer is interposed between adjacent pairs of the first current collector finger structures and the second current collector finger structures that alternate in the lateral direction.

* * * * *